US00RE48791E

(19) United States
(12) Reissued Patent
Kulkarni et al.

(10) Patent Number: US RE48,791 E
(45) Date of Reissued Patent: Oct. 26, 2021

(54) SCALABLE, ADAPTABLE, AND MANAGEABLE SYSTEM FOR MULTIMEDIA IDENTIFICATION

(71) Applicant: Roku, Inc., San Jose, CA (US)

(72) Inventors: Sunil Suresh Kulkarni, Santa Cruz, CA (US); Jose Pio Pereira, Cupertino, CA (US); Pradipkumar Dineshbhai Gajjar, Sunnyvale, CA (US); Shashank Merchant, Sunnyvale, CA (US); Prashant Ramanathan, Mountain View, CA (US); Mihailo M. Stojancic, San Jose, CA (US)

(73) Assignee: Roku, Inc., San Jose, CA (US)

(21) Appl. No.: 16/597,648

(22) Filed: Oct. 9, 2019

Related U.S. Patent Documents

Reissue of:
(64) Patent No.: 9,785,708
Issued: Oct. 10, 2017
Appl. No.: 14/718,218
Filed: May 21, 2015

U.S. Applications:
(60) Continuation of application No. 14/151,294, filed on Jan. 9, 2014, now Pat. No. 8,965,863, and a (Continued)

(51) Int. Cl.
*G06F 16/783* (2019.01)
*G06F 16/43* (2019.01)
(Continued)

(52) U.S. Cl.
CPC ..... *G06F 16/7847* (2019.01); *G06F 16/2255* (2019.01); *G06F 16/245* (2019.01); *G06F 16/43* (2019.01); *G06F 16/951* (2019.01)

(58) Field of Classification Search
CPC .... G06F 16/43; G06F 16/245; G06F 16/2244; G06F 16/7847
See application file for complete search history.

(56) References Cited

U.S. PATENT DOCUMENTS 6,728,881 B1 * 4/2004 Karamchetty ..... G06F 21/34 713/182
6,763,148 B1 7/2004 Sternberg et al.
(Continued)

*Primary Examiner* — Joshua D Campbell
(74) *Attorney, Agent, or Firm* — McDonnell Boehnen Hulbert & Berghoff LLP

(57) ABSTRACT

An architecture for a multimedia search system is described. To perform similarity matching of multimedia query frames against reference content, reference database comprising of a cluster index using cluster keys to perform similarity matching and a multimedia index to perform sequence matching is built. Methods to update and maintain the reference database that enables addition and removal of the multimedia contents, including portions of multimedia content, from the reference database in a running system are described. Hierarchical multi-level partitioning methods to organize the reference database are presented. Smart partitioning of the reference multimedia content according to the nature of the multimedia content, and according to the popularity among the social media, that supports scalable fast multimedia identification is also presented. A caching mechanism for multimedia search queries in a centralized or in a decentralized distributed system and a client based local multimedia search system enabling multimedia tracking are described.

116 Claims, 36 Drawing Sheets

Related U.S. Application Data continuation of application No. 14/151,335, filed on Jan. 9, 2014, now Pat. No. 9,058,355, which is a division of application No. 13/102,479, filed on May 6, 2011, now Pat. No. 8,655,878, and a division of application No. 13/102,479, filed on May 6, 2011.

(60) Provisional application No. 61/331,965, filed on May 6, 2010.

(51) Int. Cl.

| | |
|---|---|
| ***G06F 16/245*** | (2019.01) |
| ***G06F 16/22*** | (2019.01) |
| ***G06F 16/951*** | (2019.01) |

(56) References Cited

U.S. PATENT DOCUMENTS 6,772,196 B1 * 8/2004 Kirsch ..... G06Q 10/107 707/999.005
7,155,676 B2 * 12/2006 Land ..... G06Q 10/10 715/704
7,552,196 B2 6/2009 Levi et al.
7,693,813 B1 * 4/2010 Cao ..... G06F 17/30616 707/999.001
2002/0112180 A1 * 8/2002 Land ..... G06Q 10/10 726/26
2004/0003132 A1 1/2004 Stanley et al.
2004/0049780 A1 * 3/2004 Gee ..... H04N 21/44008 725/32
2004/0098671 A1 * 5/2004 Graham ..... G06F 17/30017 715/274
2004/0133927 A1 7/2004 Sternberg et al.
2005/0021972 A1 * 1/2005 Levi ..... H04L 45/00 713/176
2008/0052739 A1 * 2/2008 Logan ..... H04N 21/4661 725/25
2009/0077580 A1 * 3/2009 Konig ..... H04N 7/16 725/34
2009/0164213 A1 6/2009 Lennington et al.
2010/0005488 A1 * 1/2010 Rakib ..... G06K 9/00758 725/34
2010/0034206 A1 * 2/2010 Xue ..... H04L 29/12188 370/400
2010/0177642 A1 7/2010 Sebastian et al.
2011/0246471 A1 * 10/2011 Rakib ..... G11B 27/34 707/741
2012/0056911 A1 * 3/2012 Safaee-Rad ..... G09G 3/2003 345/690
2015/0163545 A1 * 6/2015 Freed ..... H04N 21/8456 725/19

* cited by examiner

SCALABLE, ADAPTABLE, AND MANAGEABLE SYSTEM FOR MULTIMEDIA IDENTIFICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation of U.S. patent application Ser. No. 14/151,335 filed Jan. 9, 2014 and U.S. patent application Ser. No. 14/151,294 filed Jan. 9, 2014 and issued as U.S. Pat. No. 8,965,863 which are both divisionals of U.S. patent application Ser. No. 13/102,479 filed May 6, 2011 issued as U.S. Pat. No. 8,655,878 which claims the benefit of U.S. Provisional Patent Application Ser. No. 61/331,965 entitled "Scalable, Adaptable, and Manageable System for Multimedia Identification" filed May 6, 2010 all of which are hereby incorporated by reference in their entirety.

CROSS REFERENCE TO RELATED APPLICATIONS

U.S. patent application Ser. No. 14/151,294 filed Jan. 9, 2014 entitled "A Scalable, Adaptable, and Manageable System for Multimedia Identification", U.S. patent application Ser. No. 12/141,163 filed Jun. 18, 2008 entitled "Methods and Apparatus for Providing a Scalable Identification of Digital Video Sequences", U.S. patent application Ser. No. 12/141,337 filed on Jun. 18, 2008, "Methods and Apparatus for Multi-Dimensional Content Search and Video Identification", U.S. patent application Ser. No. 12/491,896 filed Jun. 25, 2009 entitled "Digital Video Fingerprinting Based on Resultant Weighted Gradient Orientation Computation", U.S. patent application Ser. No. 12/612,729 filed Nov. 5, 2009 entitled "Digital Video Content Fingerprinting Based on Scale Invariant Interest Region Detection with an Array of Anisotropic Filters", U.S. patent application Ser. No. 12/772,566 filed May 3, 2010 entitled "Media Fingerprinting and Identification System", U.S. patent application Ser. No. 12/788,796 filed May 27, 2010 entitled "Multi-Media Content Identification Using Multi-Level Content Signature Correlation and Fast Similarity Search", U.S. patent application Ser. No. 12/955,416 filed Nov. 29, 2010 entitled "Digital Video Content Fingerprinting Using Image Pixel Intensity and Color Information", and U.S. patent application Ser. No. 13/076,628 filed Mar. 31, 2011 entitled "Scale/Affine Invariant Interest Region Detection with an Array of Anisotropic Filters for Video Fingerprinting" have the same assignee as the present application, are related applications, and are hereby incorporated by reference in their entirety.

BACKGROUND OF THE INVENTION

Media applications which include video and audio database management, database browsing and identification are undergoing explosive growth and are expected to continue to grow. To address this growth, there is a need for a comprehensive solution related to the problem of creating a multimedia sequence database and identifying, within such a database, a particular multimedia sequence or sequences that are tolerant of media content distortions. Multiple applications include video database mining, copyright content detection for video hosting web-sites, contextual advertising placement, and broadcast monitoring of video programming and advertisements.

Multimedia fingerprinting refers to the ability to generate associated identifying data, referred to as a fingerprint, from the multimedia image, audio and video content. A fingerprint ideally has several properties. First, the fingerprint should be much smaller than the original data. Second, the fingerprint should be designed such that it can be searched for in a large database of fingerprints. Third, the original multimedia content should not be able to be reconstructed from the fingerprint. Fourth, for multimedia content that is a distorted version of another multimedia content, fingerprints of the original and distorted versions should be similar. Examples of some common multimedia distortions include, selecting a clip of video content temporally, cropping the image data, re-encoding the image or audio data to a lower bit rate, changing a frame rate of the video or audio content, re-recording the multimedia data via some analog medium such as a camcorder in a movie theatre, and changing the aspect ratio of the image content. A fingerprint with the fourth property is deemed to be robust against such distortions. Such a system of fingerprinting and search is preferable to other methods of content identification. For example, multimedia watermarking changes the multimedia content by inserting watermark data. Unlike multimedia watermarking, fingerprinting does not change the content.

Fingerprinting is a very challenging problem. So also developing a scalable system that can easily be managed, changed, replicated is a challenging system problem.

Increasing demand for such fingerprinting and search solutions, which include standard definition (SD) and high definition (HD) formats of video, three dimensional (3D) videos, virtual reality media content, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. To such ends, an embodiment of the invention addresses a method for creating a distributed reference multimedia database. A reference multimedia database is split into a first identifiable portion and a second identifiable portion. The first identifiable portion is stored at a first search server and the second identifiable portion is stored at a second search server. A first query is assigned to the first search server based on the first identifiable portion stored therein and a second query is assigned to the second search server based on the second identifiable portion stored therein. The first query is searched for at the first search server in parallel with the second query searched for at the second search server to find a first content stored in the first identifiable portion and a second content stored in the second identifiable portion that have a close match to the associated first query and to the associated second query.

Another embodiment of the invention addresses a method for creating a tiered multimedia reference database. A reference multimedia database is split into a first identifiable portion having multimedia content representing the most sought content and a second identifiable portion representing the remaining content. The first identifiable portion is stored at a first search server and the second identifiable portion is stored at a second search server coupled to the first search server. A first query is assigned to the first search server. The first query is searched for at the second search server if a search for the first query at the first search server is not successful to find multimedia content stored in the first search server.

Another embodiment of the invention addresses a method of tracking units of multimedia content. Reference signatures retrieved from a remote search server for currently displayed units of multimedia content are stored in a client device. Matches in query results are detected for succeeding displayed units of multimedia content using a track search approach to track current displayed units of multimedia content. Display of succeeding units of multimedia content are blocked upon a no match indication detected in the query results.

Another embodiment of the invention addresses a method for query caching. Signatures of a video sequence are generated at a client. A cache key is generated from the signatures at the client. A search of a remote reference database is requested using the cache key. The remote reference database is searched for a match with the cache key. Results linked with a matching cache key are sent to the client, wherein the results were generated from a previous full search of the reference database.

A further embodiment of the invention addresses a method of signature database organization by a cluster index. A first set of first signature records for units of multimedia content are stored in a cluster index data structure, wherein the first signature records are grouped by a cluster key. A second set of second signature records for units of multimedia content are stored in a multimedia signature index data structure, wherein the second signature records are grouped by a multimedia identification. Signatures are shared in the single server search system between the cluster index data structure and multimedia signature index data structure.

These and other features, aspects, techniques and advantages of the present invention will be apparent to those skilled in the art from the following detailed description, taken together with the accompanying drawings and claims.

DETAILED DESCRIPTION

Figure 1:
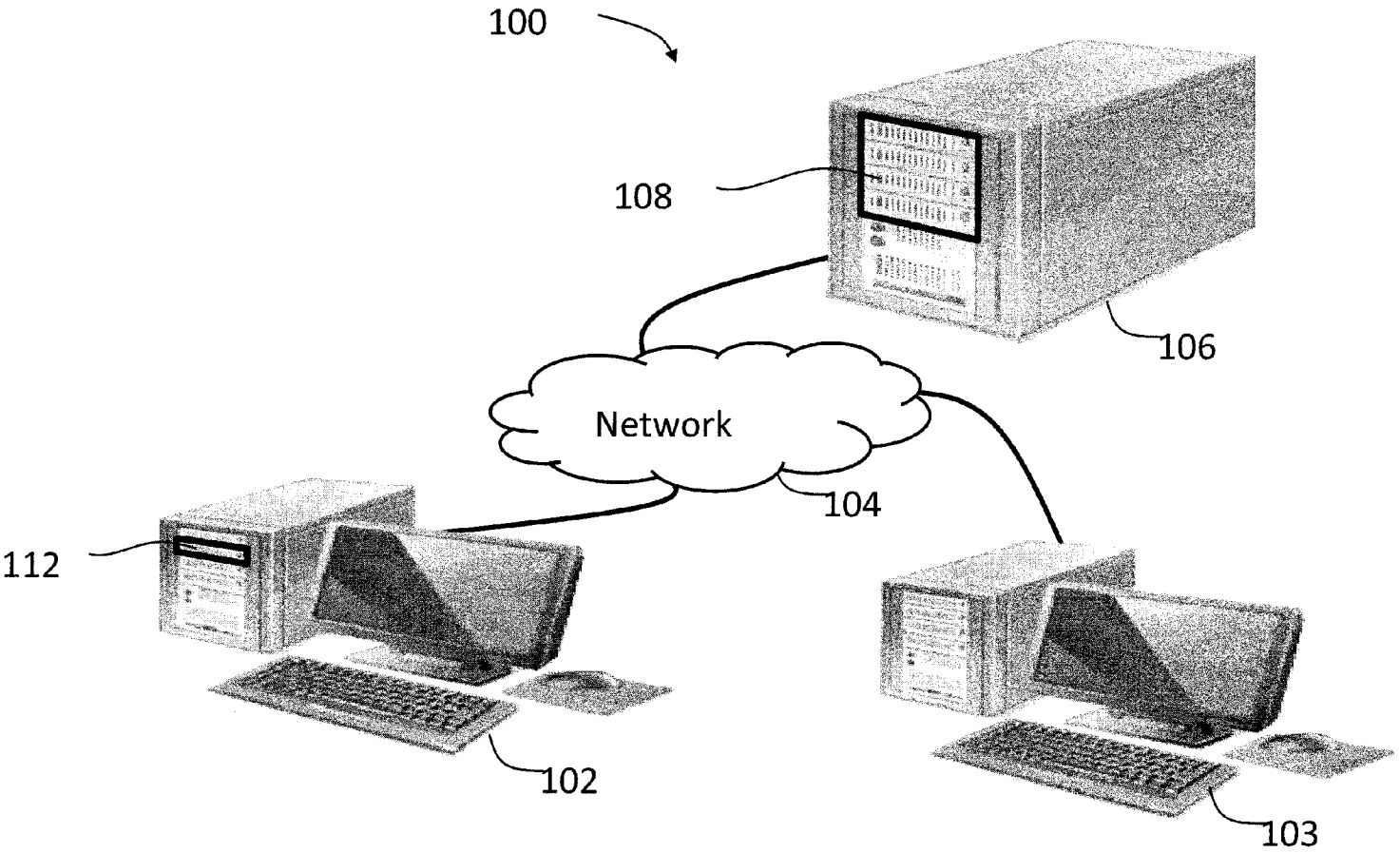
FIG. 1 illustrates a fingerprinting and search system for media content fingerprinting and identification in accordance with the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA', Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Systems and methods are described that are highly scalable to very large multimedia databases. A reference multimedia database can be modified by adding a unit of multimedia content or removing an existing unit of multimedia content while it is being used for multimedia identification. A unit of multimedia content may be a frame or a sequence of frames of a video, an audio clip, other multimedia formatted data, such as frames from a movie. A unit of multimedia content may also be a television show without advertisements, an advertisement, a song, or similar unit of communication. The search system can be tuned to the desired speed of multimedia matching by centralized and distributed systems, by replication of individual search machines or search machine clusters, by use of a hierarchical tier of search machines and reference databases, by partitioning of reference databases, by multimedia query caching, by local client search methods, by client tracking, or by combinations of the previously mentioned arrangements. As an example, the search system can be implemented in a centralized client server model, or as a distributed system, or by a combination of such approaches. Also, a distributed search system may be operable on a variety of distributed networks, such as a peer to peer (P2P) system. In addition, search functions or a complete search operation may be operable at the client.

The following nomenclature is used in describing the present invention. For example, multimedia content represents any video, audio or audio-visual content. Multimedia content may also represent a series of photographs or pictures, a series of audio files, or other associated data, such as 3D video content or 4D content in which sensory feedbacks such as touch feedback sensations are presented simultaneously with visual and audio content.

The terms is signature and fingerprint both denote the same structure of a sequence of bits and may be used interchangbly. A fingerprint is generated to represent a unit of multimedia content using a fingerprinting method that operates on the unit of multimedia content. A cluster key is a type of hash key. A cluster index is a data structure that holds all of the signatures that have the same cluster key. A multimedia signature index is a data structure that is used to hold signatures associated with a unit of multimedia content.

A number of exemplary goals of a multimedia identification system include an ability to handle large capacity multimedia databases and high density media files. The multimedia identification system is to provide high performance and respond with accurate media identification when queried. Also, the overall design should be scalable to efficiently handle increasing capacity of the multimedia databases and an arbitrary length of a query sequence.

To provide for such needs, FIG. 1 illustrates a fingerprinting and search system 100 for both media fingerprinting and identification in accordance with an embodiment of the present invention. The fingerprinting and search system 100 includes user sites 102 and 103, a server 106, a video database 108, and a video fingerprinting and video identification process 112 operated, for example, by user site 102. A network 104, such as the Internet, a wireless network, or a private network, connects sites 102 and 103 and server 106. Each of the user sites, 102 and 103 and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, a tablet computer, or the like equipped with programs and interfaces to support data input and output and video fingerprinting and search monitoring that may be implemented both automatically and manually. The user site 102, for example, may store programs, such as the video fingerprinting and search process 112 which is an implementation of a content based video identification process of the present invention. The user site 102 may also have access to such programs through electronic media, such as may be downloaded over the Internet from an external server, accessed through a universal serial bus (USB) port from flash memory, accessed from disk media of various types, or the like. The fingerprinting and search system 100 may also suitably include more servers and user sites than shown in FIG. 1. Also, multiple user sites each operating an instantiated copy or version of the video fingerprinting and search process 112 may be connected directly to the server 106 while other user sites may be indirectly connected to it over the network 104.

User sites 102 and 103 may generate user video content which is uploaded over the Internet 104 to a server 106 for storage in the video database 108. The user sites 102 and 103, for example, may also operate a video fingerprinting and video identification process 112 to generate fingerprints and search for video content in the video database 108. The video fingerprinting and video identification process 112 in FIG. 1 is scalable and utilizes highly accurate video fingerprinting and identification technology as described in more detail below. The process 112 is operable to check unknown video content against a database of previously fingerprinted video content, which is considered an accurate or "golden" database. The video fingerprinting and video identification process 112 is different in a number of aspects from commonly deployed processes. For example, the process 112 extracts features from the video itself rather than modifying the video. The video fingerprinting and video identification process 112 allows the server 106 to configure a "golden" database specific to its business requirements. For example, general multimedia content may be filtered according to a set of guidelines for acceptable multimedia content that may be stored on the business system. The user site 102 that is configured to connect with the network 104, uses the video fingerprinting and search process 112 to compare local video streams against a previously generated database of signatures in the video database 108.

The video database 108 may store video archives, as well as data related to video content stored in the video database 108. The video database 108 also may store a plurality of video fingerprints that have been adapted for use as described herein and in accordance with the present invention. It is noted that depending on the size of an installation, the functions of the video fingerprinting and search process 112 and the management of the video database 108 may be combined in a single processor system, such as user site 102 or server 106, and may operate as directed by separate program threads for each function.

The fingerprinting and search system 100 for both media fingerprinting and identification is readily scalable to very large multimedia databases, has high accuracy in finding a correct clip, has a low probability of misidentifying a wrong clip, and is robust to many types of distortion. The fingerprinting and search system 100 uses one or more fingerprints for a unit of multimedia content that are composed of a number of compact signatures, including cluster keys and associated metadata. The compact signatures and cluster keys are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available.

Multimedia, specifically audio and video content, may undergo several different types of distortions. For instance, audio distortions may include re-encoding to different sample rates, rerecording to a different audio quality, introduction of noise and filtering of specific audio frequencies or the like. Video distortions may include cropping, stretching, re-encoding to a lower quality, using image overlays, or the like. While these distortions change the digital representation, the multimedia is perceptually similar to undistorted content to a human listener or viewer. Robustness to these distortions refers to a property that content that is perceptually similar will generate fingerprints that have a small distance according to some distance metric, such as Hamming distance for bit based signatures. Also content that is perceptually distinct from one another will generate fingerprints that have a large distance, according to the same distance metric. A search for perceptually similar content, hence, is transformed to a problem of searching for fingerprints that are a small distance away from the desired fingerprints.

Figure 2A:
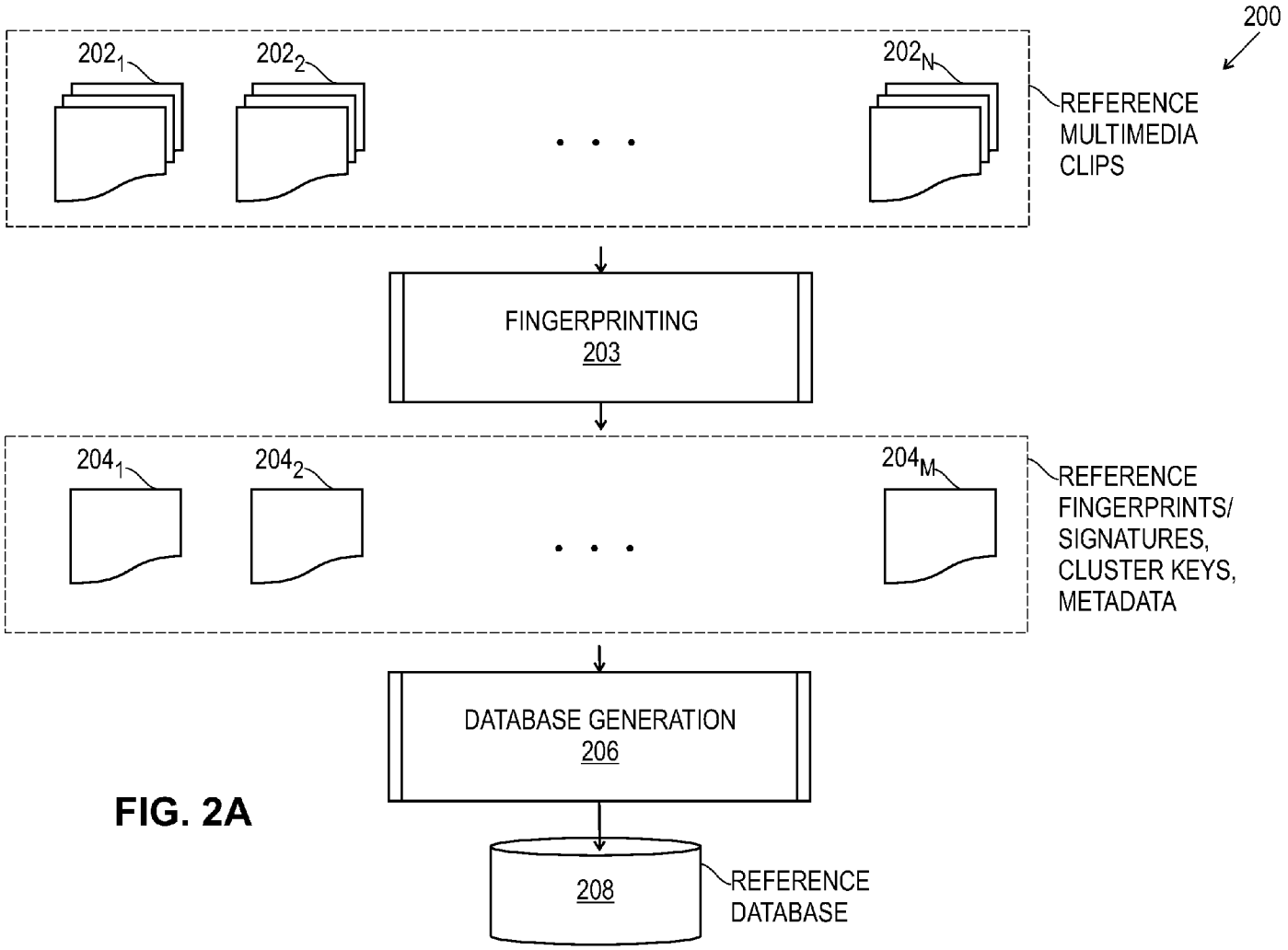
FIG. 2A illustrates a reference media database generation process in accordance with the present invention.

FIG. 2A illustrates a reference media database generation process 200 in accordance with the present invention. Reference units of multimedia content, such as video or movie clips $\mathbf{202}_1$, $\mathbf{202}_2$, . . . $\mathbf{202}_N$ that are relevant to the application at hand are identified. The clips $\mathbf{202}_1$, $\mathbf{202}_2$, . . . $\mathbf{202}_N$ refer to distinct units of multimedia content. For example, the clips could be from a movie and represent different temporal portions of the movie, or they could be from different movies. Using a video fingerprinting function 203 of the video fingerprinting and search process 112, reference signatures $\mathbf{204}_1$, $\mathbf{204}_2$, . . . $\mathbf{204}_M$ are generated for the reference multimedia clips $\mathbf{202}_1$, $\mathbf{202}_2$, . . . $\mathbf{202}_N$, respectively, along with hashing data and associated metadata, where M may be different than N. Different pieces of multimedia content may be fingerprinted independently, leading to a parallelizable system. The set of reference signatures $\mathbf{204}_1$, $\mathbf{204}_2$, . . . $\mathbf{204}_M$ created by the video fingerprinting function 203 is organized by database generation function 206 into a reference database 208. This set of reference signatures is indexed by the generated hashing data, described in further detail below. The associated metadata, also described in further detail below, is stored along with each reference signature. A set of reference signatures may also be indexed in other ways, for instance, by multimedia identifiers. A single multimedia identifier denotes a distinct piece of multimedia content. For instance, the multimedia clips 202$_1$, 202$_2$, . . . 202$_N$ would each be represented by their own multimedia identifier.

Figure 2B:
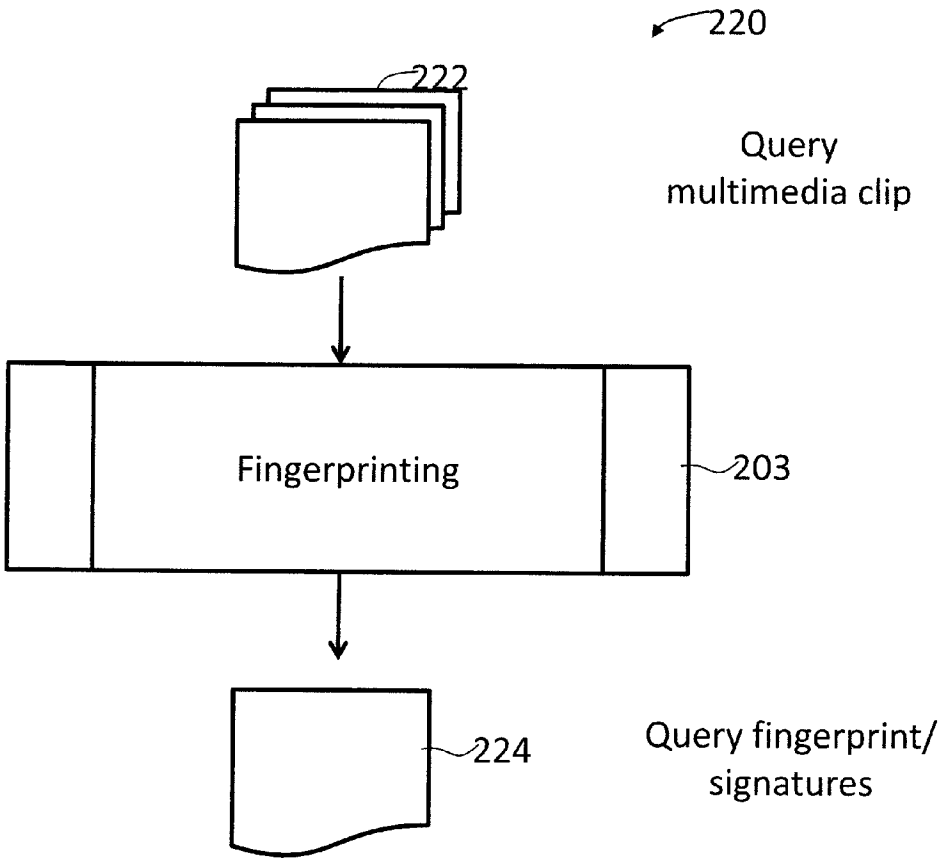
FIG. 2B illustrates a query fingerprint generation process in accordance with the present invention.

FIG. 2B illustrates a query fingerprint generation process 220 in accordance with the present invention. A user requests identification of an unknown multimedia clip 222, also referred to herein as a query multimedia clip 222. The query multimedia clip 222 is processed by the video fingerprinting function 203 to generate query signatures, hash data, and associated metadata, known collectively as a query fingerprint 224, for the unknown multimedia clip 222.

Figure 2C:
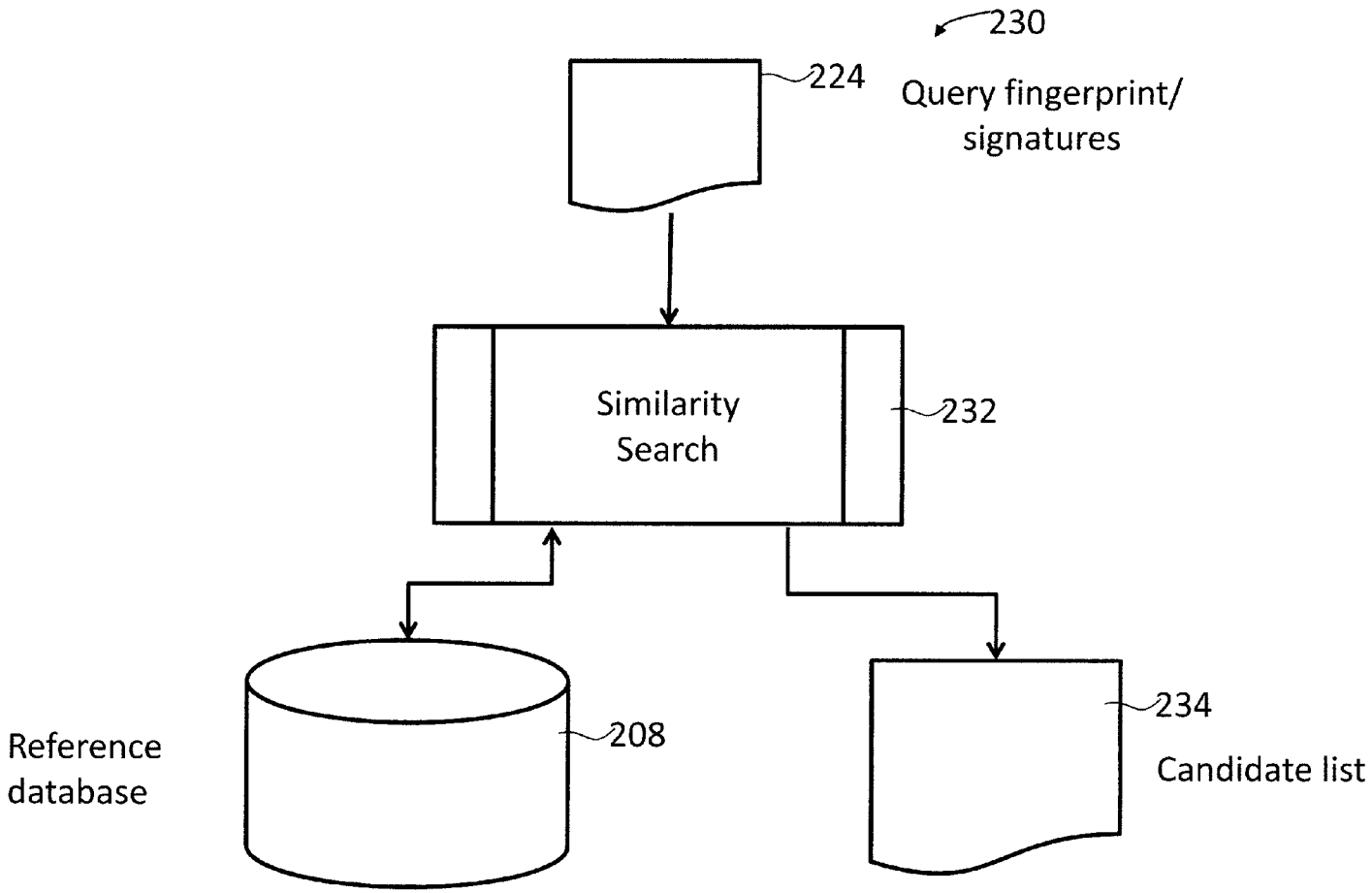
FIG. 2C illustrates a similarity search process in accordance with the present invention.

FIG. 2C illustrates a similarity search process 230 in accordance with the present invention. For each query signature in the query fingerprint 224, a similarity search function 232 is initiated to find similar signatures in the reference database 208. The hash data associated with each query signature is used to restrict the similarity search function 232 to a relatively small portion of the reference data, allowing the similarity search to be extremely fast even for large reference databases. Only reference signatures that are "similar" within a distance measure to the query signature are returned. These classified similar reference signatures are added to a candidate list 234, which contains identifying information regarding which reference multimedia clip 202$_1$, 202$_2$, . . . 202$_N$ the similar reference signatures belong.

Figure 2D:
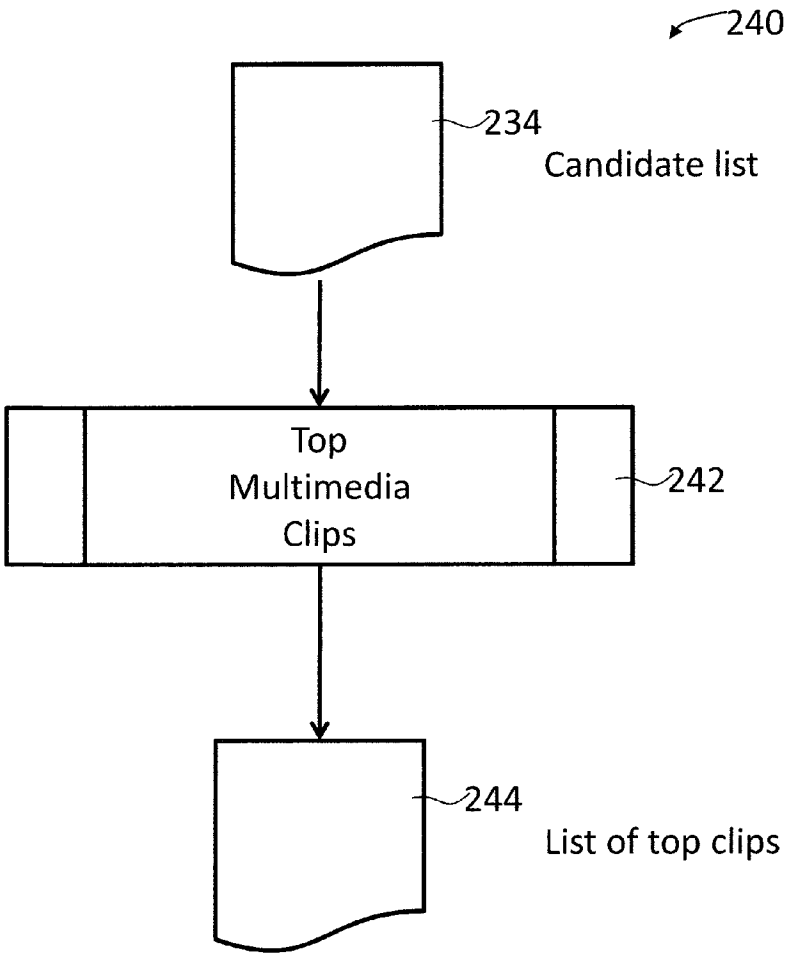
FIG. 2D illustrates a candidate multimedia filtering process in accordance with the present invention.

FIG. 2D illustrates a candidate video filtering process 240 in accordance with the present invention. The video filtering process 240 analyzes the candidate list 234 for the most likely matches in the reference database 208. The candidate list 234 is sorted in top multimedia clips function 242 to find the top most likely matching multimedia clips. The resulting data is stored in a list of top clips 244. The list of top clips 244 includes a multimedia identifier for the similar reference multimedia clip. A most likely matching multimedia clip might be only for a specific portion of the multimedia clip, for instance, a particular time segment, such as seconds 93 to 107 of a video sequence, or spatial locations, such as top left quadrant in each of the clip's video frames. The temporal identification and spatial locations are also included in the list of top clips.

Figure 2E:
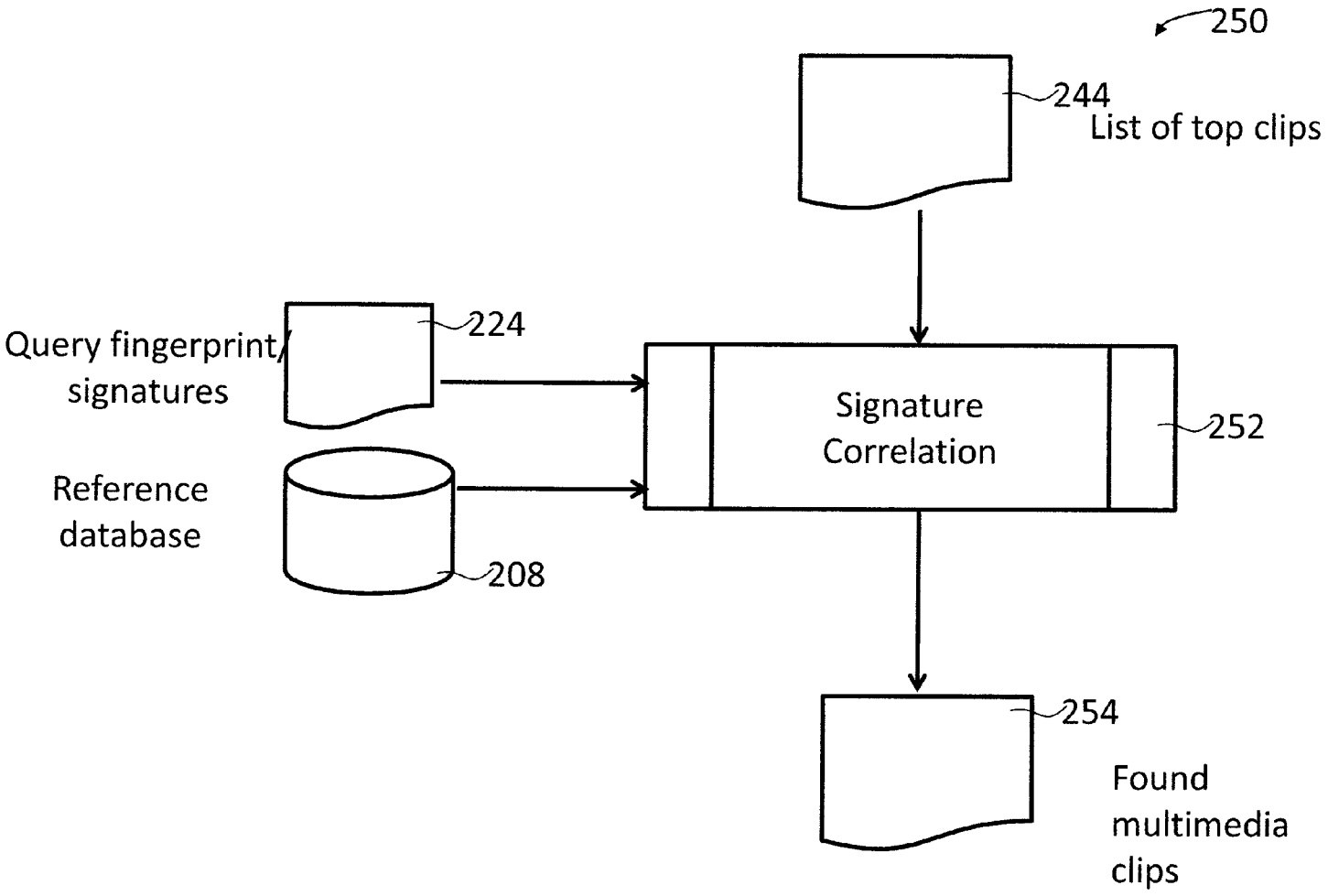
FIG. 2E illustrates a signature correlation process in accordance with the present invention.

FIG. 2E illustrates a signature correlation process 250 in accordance with the present invention. The list of top clips 244 is selected for correlation. For each of the clips in the top clips list 244, a set of reference signatures is accessed from the reference database 208 based on the multimedia identifier and any temporal and/or spatial information. A query could correspond to "all reference signatures for video number ABC from time 10.4 seconds to 25.7 seconds in the bottom-right quadrant of the frame". These reference signatures are not restricted to have matching cluster keys and the criteria to select a subset of them can be further specified. This set of reference signatures is compared against the query signatures using a signature correlation procedure 252. For each query signature, a score is derived based on the number of matches and the distances to the closest signatures in the set of selected reference signatures. The distances measured could include, for instance, the average distance. These scores are combined, for example, the scores are averaged, for the entire set of query signatures to give an overall score for a particular reference database clip. Based on whether this score is over a threshold, the reference database clip is determined to be a true positive or a false positive. The signature correlation procedure 252 is repeated for all clips in the top clips list 244, to produce a list of matching reference videos, since there may be more than one, if similar content is repeated in the database, for example. The fingerprinting function 203 of FIG. 2A and FIG. 2B belongs to a multimedia fingerprinting system of the fingerprinting and search system 100, while the database generation function 206 of FIG. 2A, the similarity search process 230 of FIG. 2C, the candidate video filtering process 240 of FIG. 2D, and the signature correlation process 250 of FIG. 2E belong to a search system of the fingerprinting and search system 100.

Figure 2F:
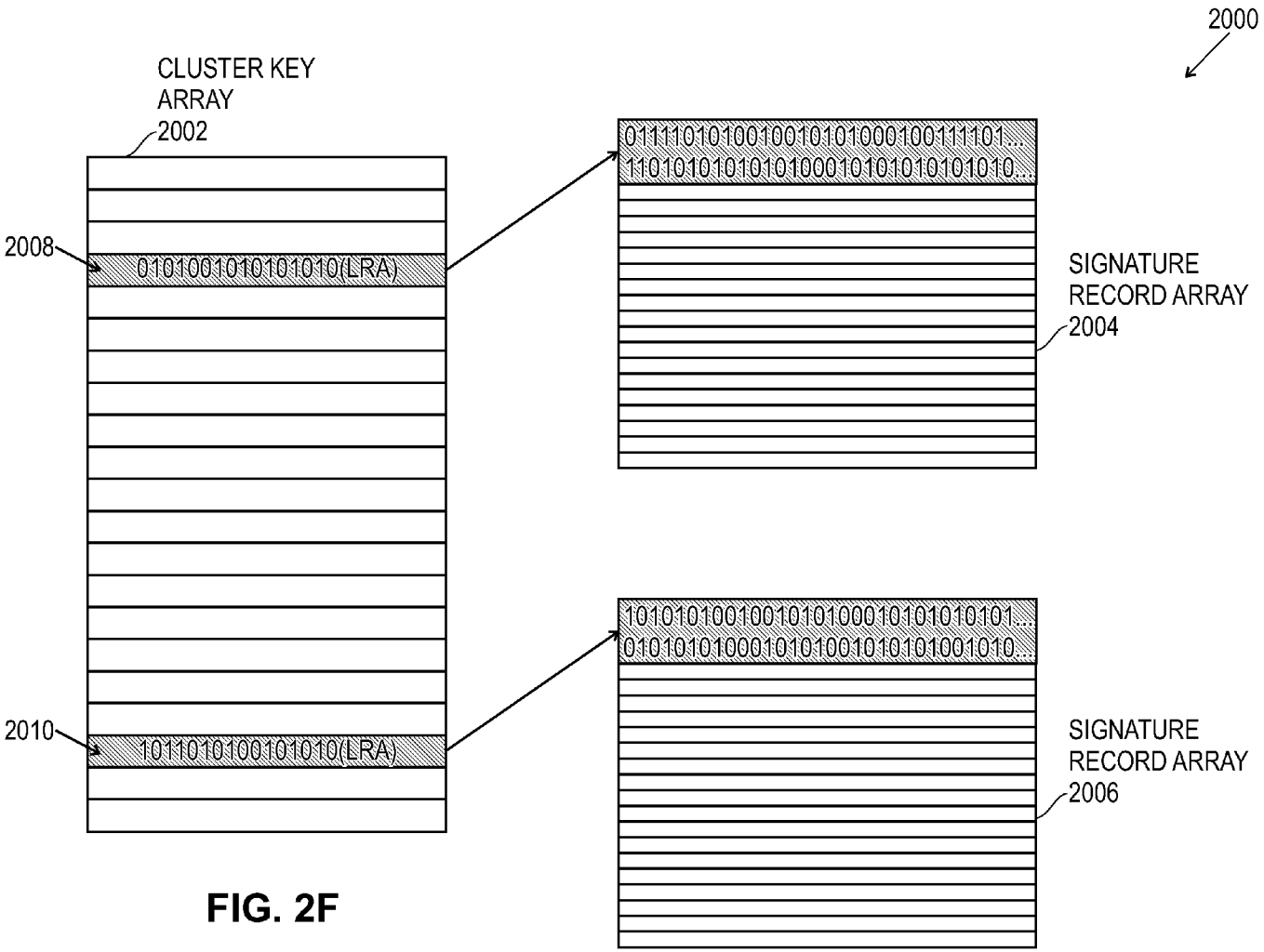
FIG. 2F illustrates an exemplary signature database organized by a cluster key index in accordance with the present invention.

FIG. 2F illustrates an exemplary signature database 2000 organized by a cluster key index in accordance with the present invention. The signature records for all the multimedia content that is to be put into the signature database 2000 are collected together and grouped by a cluster key. At this stage of processing, the number of signatures that belong to particular cluster key is known so the memory space for the signature records can be allocated and signature records may be stored in the memory. The signature records stored in the memory are not considered fixed and unchangeable and dynamic updates to the signature records may added as described in more detail below.

It is advantageous for search operations that the signature records for a particular cluster key be stored contiguously. The set of signatures belonging to a cluster key is called a cluster. For example, 100 signatures and corresponding cluster keys may be generated having 50 signatures with a cluster key A, 30 signatures with a cluster key B and 20 signatures with a cluster key C. Thus, the 100 signatures are organized into three clusters, cluster A with 50 signatures, cluster B with 30 signatures and cluster C with 20 signatures that are stored in memory.

For each cluster key, the number of signatures and a pointer to the location where the corresponding signature records begin is stored for processing. Since the space of cluster keys may be relatively small, for example, a 16-bit cluster key implies a maximum 65,536 entries, other possible cluster keys, such as 24-bit or 32-bit cluster keys, can be used as indexes to locate signature clusters in an array. Alternative arrangements of signatures, such as organizations in the form of a binary tree or in the form of a B-tree or similar data structures may also be used. However, aspects of using the cluster keys as indexes in an array are discussed further below.

As shown in FIG. 2F, a cluster key array 2002 stores one element for each possible cluster key. The index into the cluster key array 2002 is the integer interpretation of the cluster key as a binary number. Thus, given a cluster key, direct addressing into the array 2002 retrieves the number of matching signatures and where corresponding signature records are located, such as a link reference address (LRA) to a list of signature records 2004 or 2006. In FIG. 2F, for example, cluster key "0101001010101010" is located at entry 2008, which links to the array of signature records 2004, and cluster key "1011010100101010" is located at entry 2010, which links to the array of signature records 2006. Each entry in cluster key array 2002, such as entries 2008 and 2010, have an additional field included in the entry that stores the link reference address (LRA) to a signature record array, such as signature record 2004 and 2006.

Figure 2G:
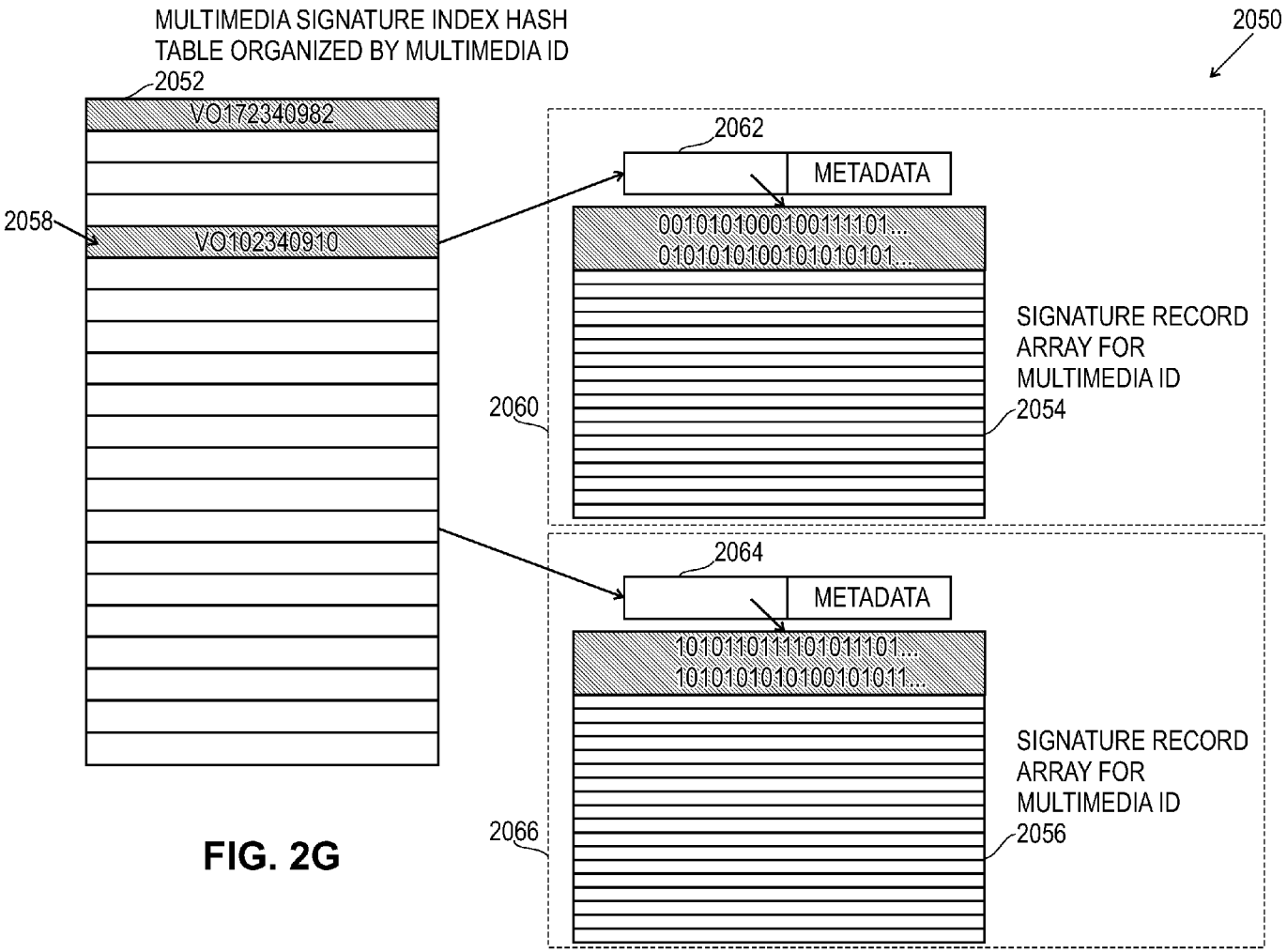
FIG. 2G illustrates an exemplary signature database organized by a multimedia signature index organization in accordance with the present invention.

FIG. 2G illustrates an exemplary signature database 2050 organized by a multimedia signature index organization in accordance with the present invention. The multimedia signature index organization supports accesses of the signature records corresponding to a multimedia identification (id), from a starting playout time to an ending playout time. The multimedia signature index organization is useful for the signature correlation process, discussed above with regard to FIG. 2E. The multimedia signature index organization is based on a hash table 2052 organized by multimedia id. For example, a hash table entry 2058 stores a pointer to the data structure 2060 that holds metadata and all of the signatures for this multimedia id "vo102340910" stored in an array 2054. The signatures are stored in playout timestamp order within every array 2054, 2056 in the signature database 2050.

The exemplary signature database 2000 and the exemplary signature database 2050 may be stored either in a local computer's main memory, such as RAM, or on a hard disk drive. One embodiment is to store one or both of the video database structures in main memory as access speeds are significantly faster. A performance versus capacity tradeoff may be made concerning the remaining capacity of main memory versus the remaining capacity of the hard drive once the video database structures are stored.

An exemplary embodiment of signature formation, also referred to as fingerprinting, and database formation is described in U.S. patent application Ser. No. 12/141,163 filed Jun. 18, 2008, FIGS. 11-16 and page 25, line 3 to page 28, line 18. Another exemplary embodiment of fingerprinting and database formation is described in U.S. patent application Ser. No. 12/612,729 filed Nov. 5, 2009, FIGS. 12-14 and page 28, line 20 to page 31, line 13. Another exemplary embodiment of fingerprinting and database fin nation is described in U.S. patent application Ser. No. 12/491,896 filed Jun. 25, 2009, FIGS. 8-10 and page 20, line 8 to page 24, line 22. Another exemplary embodiment of fingerprinting and database formation is described in U.S. patent application Ser. No. 12/772,566 filed May 3, 2010, FIGS. 4-9B and page 23, line 6 to page 40, line 6. A further exemplary embodiment of fingerprinting and database formation is described in U.S. patent application Ser. No. 12/955,416 filed Nov. 29, 2010, FIGS. 6-12, and page 16, line 8 to page 29, line 15. An exemplary embodiment of a system and database formation process is described in U.S. patent application Ser. No. 12/141,337 filed Jun. 18, 2008, FIGS. 1A, 1B, 1C, and 4-7, and page 6, line 15 to page 14, line 18 and page 21, line 11 to page 24, line 21. Another exemplary embodiment of a system and database formation process is described in U.S. patent application Ser. No. 12/772,566 filed May 3, 2010, FIGS. 1-3, and page 10, line 10 to page 23, line 5. A further exemplary embodiment of a system and database formation process is described in U.S. patent application Ser. No. 12/788,796 filed May 27, 2010, FIGS. 1, 2A and 2B, and page 6, line 14 to page 13, line 2. An exemplary embodiment of query search is described in U.S. patent application Ser. No. 12/141,163 filed Jun. 18, 2008, FIG. 17, and page 28, line 19 to page 29, line 6. Another exemplary embodiment of query search is described in U.S. patent application Ser. No. 12/141,337 filed Jun. 18, 2008, FIGS. 2A-3B and 8, and page 14, line 19 to page 21, line 10 and page 24, line 22 to page 26, line 10. Another exemplary embodiment of query search is described in U.S. patent application Ser. No. 12/612,729 filed Nov. 5, 2009, FIG. 15, and page 31, line 14 to page 32, line 15. Another exemplary embodiment of query search is described in U.S. patent application Ser. No. 12/772,566 filed May 3, 2010, FIGS. 10-13, and page 40, line 7 to page 45, line 14. A further exemplary embodiment of query search is described in U.S. patent application Ser. No. 12/788,796 filed May 27, 2010, FIGS. 3-10, and page 13, line 3 to page 43, line 2. Modifications of the above illustrative approaches or other approaches may be employed consistent with the teachings of the present invention.

The following discussion now focuses on further details of the search system. First a search system composed of a single server is described. Later a multi-server search system is described.

A single search server has two main databases that store video fingerprints of reference videos. Each fingerprint is a string of bits of specified length and associated metadata such as the frame number, video name, type of the signature and the like. The fingerprint may also contain the compact cluster key. A cluster key is a string of bits of smaller length than that of the main fingerprint. A cluster key can be generated at the search server using a hashing algorithm. A single search server may use a predefined hashing algorithm to generate a cluster key for a given reference signature.

Figure 3A:
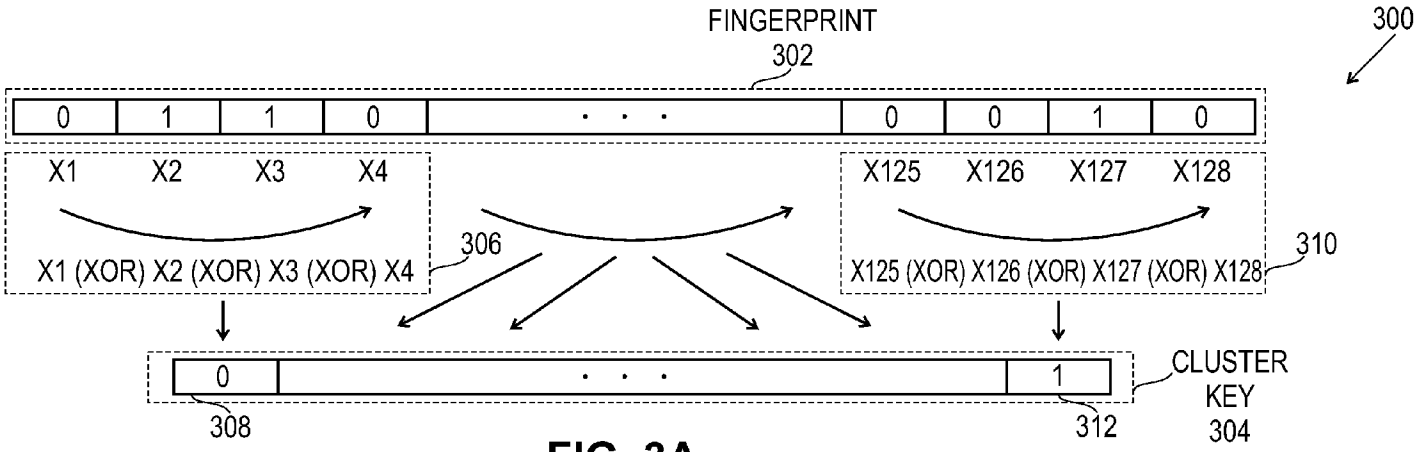
FIG. 3A illustrates an exemplary cluster key generation from a media fingerprint in accordance with present invention.

An example cluster key generation process 300 is presented in FIG. 3A. In the example, a fingerprint 302 is shown having 128 bits and a generated cluster key 304 is shown having 32 bits. For every four bits from the fingerprint 302, one bit of the cluster key 304 is generated using an XOR operation on all of the four bits. Specifically, bit number one 308 in the cluster key 304 is obtained by performing XOR operation 306 on bits x1, x2, x3 and x4 from the fingerprint 302. In similar manner, the thirty second bit 312 in the cluster key 304 is obtained by performing XOR operation 310 on bits x125, x126, x127 and x128 from the fingerprint 302.

Figure 3B:
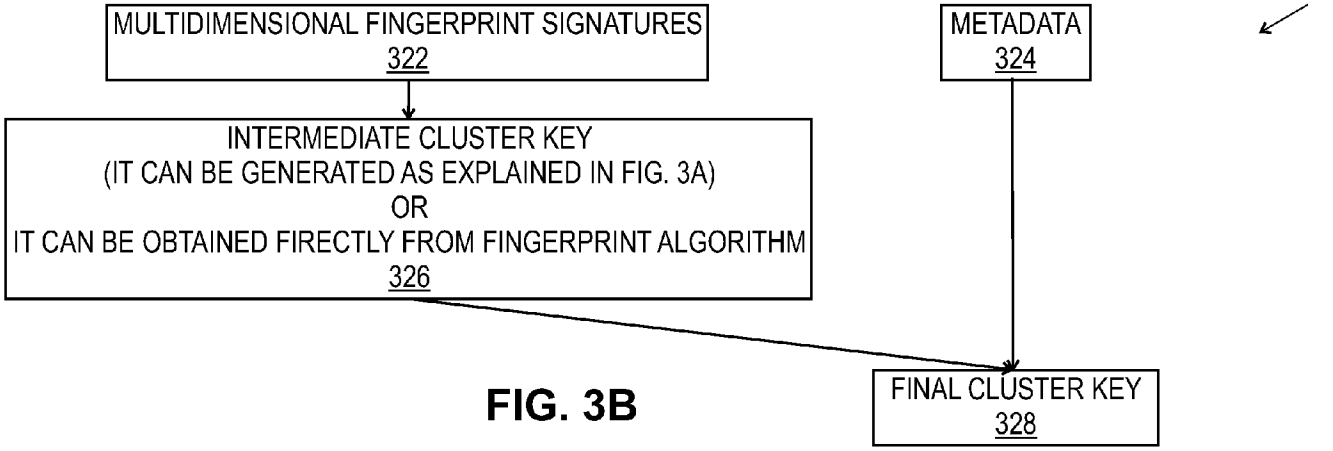
FIG. 3B illustrates an exemplary process to generate a cluster key using metadata information in accordance with the present invention.

The generated cluster key 304 can be modified using other information such as metadata associated with this fingerprint 302. FIG. 3B depicts a process 320 that uses metadata information at step 324 to modify an intermediate cluster key at step 326. The intermediate cluster key at step 326 is generated by applying a hashing algorithm such as the cluster key generator process 300 to a fingerprint obtained at step 322. The intermediate cluster key at step 326 obtained in this process can modified by appending more bits to the metadata obtained at step 324. For example, the intermediate cluster key at step 326 can be appended with eight more bits to form a final cluster key at step 328. that uniquely distinguishes categories of multimedia content. For example, "binary 00000001" may indicate a basketball game and "binary 00000010" may indicate a "baseball" game. The binary numbers 00000001, 00000010 are predefined to represent specified categories. The intermediate cluster key at step 326 can also be modified using metadata obtained at step 324. For example, the eight bits, that identify the TV channel associated with this reference multimedia, can replace the last eight bits of the cluster key.

Figure 3C:
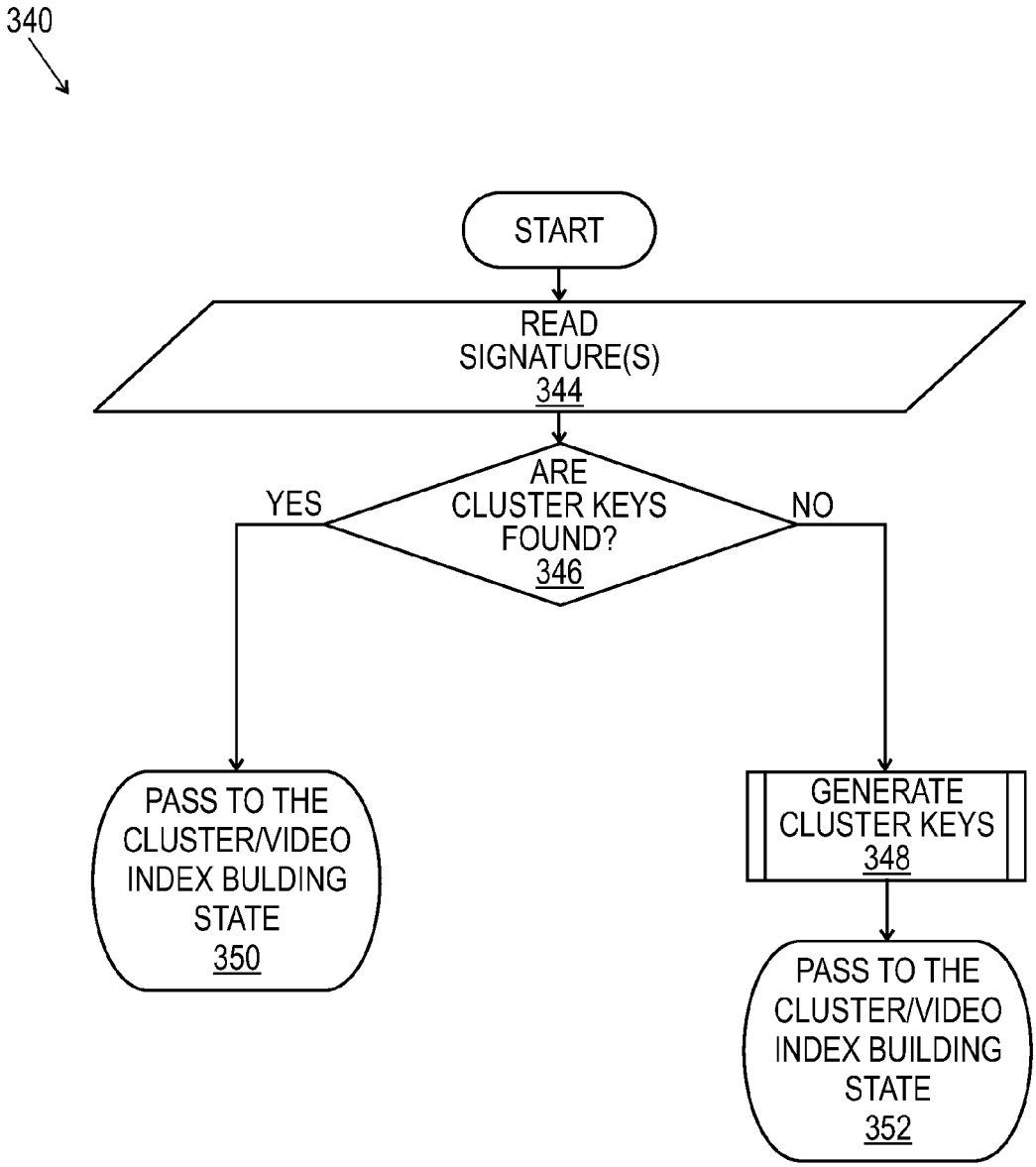
FIG. 3C illustrates an exemplary process to generate a final cluster key in accordance with the present invention.

FIG. 3C presents a process 340 to decide whether to generate a final cluster key at the search server. At block 344, the search server reads all the fingerprints for a given unit of multimedia content, such as a clip of a video. At decision box 346, a determination is made whether the signature data contains cluster keys. If cluster keys are found then the signature data is passed directly to block 350. At block 350, a cluster index and a multimedia signature index are built. If cluster keys are not present, the process 340 proceeds to block 348. At block 348, cluster keys are generated as described in the process 320. The generated cluster keys are then passed to the next state at connector 352.

Figure 4A:
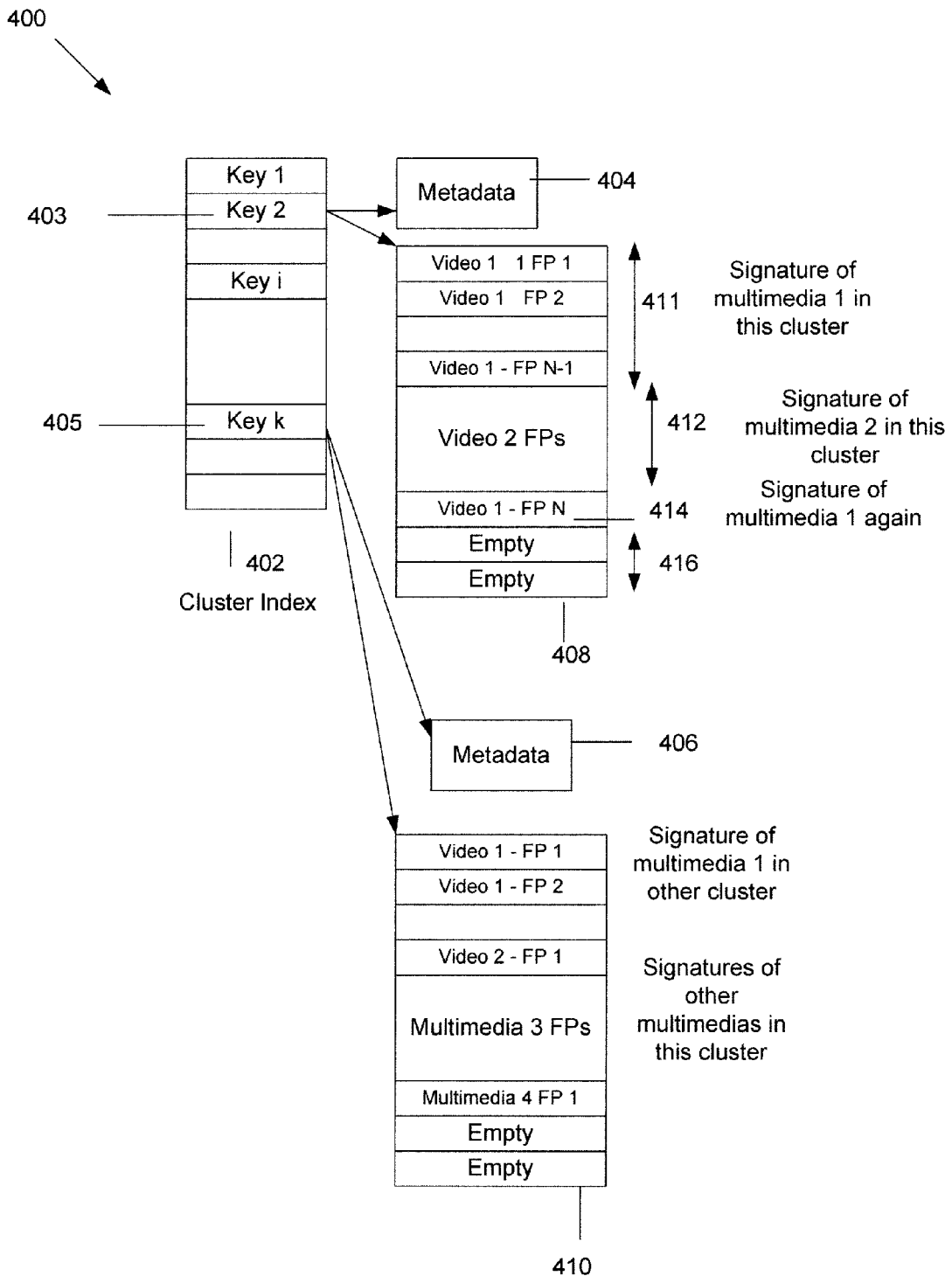
FIG. 4A illustrates an exemplary primary cluster index link structure using the cluster keys, fingerprints, and metadata in accordance with the present invention.
Figure 4B:
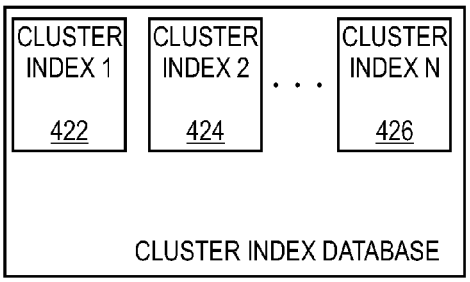
FIG. 4B illustrates an exemplary multiple cluster index database in accordance with the present invention.
Figure 4C:
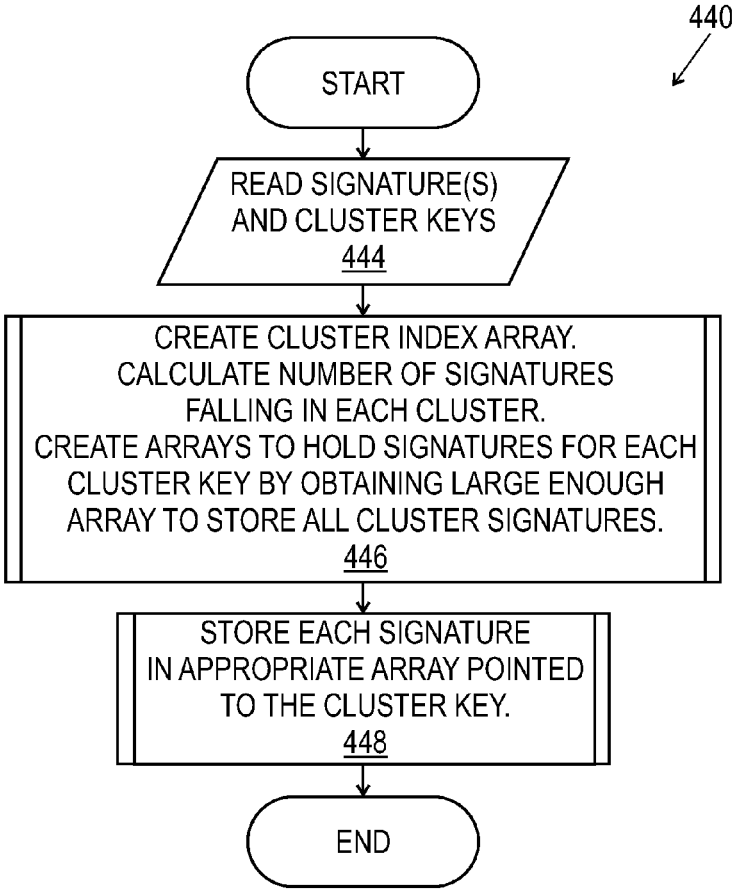
FIG. 4C illustrates a process to create a cluster index structure in accordance with the present invention.

The single search server system continues with the creation of the cluster index in reference to FIGS. 4A, 4B, and 4C. When the search server starts, at block 344 of FIG. 3C, it reads all the fingerprint data for all of the units of reference multimedia content that need to be loaded at this search server. The search server then builds a cluster index and the multimedia signature index from the fingerprint data as described below.

Briefly, fingerprints having the same cluster key are grouped and stored together in an array. The beginning of this array is then indexed using the associated cluster key. Metadata of each signature along with the actual signatures are also stored in this array. Signatures from a single video are stored preferably consecutively in one chunk though alternative methods of storing are not precluded.

A cluster index is an associated array that maps a cluster key to the array of signatures associated with that cluster key. Each entry in the cluster index may also include other metadata information such as the number of signatures associated with this hash entry, list of the videos that have some signatures associated with this hash entry and the like.

FIG. 4A illustrates an exemplary primary cluster index structure 400 built using the cluster keys, fingerprints and metadata. The cluster index structure 400 shows details of two clusters 408, 410 that are accessed using key 2 403 and key k 405 within the cluster index array 402. Accessing link references stored at the key 2 403 in the cluster index 402 provides access to metadata 404 and also to the array of signatures 408 associated with this cluster key 2 403. In this example, the array of associated signatures 408 stores the signatures of various videos having the same cluster key 2 403. A consecutive block 411 of signatures 1 to N−1 corresponds to a subset of signatures from video 1 having cluster key 2 403. These signatures are followed by another block 412 of signatures associated with video 2 after which there is single signature 414 of video 1 again and two empty spaces 416 to hold two more signatures of any other video. Similarly, key k 405 has a link reference to metadata 406 and also to an array of associated signatures 410. Video 1 and video 2 are shown to have fingerprints in this array 410 as well.

It is not necessary to have only a single cluster index. FIG. 4B shows a multiple signature index database 420 that can be built if there are different types of signatures. Each type of signature would be placed in a corresponding cluster index such as cluster index-1 422, cluster index-2 423, and including up to cluster index-N 426. For example, if two different algorithms are used to generate fingerprints, two cluster indexes, one for each type of fingerprint, could be created. Use of multiple cluster indexes can improve identification, reduce false positives and improve the speed at which video identification is performed. Multiple cluster indexes may also be built from a single type of signature with multiple different cluster keys. In such cases each cluster index would be built from a particular type of cluster key.

FIG. 4C shows a process 440 for creating a cluster index structure. At block 444, the signatures from the units of multimedia content to be loaded at this search server are read and the cluster keys are generated if not already available. At block 446, a cluster index array is created. For each cluster key, the number of signatures falling in each cluster are calculated, and an array with enough space to store all these signatures in each cluster is obtained. At block 448, each signature is placed in an appropriate array associated with the cluster key of this signature.

Figure 5A:
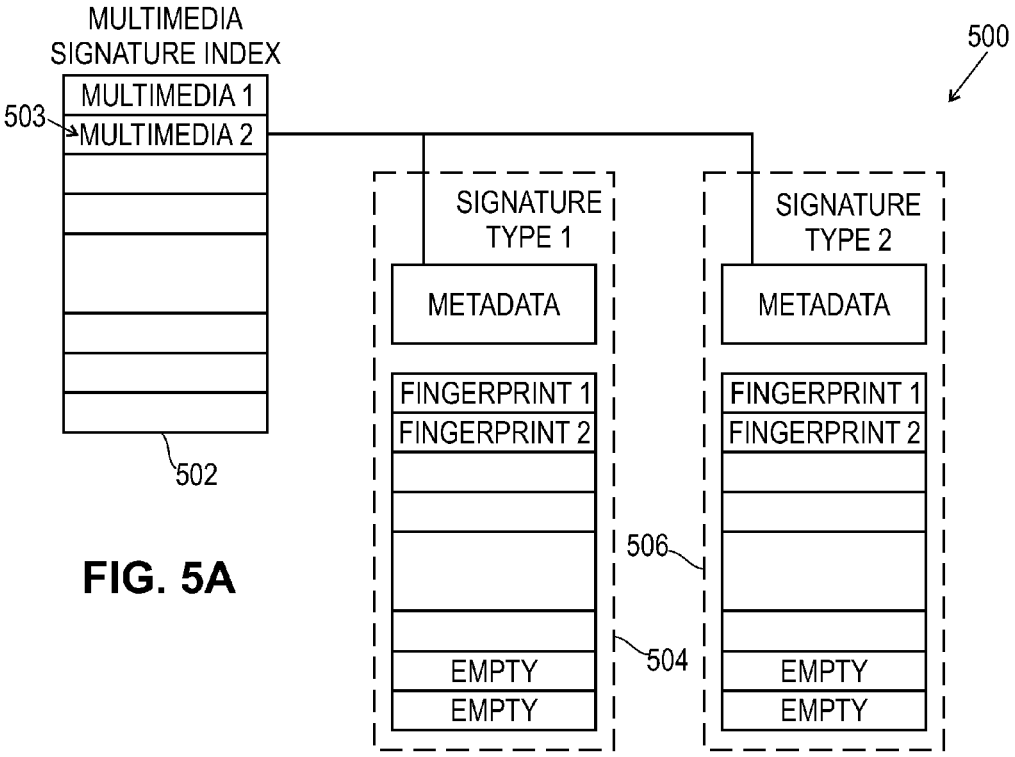
FIG. 5A illustrates an exemplary signature database organized by multimedia ids that are used as multimedia signature indexes to fingerprint arrays in accordance with the present invention.
Figure 5B:
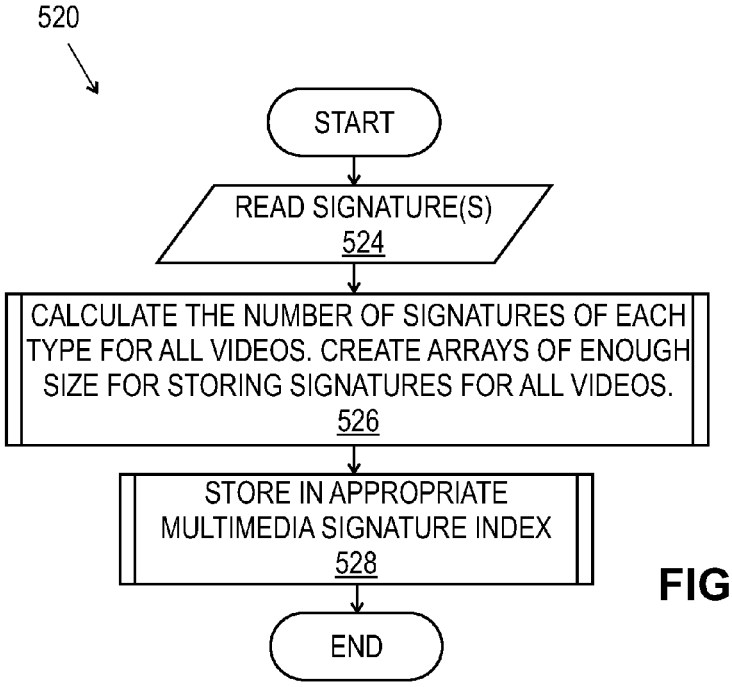
FIG. 5B illustrates a process to create a multimedia signature index in accordance with the present invention.

The single server search system continues with the creation of the multimedia signature index in reference to FIG. 5A, and FIG. 5B. For each unit of multimedia content that is to be included in the reference database, an array or arrays of fingerprints associated with that video is created. A multimedia signature maps a multimedia content id to the fingerprint array associated with that multimedia identification (id). As an example, FIG. 5A depicts an exemplary multimedia signature index organization 500 based on multimedia ids. Two fingerprint arrays 504, 506 are associated with multimedia id 2 503. Each fingerprint array 504 and 506 is allocated for one particular type of fingerprint.

FIG. 5B illustrates a process 520 to build a multimedia signature index organization as described with regard to FIG. 5A. At block 524, the signatures are read. At block 526, the number of signatures of each type is calculated for the multimedia content to be stored in the database. Also at block 526, arrays of appropriate size to store these signatures are allocated. At block 528, the signatures are placed in a corresponding array. In these signatures arrays, the signatures are preferably arranged in increasing timestamp order.

Figure 5C:
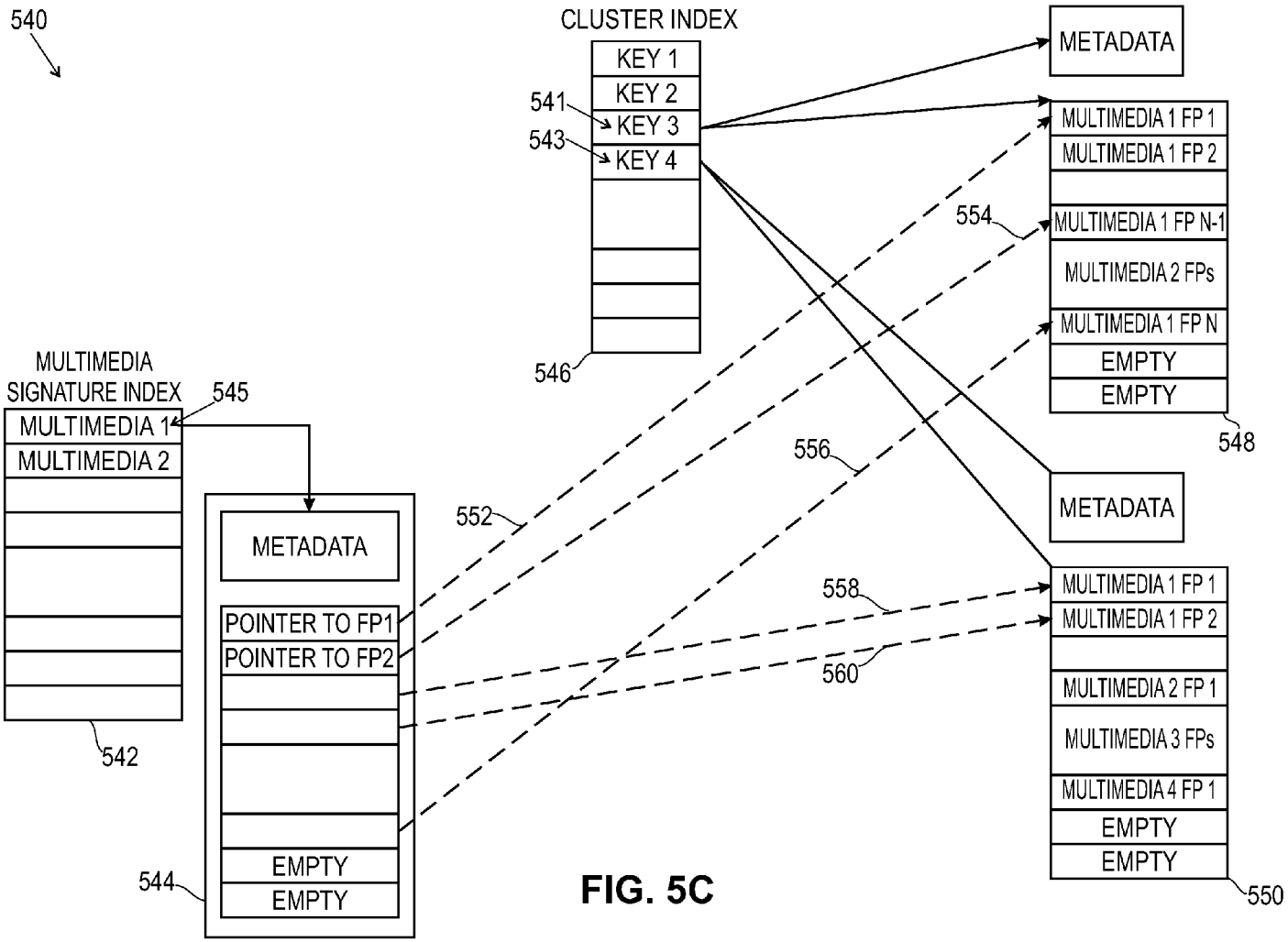
FIG. 5C illustrates a data sharing organization that is configured with an exemplary cluster index and multimedia index data structure that supports sharing multimedia fingerprints in accordance with the present invention.
Figure 5D:
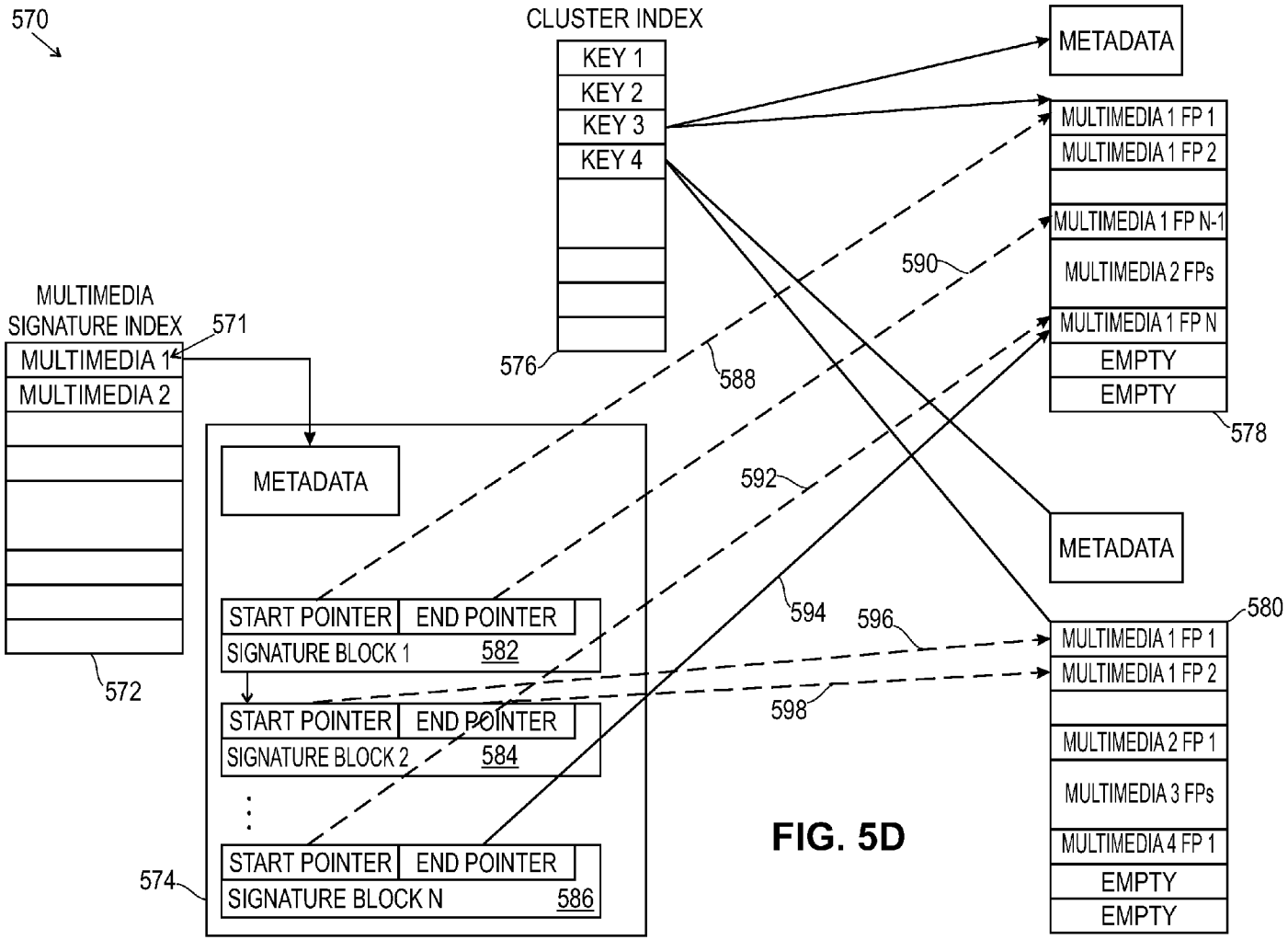
FIG. 5D illustrates another exemplary cluster index and multimedia index data structure that supports sharing multimedia fingerprints in accordance with the present invention.

In the single server search system, signature sharing is illustrated between cluster indexes and multimedia signature indexes in FIGS. 5C and 5D. Returning to FIGS. 4A and 5A, signatures along with their associated metadata are stored separately in the cluster index 400 and multimedia signature index organization 500. Signatures can also be shared across these two data structures by sharing link references. Such sharing would reduce memory capacity requirement to store the same amount of reference database and thus increase the capacity of the reference database for new contents. A number of advantageous ways of sharing signatures across these two data structures are described in more details below.

In a first approach, shown in FIG. 5C, a multimedia signature index stores a link reference to signatures in a cluster index data structure. FIG. 5C illustrates a data sharing organization 540 that is configured with an exemplary cluster index 546 and multimedia signature index 542 that supports sharing fingerprints in accordance with the present invention. In FIG. 5C, the cluster index 546 is shown with details for two cluster keys, key-3 541 and key-4 543. Key-3 541 is shown with a link reference to fingerprint array 548 and key-4 is shown with a link reference to the fingerprint array 550. The multimedia signature index 542 illustrates an entry 547 reference for multimedia-1. The signature array 544 referenced by the multimedia-1 entry 547 stores link references for link paths 552, 554, 556, 558, 560 to the associated signatures within the fingerprint arrays 548 and 550 associated with the cluster index 546.

FIG. 5D illustrates another exemplary cluster index and multimedia index data structure 570 that supports sharing multimedia fingerprints in accordance with the present inventions. In this approach, multimedia signature index 572 maintains a list of "start and end pointers" in a signature array 574 to signatures in fingerprint arrays 578 and 580 associated with cluster index 576. The cluster index 576 illustrates the details for key-3 and key-4 with the associated fingerprint arrays 578 and 580. The multimedia signature index 572 is shown with the details of the signature array 574 that stores entries for various multimedia signature arrays, such as entry 571 for a unit of multimedia content, multimedia 1. The signature array 574 is a linked list of entries, such as entries 582, 584, 586, that hold start and end pointers to different signature blocks in the fingerprint arrays 578 and 580. For example, linked list entry 582 holds start pointer 588 and end pointer 590, linked list entry 584 holds the pointers 592 and 594 and linked list entry 586 holds the start pointer 596 and end pointer 598.

Figure 6A:
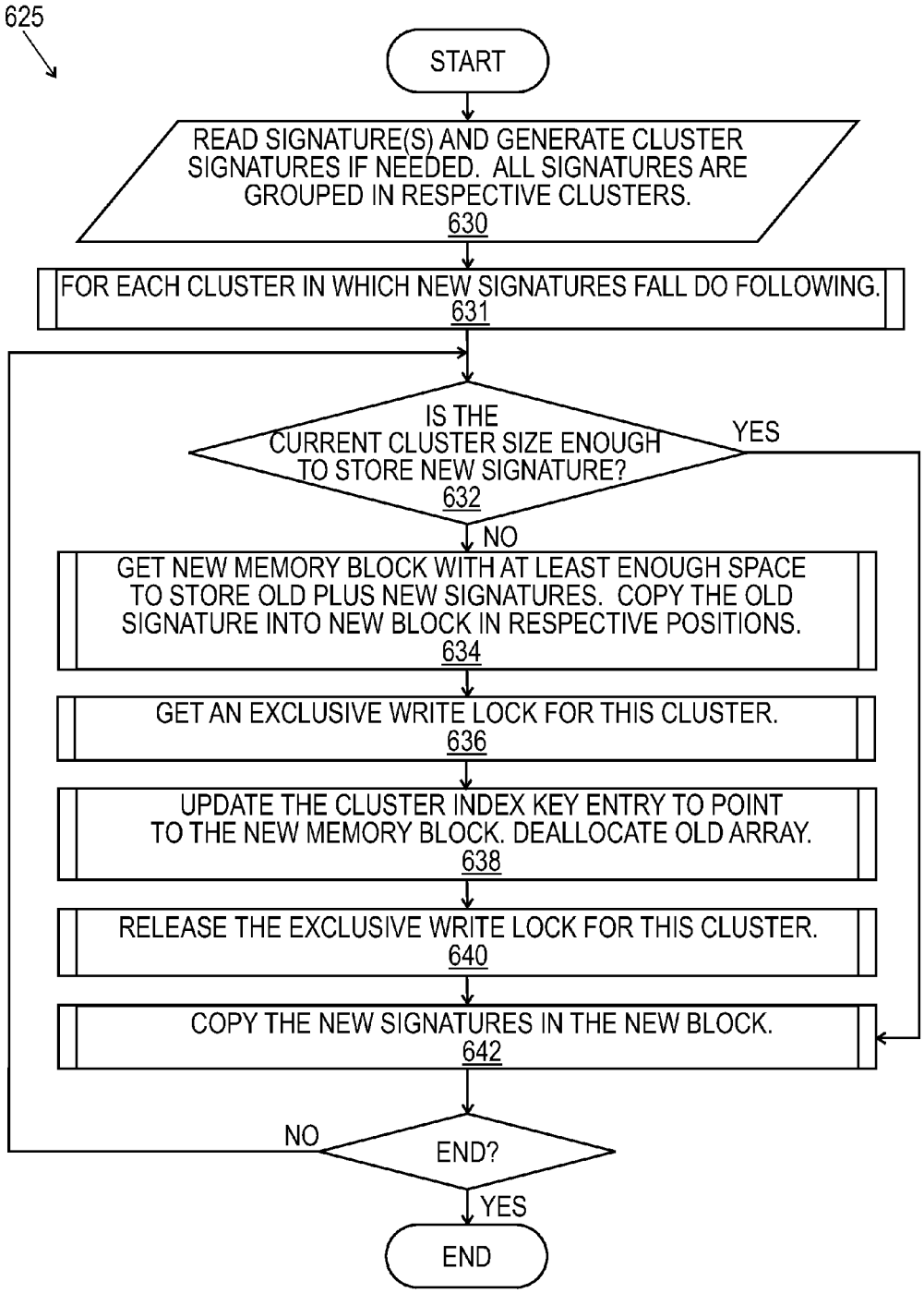
FIG. 6A illustrates a process for updating a cluster index structure when fingerprints for a new multimedia content are received in accordance with the present invention.

FIG. 6A illustrates a process 625 for updating a cluster index structure when fingerprints for a new unit of multimedia content are received in accordance with the present invention. While the search server is actively running multimedia identification operations, the reference database might have to be updated by adding fingerprints for new units of multimedia content. Updating a reference database has two main components. The first component is to update the cluster index and the second component is to update the multimedia signature index.

In FIG. 6A, at block 630, the signatures are read. Cluster keys for all signatures are also read or calculated in the same step. At block 632, the signatures are grouped according to the cluster key and a loop is prepared in which the following steps 634-642 are repeated for each cluster and for each signature in the cluster. Also, the number of new signatures falling in a cluster is determined in the loop. Using that information at decision block 632, it is determined if the current cluster size, which is the size of the signature array associated with the cluster key, is large enough to store the additional new signatures. If enough space is available, the process 625 proceeds to block 642 and new additional signatures are copied into the signature array, for example, at the end following the last of the original signatures. The associated metadata, such as the number of fingerprint entries in this array associated with that cluster index entry is also modified to reflect the changes made. At decision block 644, it is determined whether each cluster and each signature in the cluster has been processed. If more processing is to be done, the loop returns to the decision block 632.

At decision block 632, if enough space is not available to store the new signatures the process 625 proceeds to the block 634. At block 634, a new array, sufficient to hold the original number of signatures in that particular cluster as well as the new additional signatures to be added into this cluster is obtained from the system. Also at block 634, the original signatures from the old array are copied into the newly obtained array. At block 636, an exclusive write lock on the newly established cluster index is obtained. At block 638, a pointer from the cluster index array for this cluster entry is modified to point to the new array. The old array is de-allocated and returned to operating system. At block 640, the exclusive write lock on the original array is released. At block 642, the new signatures are added to the newly established array since it has enough space to store additional signatures. The process 625 returns to the decision block 632. At decision block 644, it is determined whether each cluster and for each signature in the cluster has been processed. If more processing is to be done, the loop returns to the decision block 632.

Figure 6B:
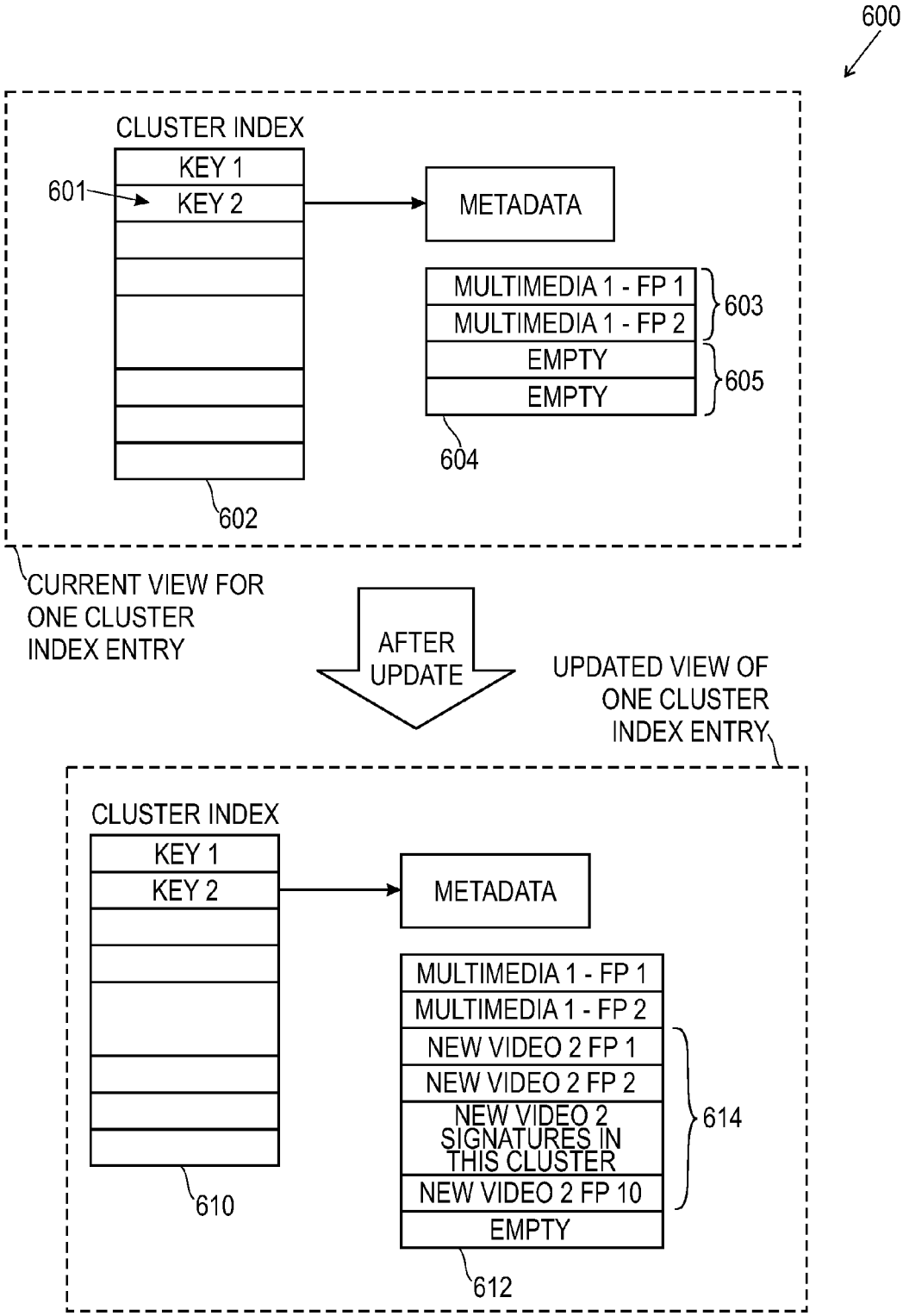
FIG. 6B illustrates an exemplary state diagram showing a cluster index structure before and after an update that added fingerprints for a new multimedia in accordance with the present invention.

FIG. 6B illustrates an exemplary state diagram 600 showing a cluster index structure before and after an update that added fingerprints for a new unit of multimedia content in accordance with the present invention. Before the update, cluster array 604 associated with key 2 601 has space to store four signatures. The first two entries 603 are from multimedia 1 and the last two spaces 605 are empty. When an update for video 2 is received, a calculation determines that there are 10 signatures that need to be added to cluster signature array 604 with key 2 601. As the array size associated with cluster array 604 with key 2 601 is only four, it cannot accommodate all of the new signatures. Hence an array of size greater than 12, based on old signature count plus 10 new signature count, is allocated. In the example, the new array size is 13. After the update, the cluster array 612 has 13 spaces to store the signatures. The first two spaces are of multimedia 1, the next 10 signatures 614 are the newly added multimedia signatures and the last one space is empty. Rather than obtain an exclusive write lock for each cluster separately, an exclusive write lock can be obtained for a plurality of clusters that need a reallocation because of insufficient space.

Figure 6C:
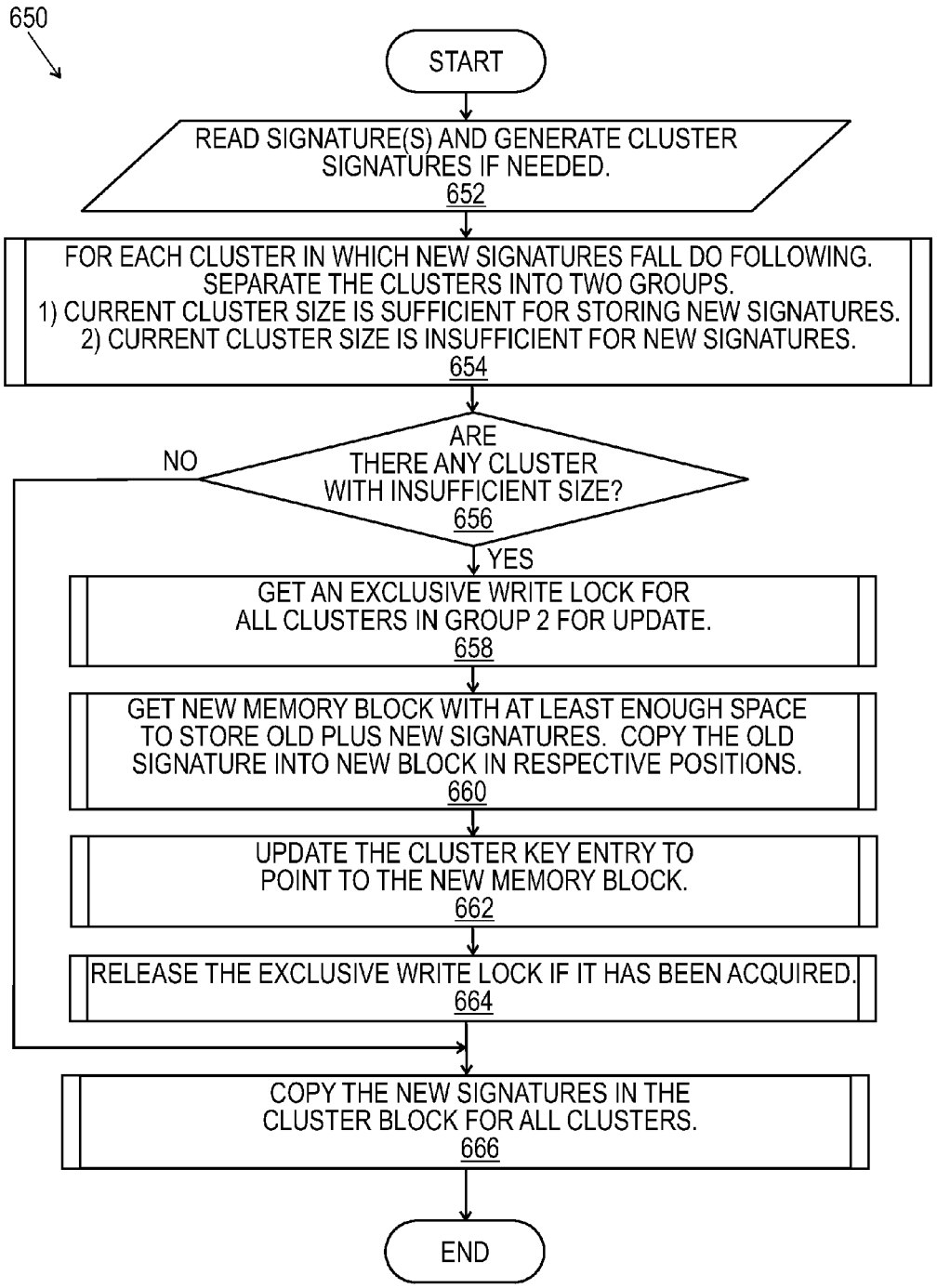
FIG. 6C illustrates a process for updating the cluster index structure where an exclusive cluster lock is obtained for all of the clusters that need more space for new signatures in accordance with the present invention.

FIG. 6C illustrates a process 650 where such an exclusive lock is obtained for all clusters that need more space for the new signatures in accordance with the present invention. The process 650 is similar to process 625. The process at block 654 makes similar calculations as in process and decision block 632 in FIG. 6A. The only difference being instead of performing these calculations and actually updating each cluster separately, calculations for all the clusters are done together in the process at block 654. Then, instead of acquiring an exclusive lock for each cluster as shown in the process 636 in FIG. 6A, at block 656 and block 658, an exclusive lock is obtained for all clusters with insufficient size. An actual update process described by blocks 660, 662, 664, and 666 of FIG. 6C operates in a similar manner as described in blocks 636, 638, 640 and 642 of FIG. 6A. The process blocks 656-666 are repeated if further processing of clusters is required.

A suitable method to update the multimedia signatures index is similar to the process described in regard to FIGS. 5A and 5B.

Figure 7A:
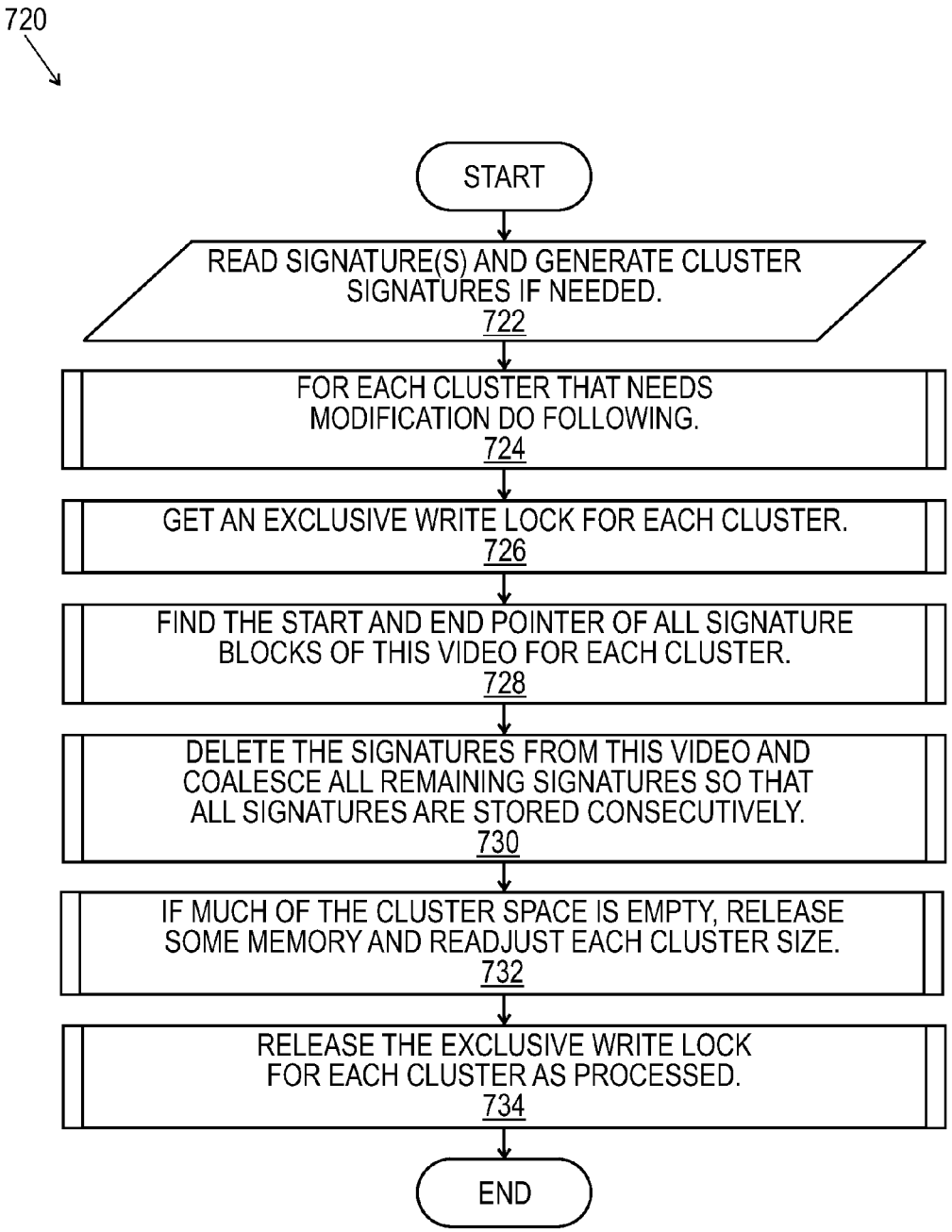
FIG. 7A presents a process for updating cluster index structure to remove fingerprints associated a multimedia content to be deleted in accordance with the present invention.
Figure 7B:
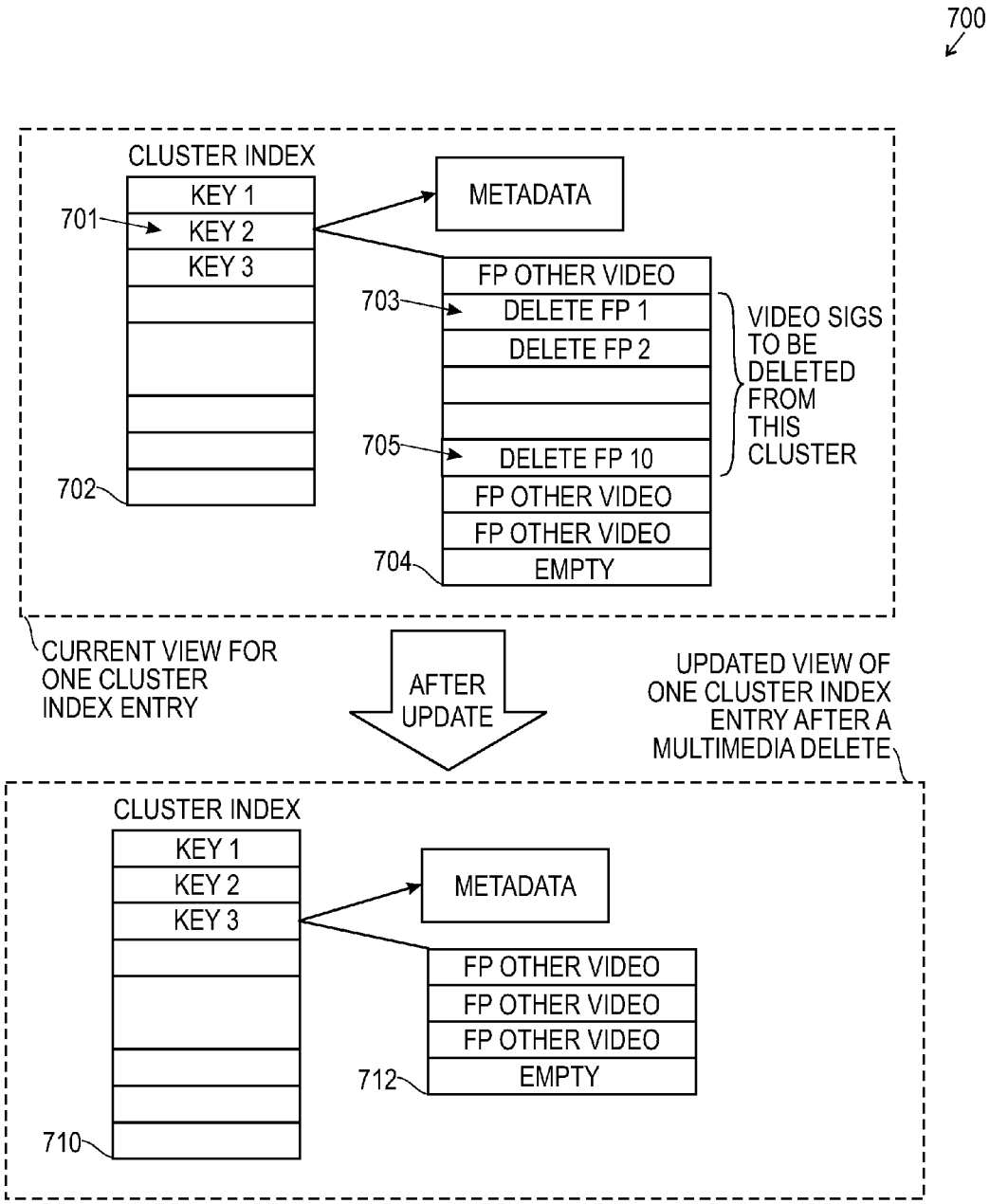
FIG. 7B illustrates an exemplary state diagram showing a primary index structure before and after deleting fingerprints for multimedia content to be deleted in accordance with the present invention.

While the search server is actively running multimedia identification operations, the reference database can be updated by removing a multimedia content from it. Updating the reference database by deleting fingerprints has two main components. The first component is to update a cluster index by removing signatures associated with the associated video. The second component is to update the multimedia signature index by removing the signatures associated with the associated video. FIG. 7A illustrates a process 720 for updating cluster index structure to remove fingerprints associated a multimedia content to be deleted in accordance with the present invention. FIG. 7B illustrates an exemplary state diagram 700 showing a primary index structure before and after deleting fingerprints for a unit of multimedia content to be deleted in accordance with the present invention.

In process 720 of FIG. 7A, a new request to delete a unit of multimedia content from the reference database is received. At block 722, a list of the cluster index entries that have at least one signature associated with this unit of multimedia content to be deleted is prepared. For example, if the original signature data file is available, then the data file can be read and a cluster index entry list can be created using the data that was read. Also, a multimedia signature index structure can be read to obtain the signature and cluster key data and from such information a list of cluster index entries can be prepared. In addition to the above approaches, metadata associated with each cluster could be read to check for presence of the multimedia content to be deleted. From this metadata information, a list of cluster index entries can be prepared. Further, all of the cluster index entries and associated signatures may be examined to prepare such a list.

At block 724, each cluster in this list that needs modification is determined. At block 726, an exclusive read-write lock is obtained for each cluster. Note that the exclusive write lock can also be acquired for plurality of clusters that need the modification at once. At block 728, a calculation is made for start and end positions of all signatures blocks associated with the unit of multimedia content. Thus, in the state diagram 700, for the cluster associated with key 3 701, the start and end positions of the signature block to be deleted is determined to be entry 2 703 up to and including entry 11 705. At block 730, the signatures to be deleted are removed and all of the signatures that follow this block are shifted according to the space of the signatures that are removed so as to coalesce the signatures before and after the block to be deleted. Thus, after the removal is completed, all active signatures are stored consecutively. In the state diagram 700, 10 signatures are removed for the cluster associated with key 3 701 resulting in a reduced signature array 712. The signatures that are deleted in this way can be moved to the end of signature array and marked as deleted. This approach will enable the deleted content to be rapidly readded into reference database if ever needed. At block 730, metadata associated with the cluster is also updated to reflect the new number of signatures and multimedia contest present in this cluster.

As a result of operations at block 730, at the block 732, the signature array-size that holds the signature is optionally and dynamically adjusted to free up some of the memory. In the state diagram 700, the cluster array 712 with key 3 701 now has only three active signatures after deleting 10 signatures associated with the unit of multimedia content that was deleted. The total size of array 704 before deletion was 14 out of which only 3 signatures remain after deletion in the array 712. Hence the array size is dynamically readjusted by reallocating the array or by returning the extra space for 10 signatures. After this operation, the size of array 712 becomes 4. At block 734, the exclusive write is released 734. If further clusters need modification, the process 720 returns to block 726.

Figure 7C:
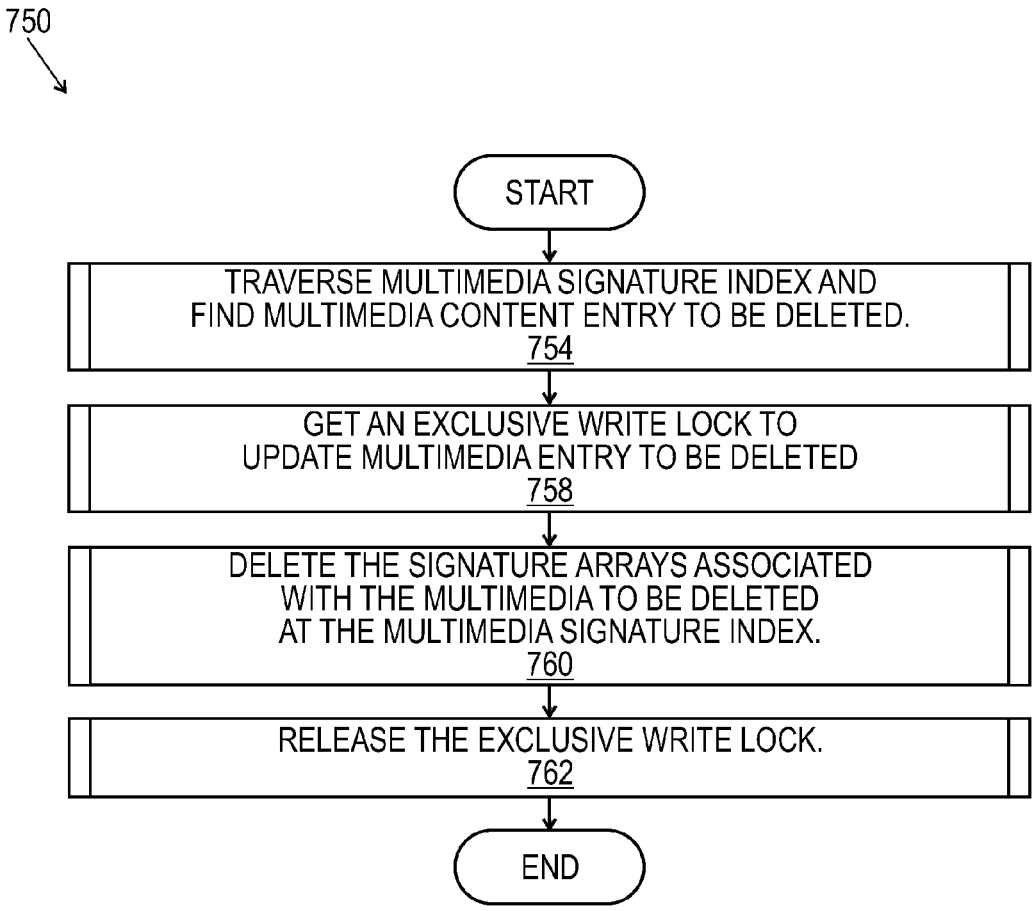
FIG. 7C illustrates a process to delete fingerprints from the multimedia index in accordance to the present invention.
Figure 7D:
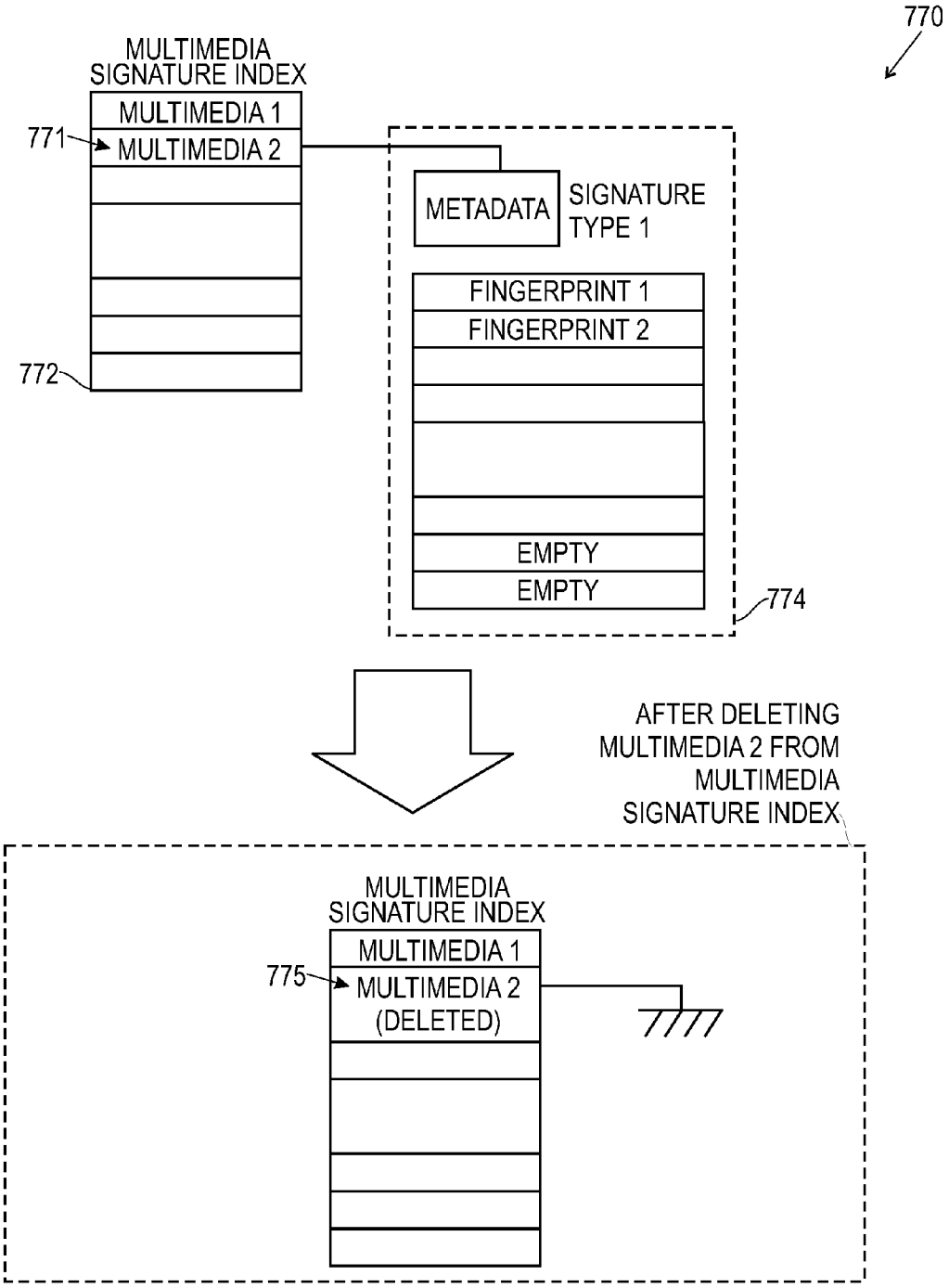
FIG. 7D illustrates an exemplary state diagram that shows the multimedia signature index structure before and after content has been deleted from it according the present invention.

FIG. 7C illustrates a process 750 to delete fingerprints from the multimedia signature index (MSI). The following actions are taken to delete a video from the multimedia signature index. At block 754, the multimedia signature index is traversed to find the multimedia content entry to be deleted. At block 758, an exclusive write lock is acquired to update the multimedia signatures index. At block 760, the signature array associated with this multimedia content is deleted and the memory is returned to the operating system. Instead of removing the multimedia entry, that entry in the multimedia signature index can simply be marked as deleted or inactive. At block 762, the exclusive write lock is released. FIG. 7D illustrates an exemplary state diagram 770 that shows the multimedia signature index structure before and after content has been deleted from it according the present invention. The multimedia signature index 772 holds a reference pointer to the data structure 774 holding a signature array along with metadata information for the multimedia id 2 771 before a deletion operation deletes multimedia id 2. When a request to delete multimedia 2 is processed, the multimedia 2 entry 775 in the multimedia signature index is marked as deleted, and the pointer to the data structure that holds the metadata and signature array is freed.

Figure 8A:
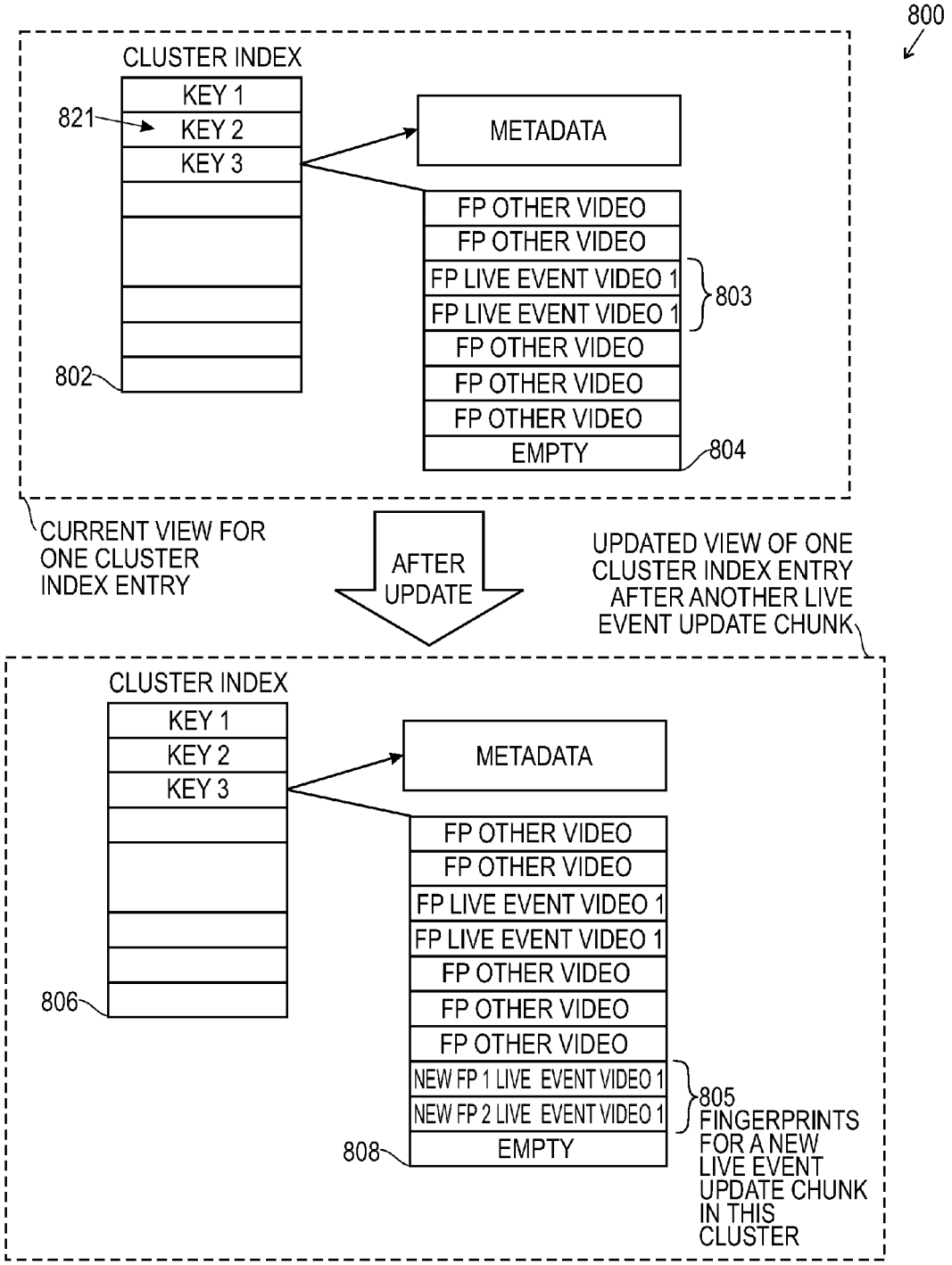
FIG. 8A illustrates an exemplary state diagram showing a cluster index structure before and after an intermediate live event update for a portion of a multimedia content in accordance with the present invention.
Figure 8B:
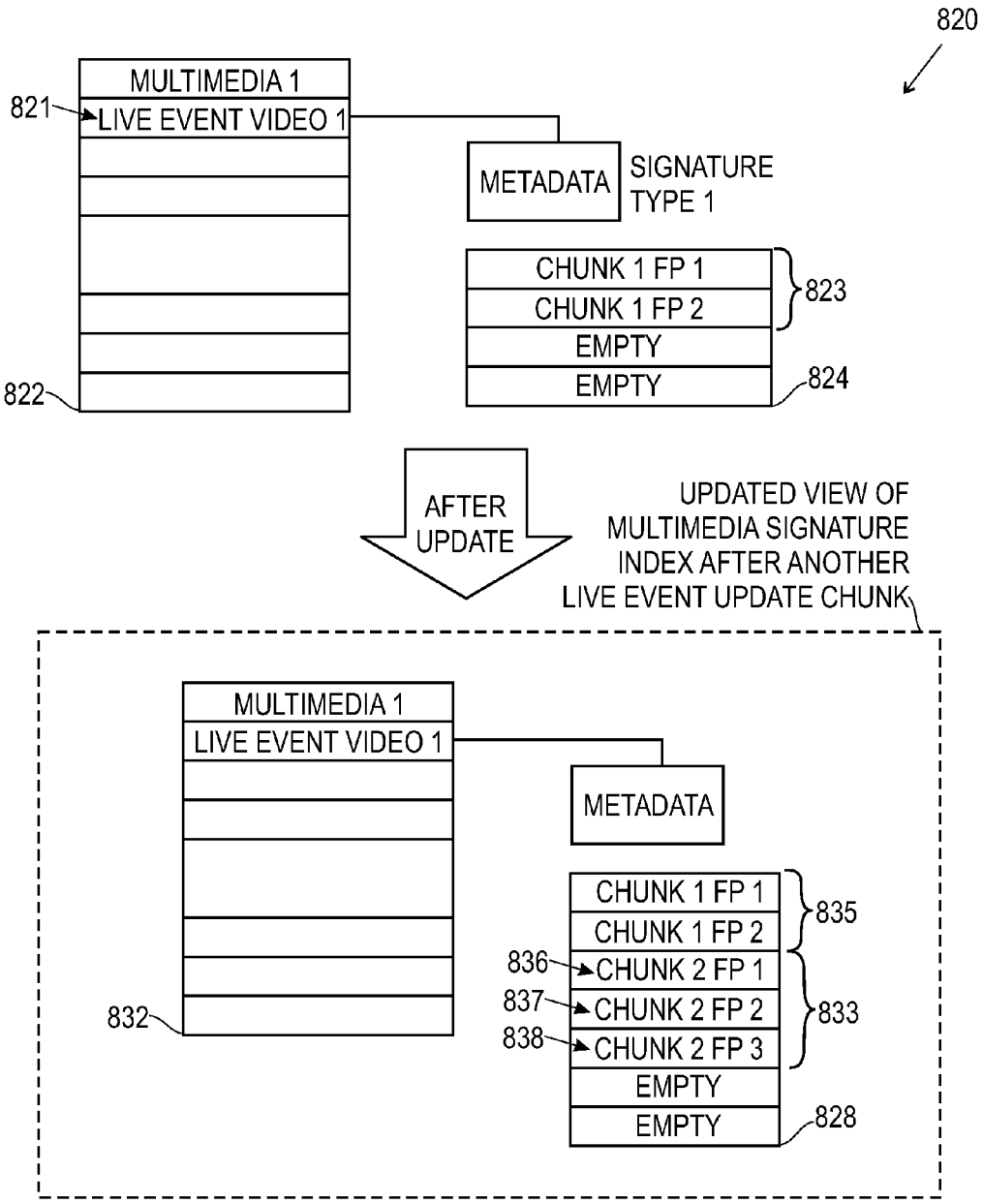
FIG. 8B illustrates an exemplary state diagram showing a multimedia index structure before and after an intermediate live event update for a portion of multimedia content in accordance with the present invention.
Figure 9:
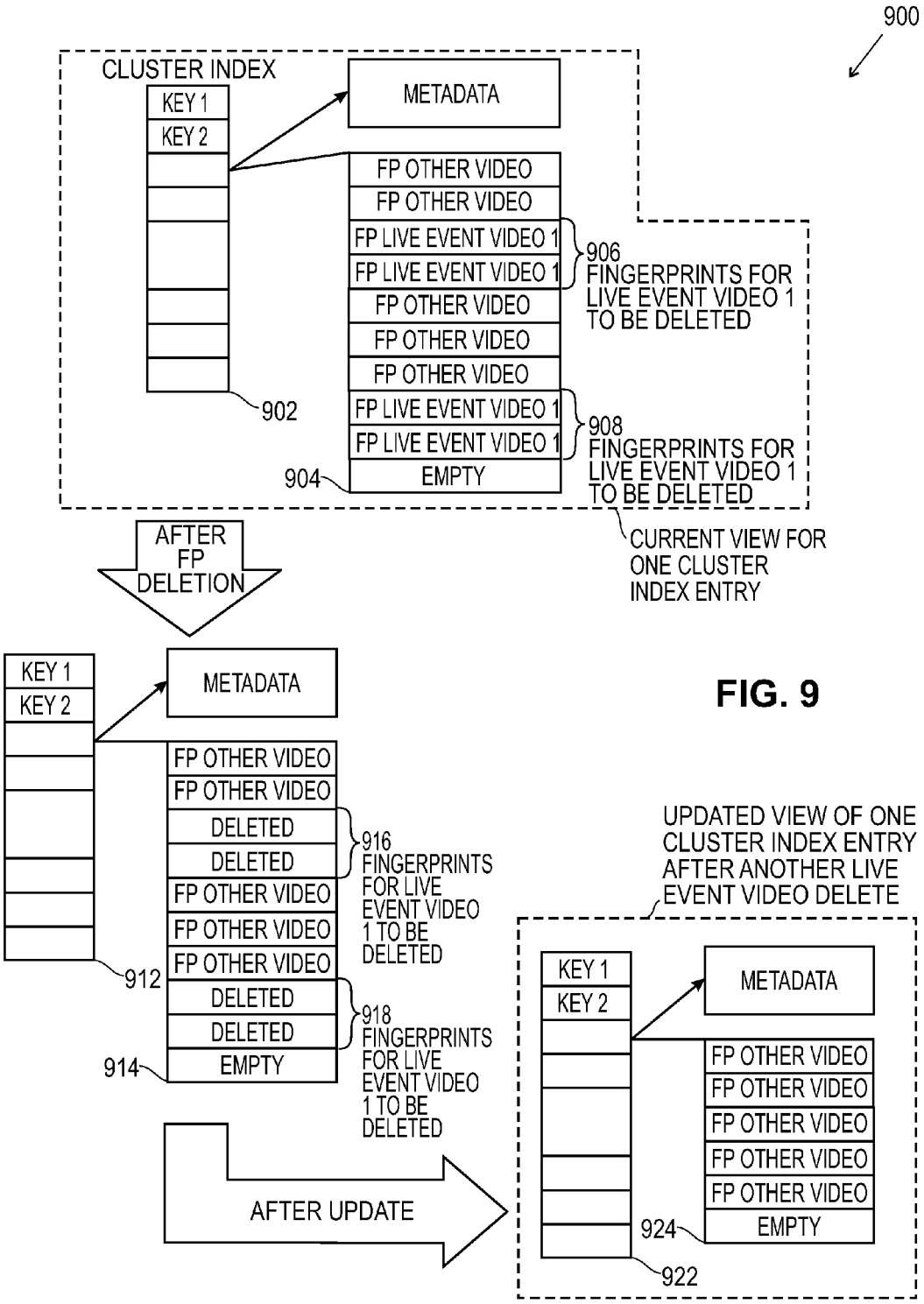
FIG. 9 illustrates an exemplary state diagram showing a cluster index structure before and after deleting a portion of a multimedia content that was previously added using a live event update process in accordance with the present invention.

Some applications need the ability to add a unit of multimedia content that is being currently produced, broadcasted, streamed or displayed. For example, if a video is long then these applications may require an ability to update a reference database with parts of the videos before the end of the video. Updates that are carried out in this fashion are called live event updates. As an example, a 60 minute video may be added into the reference database in three separate update chunks or units each of 20 minutes. Note that multiple devices may request updating the same video with different or overlapping parts of a video. The methods presented here do not depend on a device or a number of devices requesting such an update. FIGS. 8A, 8B, and 9, illustrate aspects of live event updating of a reference database by adding new units of multimedia content in real time.

In a first method for live event updates, each update part of the multimedia content is treated as a separate unit of multimedia content with a different video id. This case is similar to normal multimedia content update described with regards to FIGS. 6A and 6B.

In a second method for live event updates, each new update can be processed by deleting previously added live event updates for this multimedia content and then re-adding a combined update of all of the previous live event update parts and the new live event update part. In this case, deletion of previous live event update parts is performed as described with regard to FIGS. 7A-7D and then the combined update is performed as described with regard to FIGS. 6A and 6B.

In a third method, each update is treated as a part of the same unit of multimedia content. The cluster index and the multimedia signature index are updated accordingly as described with regard to FIG. 8A and FIG. 8B.

FIG. 8A illustrates an exemplary state diagram 800 showing a cluster index structure before and after an intermediate live event update for portions of multimedia content in accordance with the present inventions. In FIG. 8A, each update chunk follows a similar procedure of adding a new unit of multimedia content in the reference database as described in with regard to FIGS. 6A and 6B. However, a strict adherence to the previous process 625 for such additions would make the fingerprint block for live event updated multimedia content non-continuous. After a first update, the signature array 804 for cluster with key 3 801 of the cluster index 802, has a two signature chunk 803 for live event multimedia 1. After a second live event update chunk is processed, the updated signature array 808 has two chunks of signatures, those associated with the chunk 803 and those associated with signature chunk 805 for the live event multimedia 1 in memory. The two signature chunks 803 and 805 are not contiguous. The process to update the cluster index for a live event update is same as the described in FIG. 6A.

FIG. 8B illustrates an exemplary state diagram 820 showing a multimedia index structure before and after an intermediate live event update for a portion of multimedia content in accordance with the present invention. A multimedia signature index stores all of the video signatures in one array. Hence, to store additional signatures for a new live event update chunk, a check is made for enough memory to store additional fingerprints. If enough memory is present, then the new fingerprints for the live event update chunk are added in the fingerprint array associated with the multimedia content. If sufficient memory is not present, more memory is first obtained followed by copying old and new fingerprints into a new array. Before the current update is processed, the signature array 824 associated with the live event multimedia 1 821 of the multimedia signature index 822, has two signatures 823 from the first update. The size of the signature array 824 is four. After the update is processed the signature array 828 has three more signatures 833 from the second update along with the two signatures 835 from the first update, making the total number of signatures equal to five. Because there was not enough space to store all of the five signatures in the original signature array 824, a new signature array 828 allocation is made to increase the array capacity to hold five or more signatures. In this case, the allocation size was seven so two signature spaces remain empty. Note that the chunk 2 signature-3 838 has a different cluster key than that of FP-1 836 and FP-2 837 from chunk 2, hence in FIG. 8A in an exemplary cluster index structure, the signatures associated with cluster key 3 801 do not contain chunk 2, signature 3.

Figure 8C:
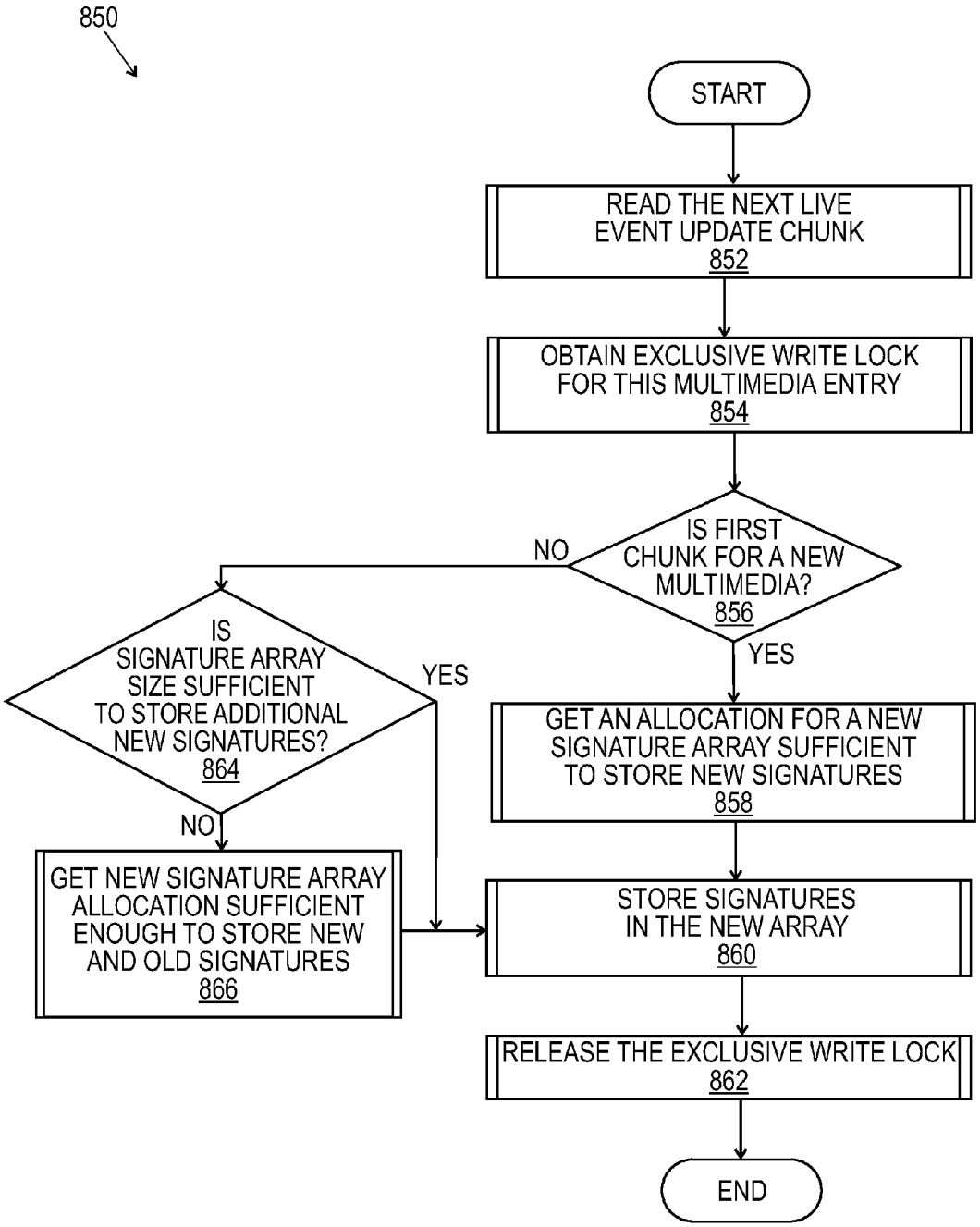
FIG. 8C illustrates an exemplary process to update the multimedia signature index for a live event update in accordance with the present invention.

FIG. 8C illustrates an exemplary process 850 to update the multimedia signature index for a live event update in accordance with the present invention. When a new live event update request is received, it is first read to receive all the new signatures at step 852. Then an exclusive write lock is obtained on the multimedia index entry to be updated in the multimedia signature entry at step 854. A determination is made at step 856 whether the received live event update chunk is the first for the requested live update multimedia update. If this is indeed a first chunk, then at step 858 a new storage allocation large enough to store the new signatures is made. The signatures from the chunk are stored in timestamp order in this signature array at step 860 and at step 862 the exclusive lock is released. At decision box 856, a determination is made that the live event update request is not the first, then another determination at decision box 864 is made about the size of the already existing signature array. If the size of the existing signature array is sufficient to store the new signatures in addition to the existing ones, the process goes to step 860. If the size is not sufficient, then a new signature array storage allocation sufficient to hold old and new signatures is made at step 866. The process then proceeds to step 860.

Note that the process of updating the cluster index and multimedia signature index due to a new live event update request does not depend on the source of the update request. Thus, a first update chunk request of a live event may come from a one source, a second update chunk request of a live event may come from another source and a third update chunk request may come from even different source. Thus, the search server is oblivious to the source of these live event update requests.

FIG. 9 illustrates an exemplary state diagram 900 showing a cluster index structure before and after deleting a portion of multimedia content that was previously added using a live event update process in accordance with the present invention. The procedure of deleting a video that has been added to a reference video as a part of the live event update is similar that of deleting any other multimedia content as described with regard to FIG. 7A. One difference is related to the non-consecutive chunks of fingerprints in the cluster index structure which may result from a live event update. In FIG. 9, the state diagram 900 shows an exemplary cluster index 902 with a first signature array 904 before a deletion update and a second signatures array 914 after the deletion update. Before the deletion update, the first signature array 904 contains two chunks of the signatures 906 and 908. When these fingerprints are removed, both the chunks 916 and 918 are first marked for deletion in the signature array 914. Then, other signatures in the signature array 914 are moved so as to occupy the consecutive positions such that the altered signatures array 924 is produced. Note that the first signature array 904 is resized after the deletion update resulting in the signatures organization shown in the signature array 924.

A further aspect of live event updating concerns deleting video from a multimedia signature index. If different live event update chunks of multimedia content are added using different content ids then deleting a content from the multimedia signature index is the same as deleting corresponding multiple contents, each deletion using the procedure described with regard to FIG. 7C and state diagram 7D. In the live event case, multiple units of content from the multimedia signature index are deleted. However, if a video is live event updated as described with regard to FIG. 8B occurs, then a single content from the multimedia signatures index is removed as described with regard to the state diagram of FIG. 7D as per the process described in FIG. 7C.

Figure 10A:
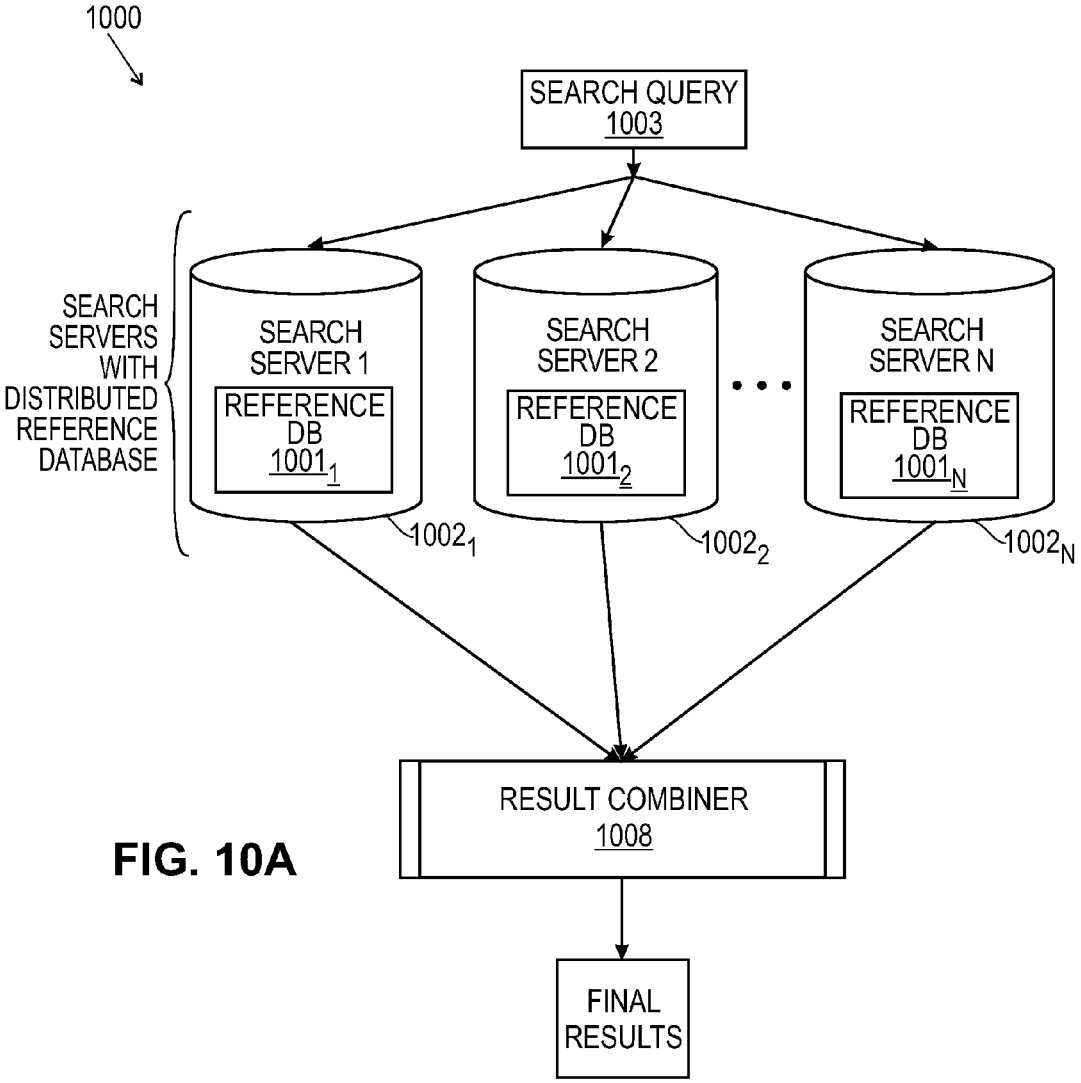
FIG. 10A illustrates an exemplary system having multiple search servers and a distributed reference database in accordance with the present invention.

FIG. 10A illustrates an exemplary system 1000 having multiple search servers $\mathbf{1002}_1$, $\mathbf{1002}_2$, . . . , $\mathbf{1002}_N$ and a distributed reference database in accordance with the present invention. The distributed reference database comprises reference databases $\mathbf{1001}_1$, $\mathbf{1001}_2$, . . . , $\mathbf{1001}_N$ each on a corresponding search server and each storing a portion of the multimedia reference database according to a splitting policy as described in more detail below. A search query dispatcher 1003 is utilized to assign queries to the appropriate portion of the reference database according to the splitting policy. The plurality of search servers may be grouped to form one or more search clusters and a complete search system may consist of multiple search clusters.

When a reference video database becomes too large to fit on one search server, it can be divided across multiple search servers $\mathbf{1002}_1$, $\mathbf{1002}_2$, . . . , $\mathbf{1002}_N$. A video identification request, formatted as a search query, is dispatched from the search query dispatcher 1003 to all of the search servers $\mathbf{1002}_1$, $\mathbf{1002}_2$, . . . , $\mathbf{1002}_N$ to search across the distributed reference database. For example, a similarity search, as described with regard to FIG. 2C, is done at each queried search server for access to the split portion of the reference multimedia database. Each candidate list resulting from the similarity search is further processed, as described with regard to FIG. 2D, to produce a list of top clips. As described with regard to FIG. 2E, for each of the clips in the top clips list 244, a set of reference signatures is accessed from the split portion of the reference multimedia database based on the multimedia identifier and any temporal and/or spatial information. This set of reference signatures is compared against the query signatures using a signature correlation procedure. For each query signature, a score is derived and these scores are combined for the entire set of query signatures to give an overall score for a particular reference database clip. The signature correlation procedure is repeated for all clips in the top clips list, to produce a list of matching reference videos. A separate result combiner 1008 process then collects results from all individual search servers $\mathbf{1002}_1$, $\mathbf{1002}_2$, . . . , $\mathbf{1002}_N$ and generates final results after merging and evaluating the combined results.

The distributed reference database can be arranged in many ways. For example, the search system 1000 is configurable to assign the selected portion of the reference database according to a random splitting of the reference database. In this arrangement, selected multimedia content of a plurality of multimedia contents can be randomly assigned to one of the search servers in the search cluster. Then, the signatures associated with the selected portion of the reference database are loaded in a local cluster index on the assigned search server as well as in the multimedia signature index of that particular search server.

In another method of arranging the distributed reference database, the plurality of multimedia contents are split into specified categories. Common examples of categories for movies are—romance, thriller, animation, family, comedy, and other identifiable categories. Multimedia content is categorized through examination of metadata that may accompany the content. A movie category may be interpreted by a multimedia content analysis, for example. Also, an unknown category can be used when a specific category cannot be determined. Each search server holds a reference database for multimedia contents from a single or multiple categories. This arrangement of the reference database is termed a categorical splitting of the reference database.

An opposite method of the categorical splitting of the reference database is a method for reverse categorical splitting. In the reverse categorical splitting method, multimedia contents within the same category are purposefully distributed across as many different search servers as possible. The categorical splitting minimizes the information entropy of the distributed reference database while the reverse categorical splitting maximizes it.

The choice of the method to arrange a distributed reference database may be based on a single server's search algorithm. Some search algorithms may perform better within a database composed of similar content while other search algorithms may perform better within a database composed of non similar contents. Further, for some search algorithms composition of the reference database might not be a factor.

Figure 10B:
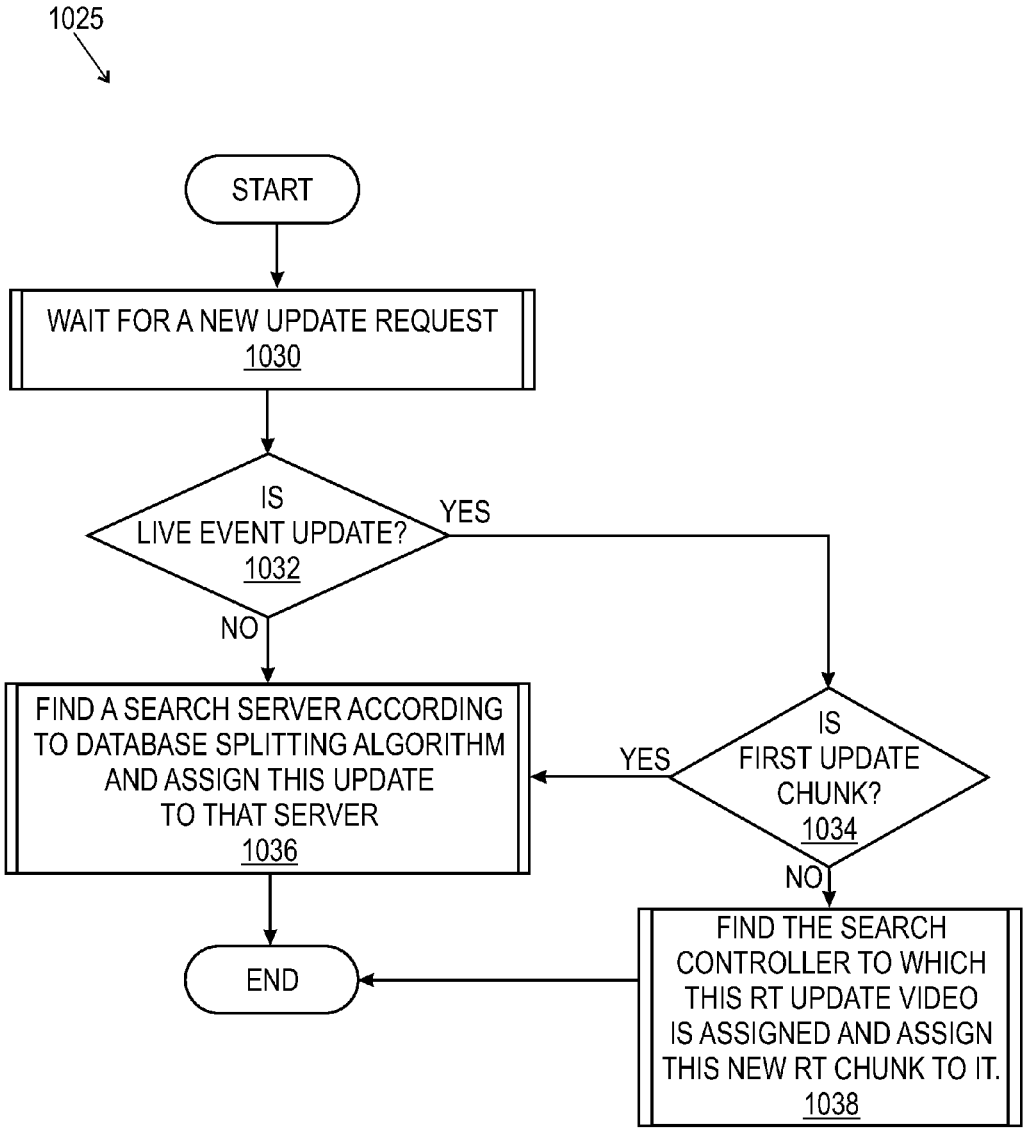
FIG. 10B illustrates an exemplary process to decide how to add multimedia content to a distributed reference database in accordance with the present invention.

All normal updates or live event updates to a reference database are assigned to a specific server as per the distributed reference database splitting policy. FIG. 10B illustrates a process 1025 to decide how to add multimedia content to a distributed reference database in accordance with the present invention. At block 1030, the process 1025 waits until a new update request is received which may be a normal update or a live event update request. At block 1032, a determination is made whether the update request is a live event update request. If the update request is not a live event update request the process 1025 proceeds to block 1036. At block 1036, a server is determined by the selected distributed reference database splitting policy and the update is assigned to that server. Returning to 1032, if the new update request is a live event update request type, the process 1025 proceeds to block 1034. At block 1034 a determination is made whether this live event update request is a first chunk for new multimedia content. If this update request is not for a first live event update chunk for new multimedia content, the process 1025 processed to block 1038. At block 1038, the same server to which old live event update requests for this multimedia content have been assigned is chosen and the new live event update request is assigned to that server. Returning to the block 1034, if a determination is made that this is the first live event update chunk for new multimedia content, then the process 1025 proceeds to block 1036. At block 1036, a server is determined by selected distributed reference database splitting policy and the update is assigned to that server.

Figure 11:
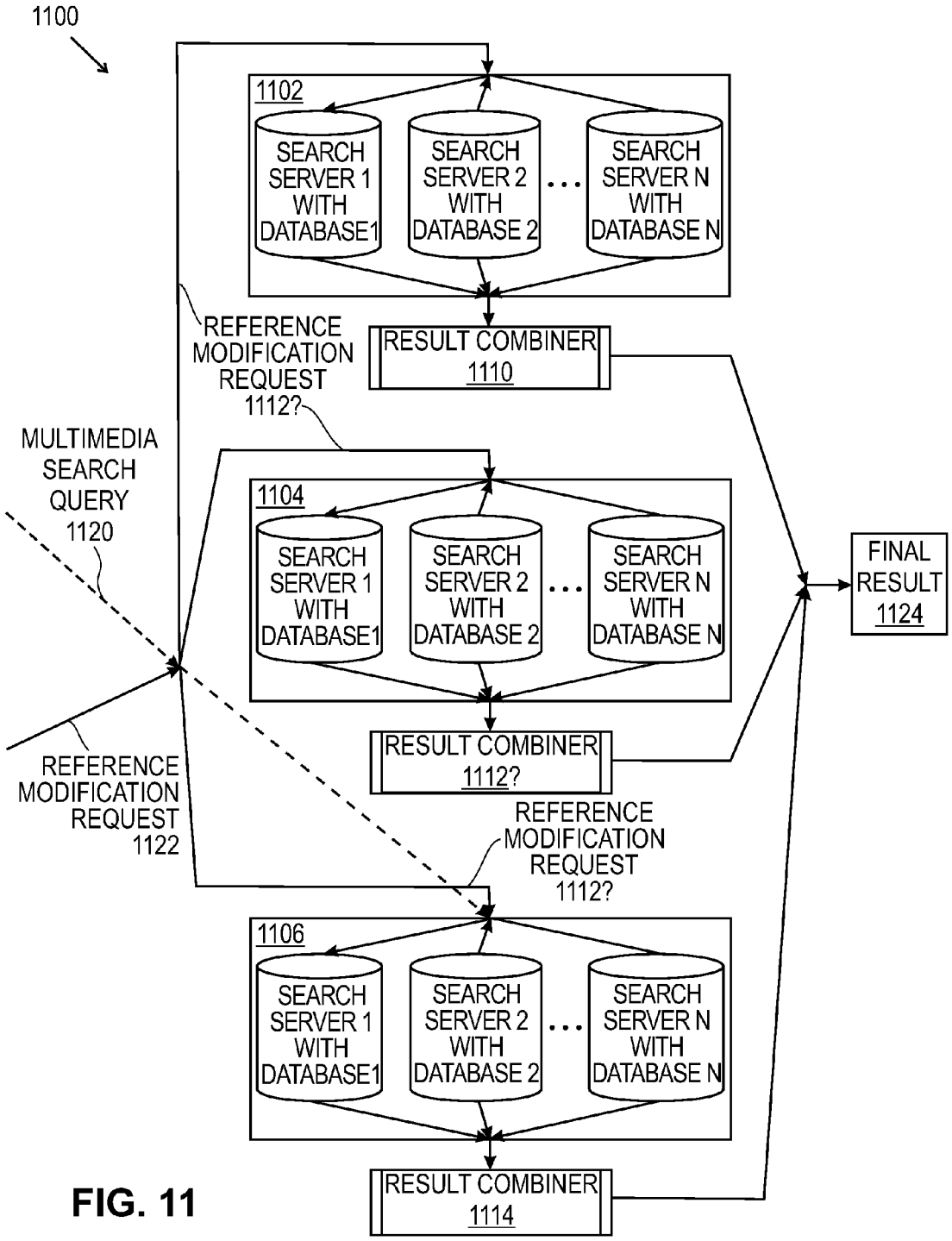
FIG. 11 illustrates an exemplary multi-cluster multimedia identification system in accordance with the present invention.

FIG. 11 illustrates an exemplary multi-cluster multimedia identification system 1100 in accordance with the present inventions. A set of search servers that together hold a reference multimedia content database is called as a search cluster. The speed of the search system can be increased by replicating the search server clusters. Any request to modify the reference database is forwarded across all the replicated search clusters as shown in FIG. 11.

The multi-cluster multimedia identification system 1100 shows three search clusters 1102, 1104, and 1106 with a multimedia search query distributor 1120 and a final result unit 1124. Each cluster has its own result combiner 1110, 1112, 1114, respectively. These result combiners combine results from each individual search machine inside each cluster and then provide each cluster's final result that may be combined as a system final result in the final result unit 1124 for consumption by the query client. Every new multimedia search request 1120 is distributed by the multimedia search query distributor to one of the clusters, such as cluster 1106 while a reference database modification request 1122 is forwarded to all of the clusters 1102, 1104, and 1106. With three search clusters, three searches may operate in parallel. Also, with multi-threaded search servers, the search servers are operable to work separately on a plurality of search query requests if so assigned.

Replicating the search clusters increases the number of search queries a multi-cluster multimedia identification system can handle within a given amount of time by a factor of N where N is the number of replicated search clusters.

Figure 12:
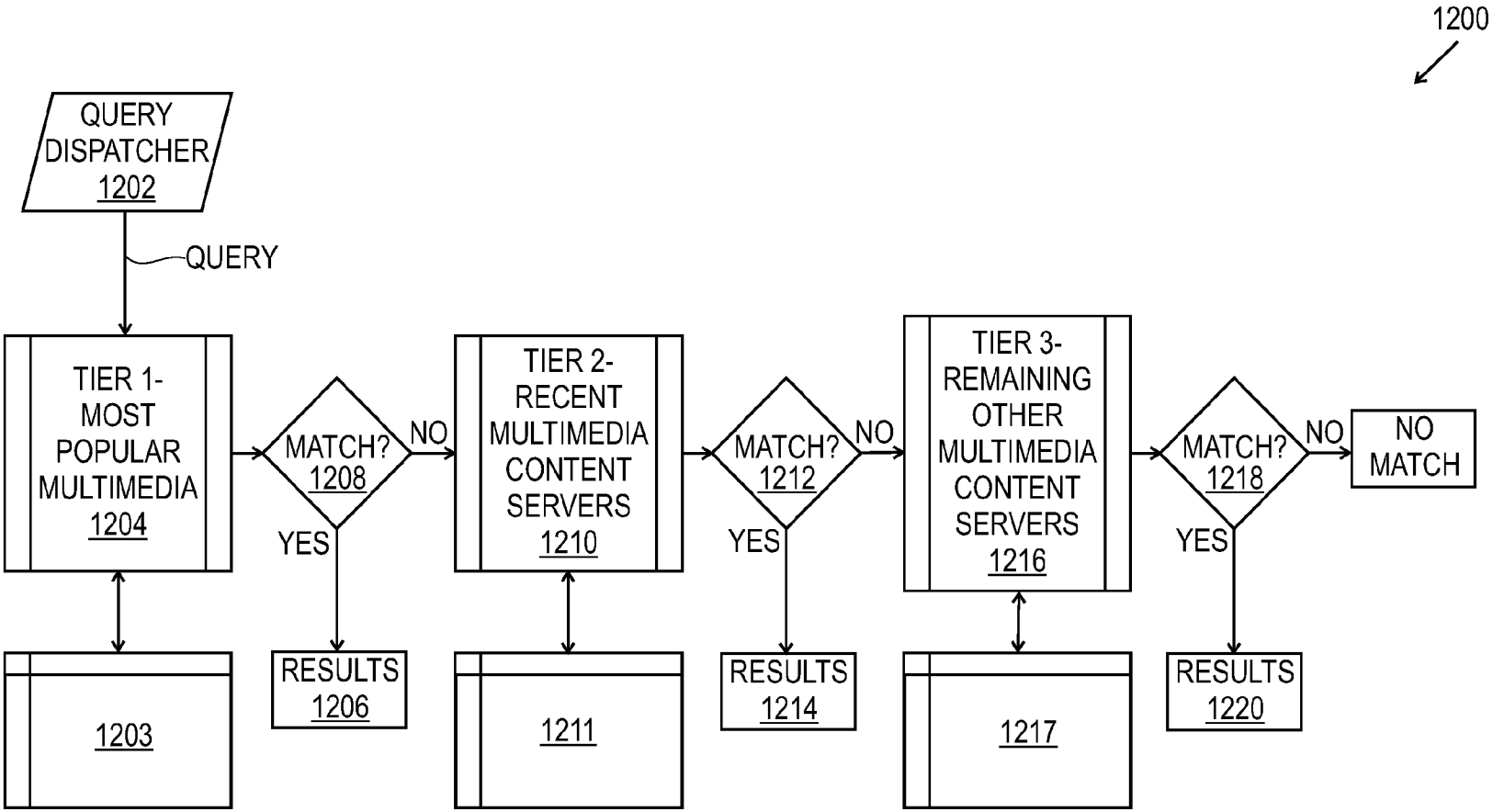
FIG. 12 illustrates an exemplary a three tier hierarchical system for a multimedia identification in accordance with the present invention.

In many applications of a video identification system, most of the video identification queries would match a very small set of reference videos. For example, most people are interested in watching current TV programs, recent movie releases, current sport matches. The complete reference database may consist of tens of thousands of videos, however the most sought video content might be just a fraction of it. In such scenarios, a hierarchical search system can be configured as illustrated in FIG. 12. FIG. 12 illustrates an exemplary three tier hierarchical system 1200 for multimedia identification in accordance with the present invention. The three tier hierarchical system 1200 comprises a query dispatcher 1202, a tier-1 system 1204 coupled to a first reference database 1203, a first tier function unit 1208, a tier-2 system 1210 coupled to a second reference database 1211, a second tier function unit 1212, a tier-3 system 1216 coupled to a third reference database 1217, and a third tier function unit 1218.

The most sought reference content is marked in the reference database contents and is loaded into a first tier, the tier-1 system 1204 of a multi-tier system. The most sought content can be determined in many ways. For example, if the reference database consists of recent movies, then a movie ranking report based on the weekly popularity of currently showing movies could be used to mark the most popular movie content in the reference database. The system can start without any external information about the popularity of the reference multimedia content and then build a popularity index for its reference database contents by analyzing matched results for recent search queries.

Multimedia identification search requests are dispatched by the query dispatcher 1202 and enter this tier-1 system 1204 in which the multimedia identification query is matched against only tier-1 content. If a match is not found, or if certain criteria is not met, for example, confidence in the detected match is less than a predetermined threshold or the length of the match found is less than another predetermined threshold, this multimedia identification query is sent on to the next tier, the tier-2 system 1210, of the three tier hierarchical system 1200. This search system organization is generalized to multiple tiers in a hierarchical organization where the most popular content is organized in the tier-1 system 1204, some of the next most popular content is organized into the tier-2 system 1210, some of the less popular content is organized into the tier-3 system 1216 and so on.

In FIG. 12, the tier-1 system 1204 uses a first reference database 1203 made up of the current most popular content. The tier-2 system 1210 consists of other recent current content in second reference database 1211, while the tier-3 system 1216 consists of the remaining content in a third reference database 1217. A multimedia identification query dispatched by the query dispatcher 1202 is first handled by the tier-1 system 1204. If the match is found as determined at first tier function unit 1208, the results 1206 may be sent back to the requesting client. If the match is not found, then the tier-2 system 1210 handles the dispatched query. If a match is found in the second tier as determined at second tier function unit 1212, results 1214 may be returned to the client. Otherwise, the last tier, the tier-3 system 1216 handles the query and determines if there is a match or no match as determined at third tier function unit 1218 and the results 1220 are returned to the client.

The tier structure can also be considered as a way of performing reference database caching. Similar to an L1 cache in computer system, the tier 1 contains the references that are most often accessed or matched to search queries.

The tier organization may lead to a smaller system cost due to a number of advantages. For example, overall computing load of the system may be reduced thus enabling fast content identification. The tiered structure of the multi-cluster search system delivers a lower number of queries to the second tier-2 system 1210 and an even lower number of queries of to the last tier-3 system 1216. The multi-media identification speed on a single search server is proportional to the reference database size that it holds. As the tiered structure has reduced the load on the second and third tiers compared to the first tier, the reference database size in the second tier-2 system 1210 and third tier-3 system 1216 can be increased and still maintain an adequate search speed required to answer every incoming query to the overall multi-tier identification system. Hence the tiered structure can also help in increasing the distributed reference database size that can support a particular search speed.

The most sought content can be determined in multiple ways. In a first exemplary approach to determine the most sought content, the number of search queries that match against a prespecified reference multimedia content over a predefined time interval are counted as a match number by keeping track of all search queries answered by the search system. Then all the reference multimedia contents having a match number greater than a prespecified threshold are termed as the most sought videos. In another exemplary approach, the probability of a random search query matching to set of reference multimedia content is prespecified as a probability threshold. Then, a set of reference content that achieves or exceeds this probability threshold of matching a random query is determined. This set of reference multimedia content is then defined as the most sought content. The set of most sought reference content can be determined using a cumulative probability distribution function determined by statistics maintained by the search system of the search results, for example.

If the reference content is a set of movies, then movie popularity ratings can be used to determine the top N popular movies or top x % of popular movies. These top movies then can be termed as the most sought content.

If the reference database is the TV shows, then similarly TV show ratings could be used to determine the top N popular shows or top x % of popular shows. Using this information the most sought TV shows can be determined.

Further, different tiers can have different number of clusters, each with a different number of search controllers, to handle correspondingly different query search loads and distributed reference database sizes. Thus, tier organization and clusters of search servers are two independent concepts and combinations of these two system configurations can result in an even more flexible and advantageous search system. For example, if a tier-1 system is able to respond to most of the search queries, then the following tiers would have much smaller load. In such a case, to utilize the tiers efficiently, two tier-1 clusters may share a single tier-2 system as illustrated in FIG. 13.

Figure 13:
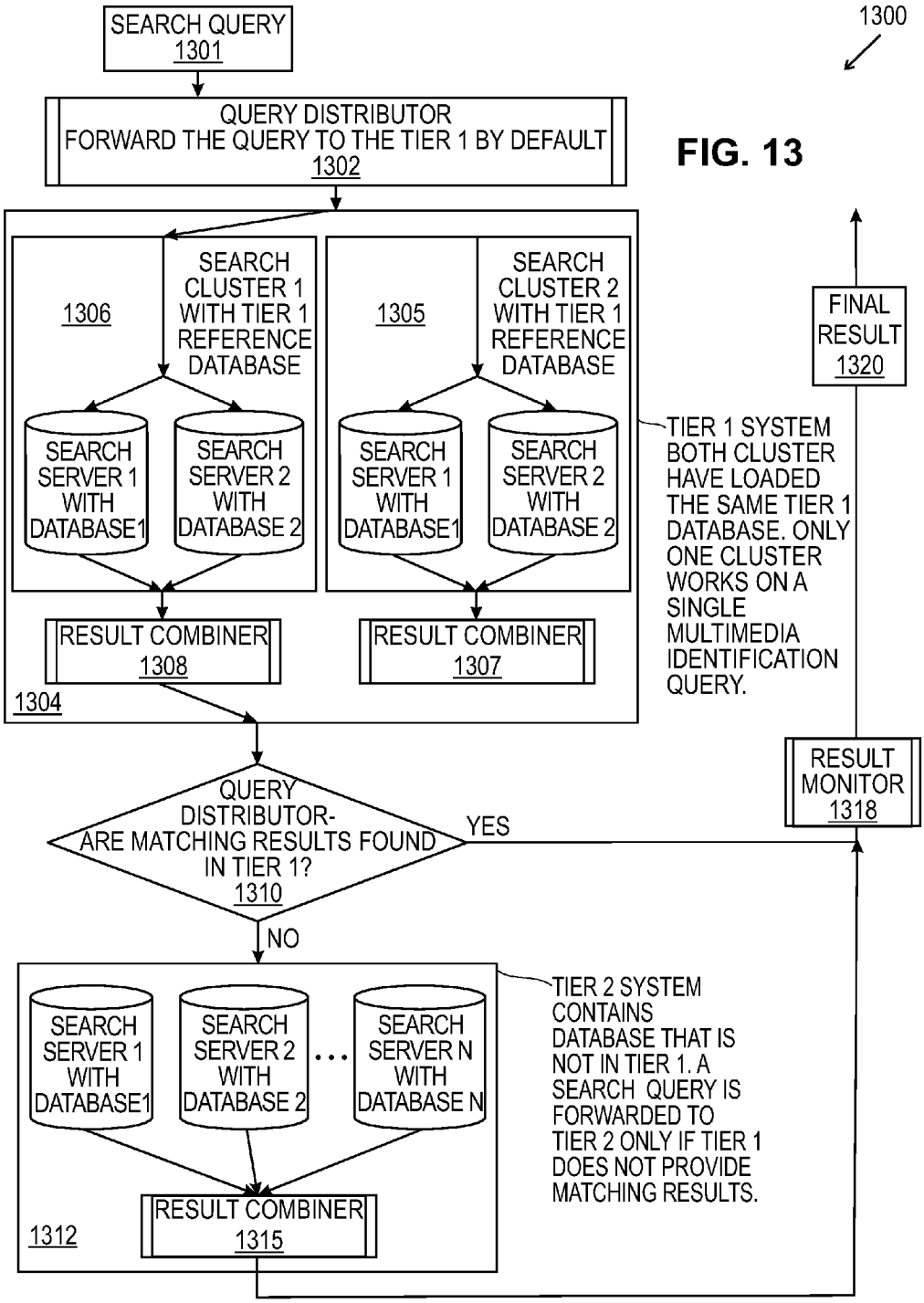
FIG. 13 illustrates an exemplary two tier system for a multiple tier multi-cluster system that achieves reference database scaling as well as performance scaling in accordance with the present invention.

FIG. 13 illustrates an exemplary two-tier system 1300 for a multi-tier multi-cluster system that achieves reference database scaling as well as performance scaling in accordance with the present invention. The tier 1 search system 1304 is comprised of two search clusters 1305 and 1306, each further comprised of two search servers. Both the search clusters 1305 and 1306 host the same reference multimedia content. Each search cluster 1305 and 1306 has its own result combiner 1307 and 1308, respectively.

When a new search query 1301 is received in the search system 1300, the query distributor 1302 dispatches the search query to the tier 1 search system 1304. The query distributor 1302 selects one of the search clusters, such as search cluster 1306, out of the two search clusters 1305 and 1306 in tier 1 and dispatches the search request 1301. The selection of the search cluster may be done in a pure random fashion, or in a round robin way, or according to any other scheduling policy such as least loaded cluster selection, or physically closest cluster selection. The result combiner 1308 combines the results of various search controllers in the search cluster 1306 and forwards the results to another query distributer 1310. Query distributor 1310 and query distributor 1302 may be implemented as a part of the same process or may be separate processes.

Query distributor 1310 checks the results for the match. If a match is found, then the results are forwarded to the result monitor 1318 which in turn forwards the result to the search client as final results 1320. If the query distributor 1310 does not find a match, it dispatches the search query to tier 2 1312. Tier 2 in this example consists of only one search cluster hence the query distributor 1310 does not need to choose a search cluster for this query in tier-2 1312. Also, in this example, a search query is dispatched to all the search servers in the tier 2. The result combiner 1315 collects the match information from all the search servers and forwards the result to the result monitor 1318 which in turn forwards the results to the query client as final results 1320. The result monitor 1318 stores the match results from tier 1 and tier 2, and sends the combined processed results as final results 1320 to the query client.

Note that the reference databases in each tier need not be static. Rather, they can be dynamic. Depending on a current profile of queries, or current time, or some other parameter or parameters, the set of reference content in the different tiers can be changed or moved around. For example, some of reference content from tier 1 that is not so frequently accessed and matched may get transferred to tier-2. To enable this functionality for system 1300, the result monitor 1318 also maintains statistics about the matches and which reference multimedia contents are matched most often across large sets of queries. Even though, it has not been shown explicitly in FIG. 13, it is noted that as described before any updates or delete operations on the reference multimedia content in tier 1 must be carried for both clusters 1305 and 1306.

In some applications, an objective might be to first find a matching reference video to a queried multimedia content and then track the queried multimedia content as it progresses against a matched set of multimedia contents with minimum overhead and reduced latency. For example, consider an application for the purpose of blocking advertisements on a television set. A reference database is instantiated in the television set and contains one or more television programs without advertisements. Whenever an advertisement is displayed on the television set, a multimedia identification query issued in response to a user's selection would return a "no match". By having the television set configured to track the program being watched, whenever it detects deviation from the reference program being tracked it can conclude an advertisement is present. The television set then can take various actions as per the user preference.

For example, the television set can simply block the advertisement till the program resumes, which the television set would know by tracking the displayed content on the television. Some other possible actions that the television set can take include switching the channel, going into picture-in-picture mode with another channel, and reducing the audio volume.

Figure 14A:
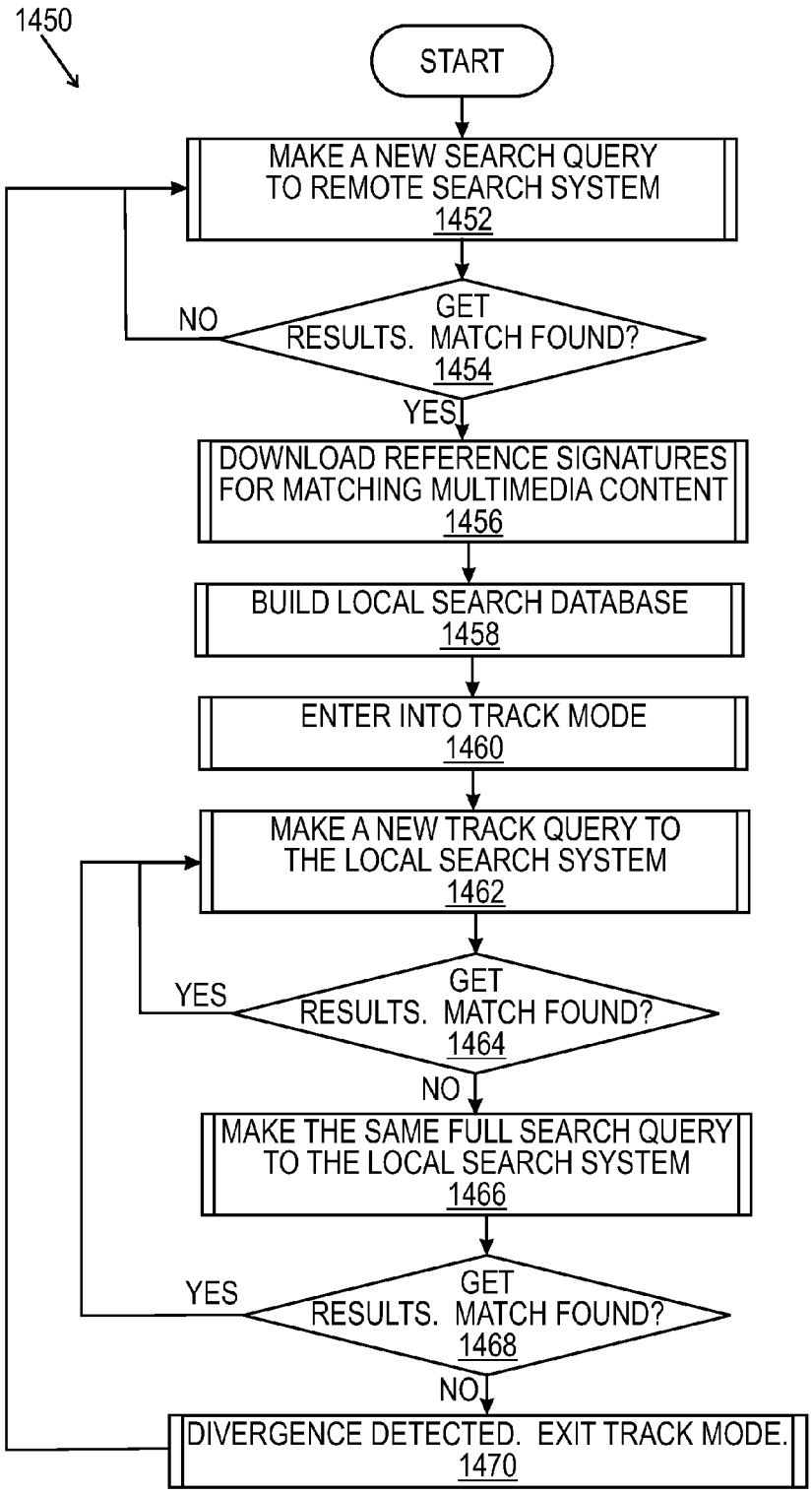
FIG. 14A illustrates an exemplary process for multimedia identification and matched multimedia tracking at a local client in accordance with the present invention.

FIG. 14A illustrates an exemplary process 1450 for multimedia identification and multimedia tracking at a local client in accordance with the present inventions. This process 1450 is executed by the client with a local multimedia track mode function. Initially at step 1452, a first search query for searching the currently displayed content on the client is made at the local client and sent to a remote search server. The remote server then returns the match results to the client. At decision step 1454, a determination is made at the client whether the result contains a matching reference video or not. If a matching reference video is found, then the process continues to the step 1456. Instead, if a matching reference video is not found at decision step 1454, the process 1450 returns to step 1452 and performs a new search query for searching the currently displayed content on the client at the remote server. The new search query is done after some predetermined time delay to reduce load on the remote search system.

With reference to the step 1456, as the client has found a matching reference video, it then downloads signatures for the matching reference video or signatures for the part of the matching reference video around the match. The decision to download full or part of the matching reference multimedia signatures can be taken by the client or by the remote server. Various factors can affect this decision, including but not limited to the size of the matched reference content and the probability of client continuing to display the same content without changing the displayed program.

After downloading, the process 1450 builds a local search database at step 1458 with the downloaded matching reference multimedia signatures in the reference database. At step 1460, the process 1450 then enters into a track mode. At step 1462, the process 1450 makes new track search requests to the local search database to track the video. For example, the television set searches for the content being displayed for the past five seconds. The track search does not use the similarity search phase of the normal search and instead uses a correlation phase of the normal search. Hence, track search consumes less computational resources and can be performed faster.

At step 1464, a determination is made whether the results returned match the query. If the track search at the local search system return a match to the same reference, then the process goes back to step 1462 where it can make a new track search query. Instead, if at decision step 1464, a match is not found, then at step 1466, a new full search query is made to the local reference database. This full local search is more expensive than the track search query in terms of the computational resources needed. However, the full local search is faster than a remote search query because the full search is performed against a much smaller database. When the local full search results are returned, at decision step 1468, a determination is made whether a match to the same reference video is found. If indeed a match has been found, then the tracking operation is continued by returning to step 1462. Otherwise, it is concluded that the local content has diverged from the reference content and the local track method is abandoned at step 1470 and the process 1450 returns at the beginning step 1452.

Figure 14B:
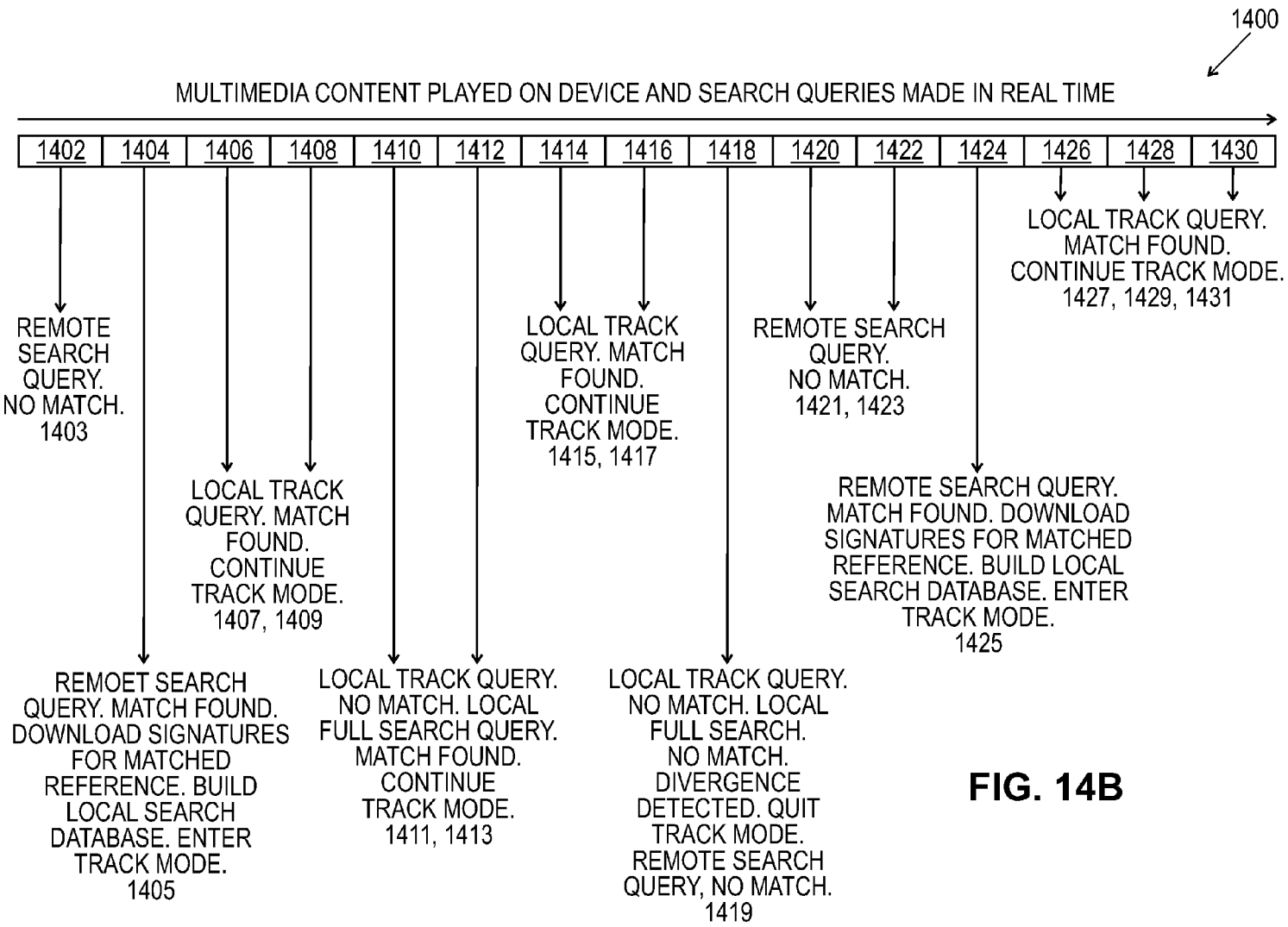
FIG. 14B illustrates an exemplary state diagram of various search queries done at a client that has ability to perform local multimedia track function in accordance with the present invention.

FIG. 14B illustrates an exemplary state diagram 1400 of various search queries done at a client that has an ability to perform local multimedia track functions. In this exemplary state diagram 1400, multimedia search queries 1402, 1404, . . . , 1430 are made by the client as the time progresses to the right and shown with details of these search queries. Specifically, for each search query, a brief description of the search method, whether it is a remote search or local track search or local full search, along with a description of results and other actions are specified. At the beginning, the search query 1402 is made at the remote search system. The remote search system returns a no match result 1403 and hence the next search query 1404 is made at the remote search system again. The search query 1404 is answered with a match 1405, the client downloads the signatures associated with the reference and builds a local search database and enters into a track mode. The next search query 1406 is made to the local search system as a local track search query which, for example, results in successful match 1407. Hence, the process is repeated for the search query 1408 with the match results 1409.

The next search query 1410 is first made as a local tack search query and, for example, results in a no match finding. Hence, since the local track search filed then the same query is also made as a local full search query 1410. The local full search query 1410 is made with the same signatures and, for example matching results are found 1411. The same process with similar results 1413 is repeated for a next query 1412. For the next two queries 1414 and 1416, local track search operations return positive results 1415, 1417, so the track mode continues till that point in the time. However, for the next search query 1418, neither the local track search query nor the local full search query returns a positive match 1419. Hence, it is concluded that the content being played locally has diverged from the reference content. Further, the track mode is abandoned and a remote search query 1418 is performed. In this case, the remote system also does not find a match 1419. The next query 1420 is made directly to the remote search system, which returns a no match indication 1421 and the process is repeated for query 1422 with no match result 1423. However, for the query 1424, the remote search system finds the match 1425 and hence the client downloads the signatures, updates the local search database for this reference and enters into the track mode. The track mode successfully continues for the next three queries 1426, 1428, 1430 with successful results 1427, 1429 and 1431.

Now consider a scenario where a video that is aired on a television channel, a TV or any other device that can receive the TV channel such as a set top box may fingerprint the content aired on the television channel and may query the search system to find a matching reference. However, if two such querying devices are tuned to the same channel, there is a considerable chance that both clients may generate the same signatures and thus would generate exactly the same query. In such case, if one query is searched by the search system after another, and if somehow the search system can notice that exact same query has been searched before, it can reduce the computational overhead of the second search by remembering the results of the first search query and returning those results for the second query. This operation is termed as query caching in an embodiment of the present invention.

Figure 15A:
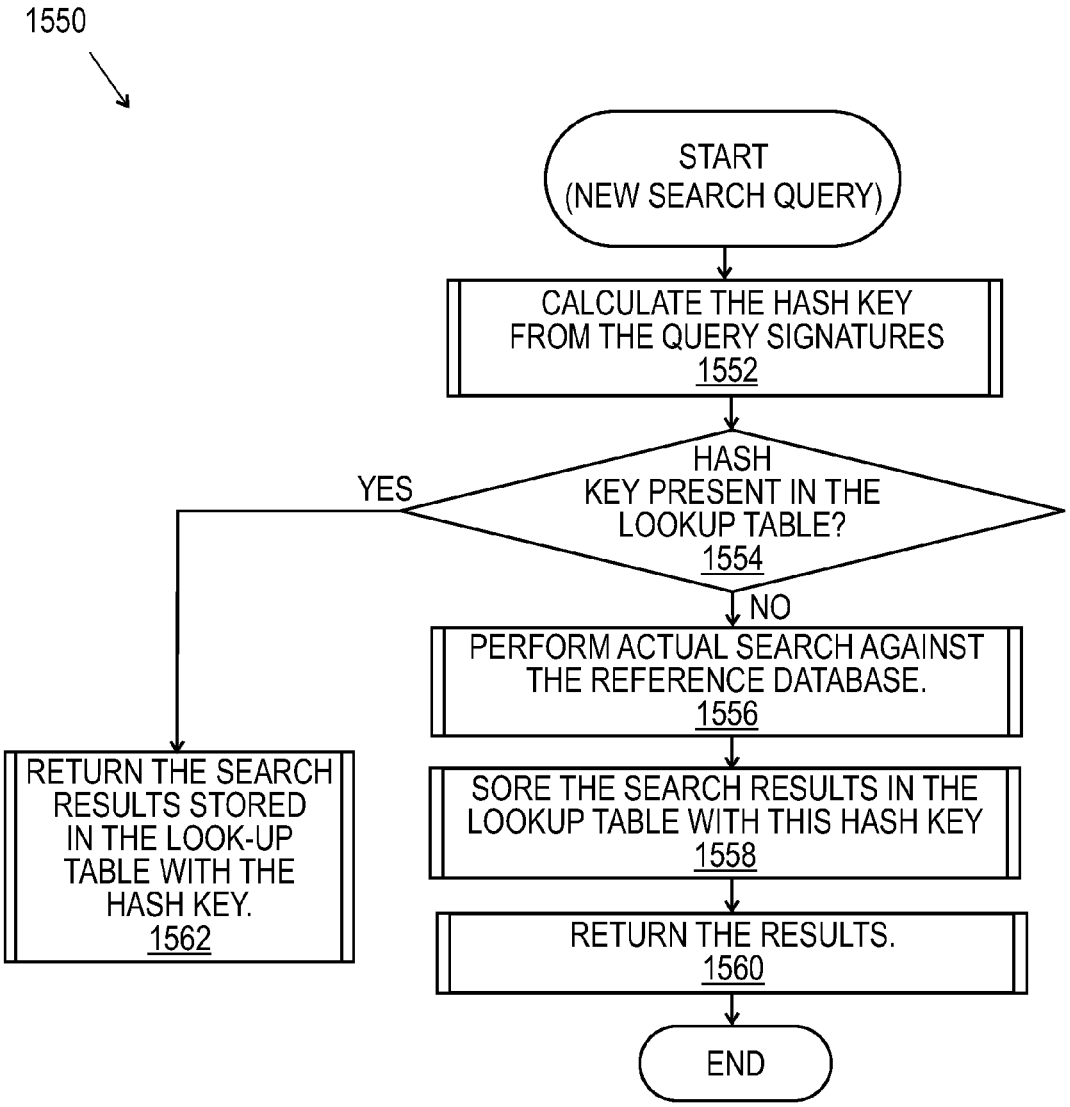
FIG. 15A illustrates an exemplary search process operating on a search server with query caching functionality in accordance with the present invention.

In one aspect, the search system can cache the completed query results. The results can be cached using a caching key storage unit, such as a look-up table which may be organized as a hash map data structure, for example. The keys for this look-up table are generated from query signatures and search results are stored as values of the look-up table. The search system can employ a separate caching server or servers or the caching functionality can be integrated at every search server. FIG. 15A illustrates an exemplary search process 1550 operating on a search server with the query caching functionality enabled on it. When a new query is received, at step 1552, the search server calculates a hash key for the query using a predetermined hashing function that operates on the query signatures. The hashing function used in step 1552 can be a check sum function such as an MD-5 key generation function. The search server then looks for this hash key in the look-up table at step 1554 that it has maintained to store the query search results. For example, the look-up table may be organized to use a hash key as an address in the look-up table to access search results. In an alternative configuration, a content addressable memory (CAM) may store hash keys and associated search results. If the hash key is found in the look-up table, the server returns the results from the look-up table at step 1562. If the hash key is not found in the look-up table at decision step 1554, then the server performs an actual search against the reference multimedia database using the query signatures at step 1556. At step 1558, the results of this search are stored in the look-up table using the hash key generated in step 1552 and the results are returned to the query client at step 1560.

Note that instead of generating a single hash key for the look-up table, multiple hash keys can be generated using different set of query signatures. For example, a hash key can be generated using signatures from a 5 second query. Then three hash keys could be generated for a query that is 15 seconds long by using non-overlapping signatures blocks each representing a duration of 5 seconds. While doing a search even if a single hash key out of the three hash keys is found to be in look-up table, a result associated with that key is declared as a matching result. The look-up table is searched and updated for all hash keys associated with every query. Even more hash keys can be generated using overlapping signature blocks and generating a hash key for each block of signatures. This method is termed a generation of a sequence of hash keys.

Also, note that the caching need not be performed only at the servers. The method of query caching involves generating a unique hash key or sequences of hash keys from the signatures. This can be performed at the querying client or any other device. Only this unique key or sequences of keys need to be queried to find cached query results. No actual search needs to be performed if a cached result is found. For this reason, this caching based querying for matching content can be performed in various forms such as querying to a peer to peer (P2P) network that is made of individual query clients, querying to a content delivery network (CDN) or querying to a separate caching server that only maintains such cached results.

Figure 15B:
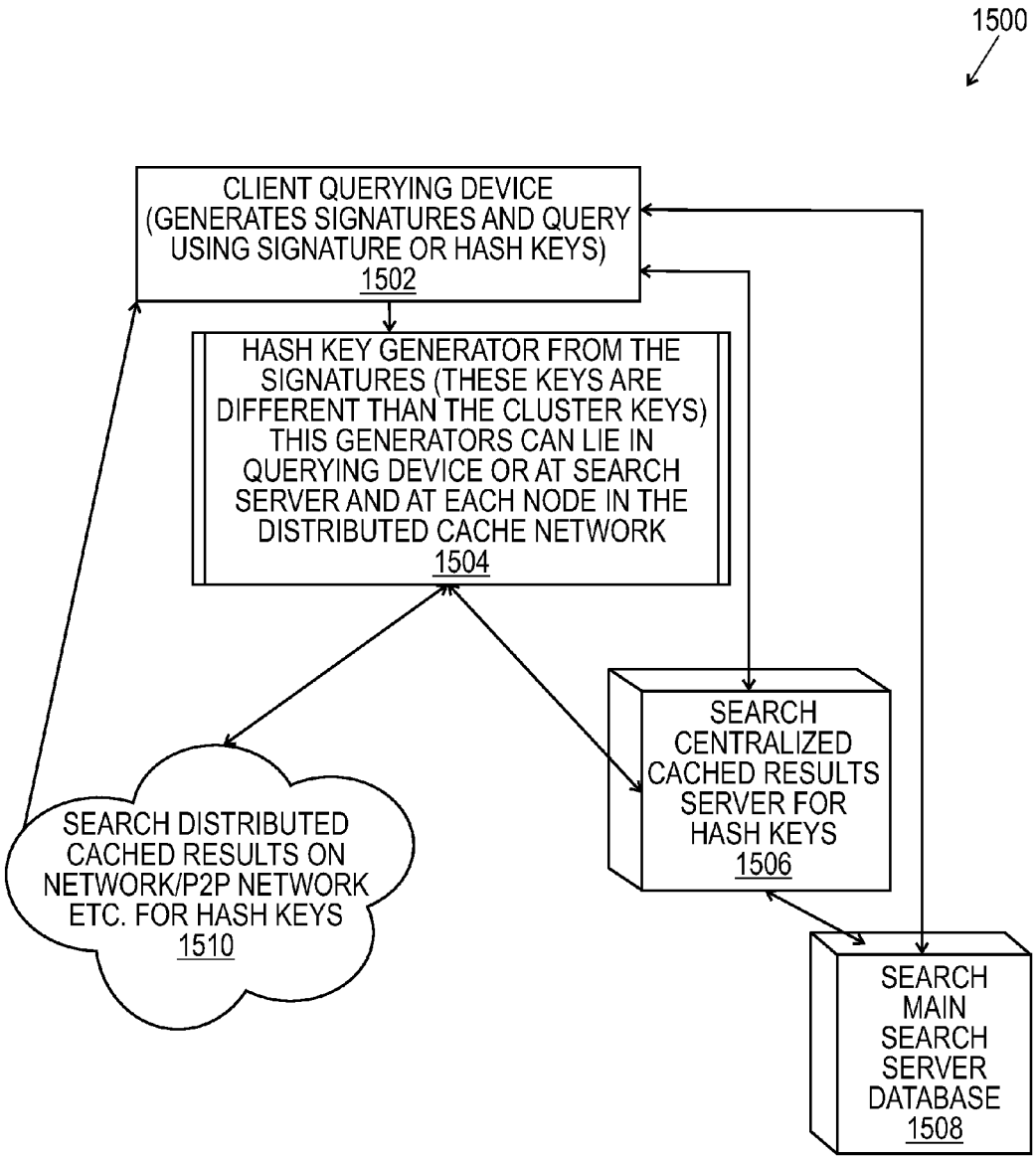
FIG. 15B illustrates a distributed search system process that incorporates centralized and distributed cache servers in accordance with the present invention.

FIG. 15B illustrates a distributed search system process 1500 that incorporates centralized and distributed cache servers in accordance with the present invention. In FIG. 15B, process 1500 begins at step 1502, by generating signatures at a client for a unit of multimedia content to be identified. At step 1504, hash keys are generated by the client using the generated signatures. Also, at step 1504, the generated hash keys are sent to a centralized query cache server or a distributed cache server on a network, such as the P2P network.

If the search has been forwarded to the centralized cache server at step 1506, the centralized cache server checks for the results using the hash keys. If the results are found, the results are returned back to the client 1502. However, if the results are not found at the centralized cache server, then the cache server forwards the search request to the centralized search system 1508 that performs the actual search using query signatures. The main search system 1508 then informs the query client 1502 of the actual search result. The main search system 1508 also informs the cache server 1506 about the results which in turn updates its look-up table by associating the search results to the hash keys linked with this query signature.

If the search at step 1504 is forwarded to a distributed system to find the cached results, the distributed system returns with a result.

If the client 1502 decides to be a part of distributed P2P caching network, it then stores the obtained results into a lookup table with the keys being the generated hash keys at step 1504. At a later time, a different client may produce a hash key that is the same as one of the hash keys produced by this client 1502. If that new client queries using that hash key to a distributed network in which the client 1502 has joined, potentially the client 1502 can reply with the matching result. Thus the P2P caching network can share some of the search load of the main search system.

Figure 15C:
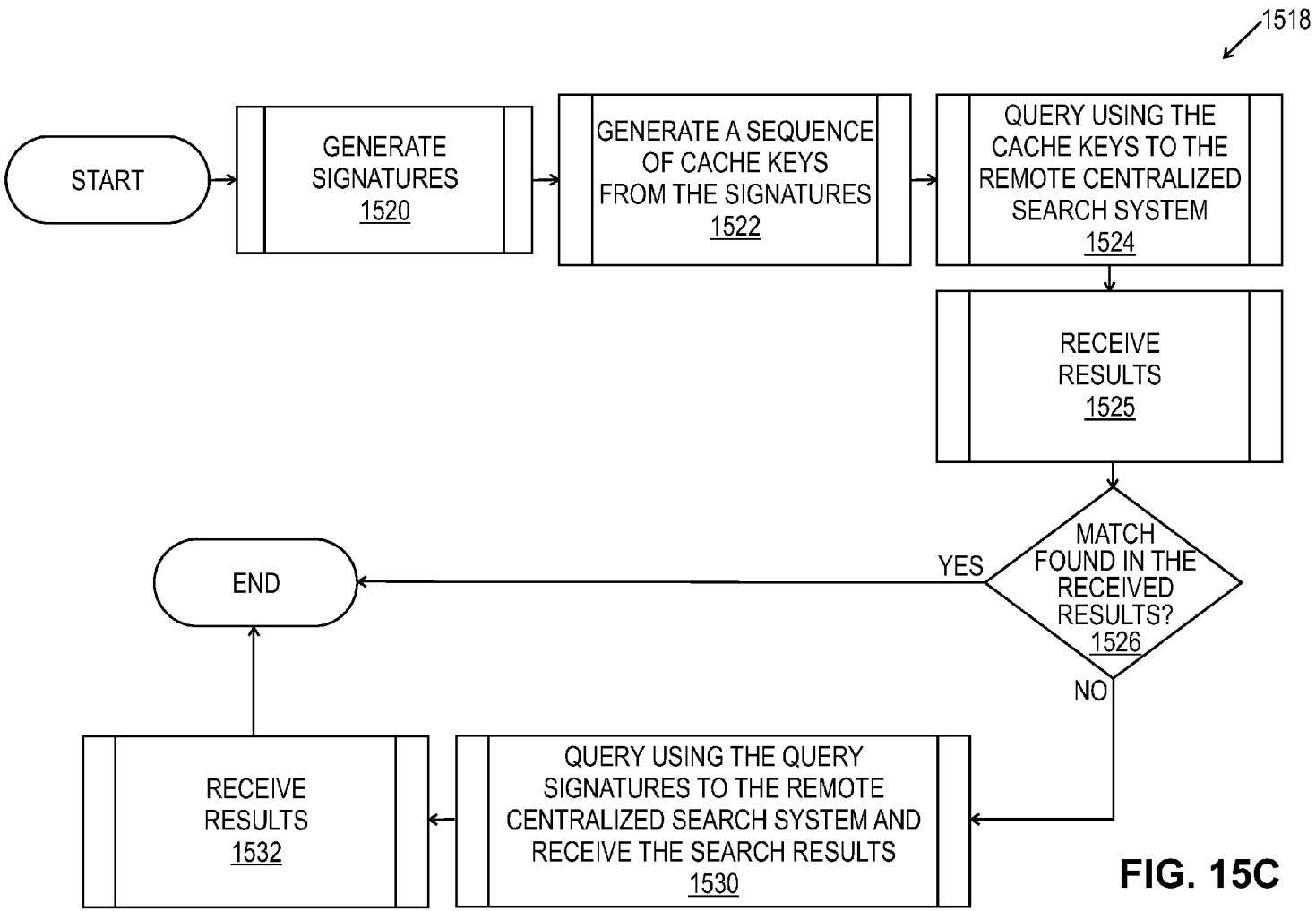
FIG. 15C illustrates a process executed at query clients for cache based multimedia content search in accordance with the present invention.

FIG. 15C illustrates a process 1518 executed at query clients for cache based multimedia content search in accordance with the present inventions. At block 1520, the client generates signatures. At block 1522, a sequence of cache keys are generated, that are much smaller in length compared to the signatures generated at block 1520. At block 1524, the client queries the centralized search system having a reference database using the sequence of cache keys. At block 1525, the query client receives the results of the cache key search from the centralized search system. At block 1526, the query client determines if the results contain a match in response to the cache keys. If a match is found, the query client ends the process 1518. If the match is not found in the results using the cache keys at block 1526, the process 1518 proceeds to a block 1530. At block 1530, the query client performs a multimedia identification search query to the centralized search system using the signatures generated at block 1520. At block 1532, the query client receives the results of the signature search from the centralized search system and the query client ends the process 1518.

Those of skill in the art will appreciate from the present disclosure additional, alternative systems and methods for actionable television event generation, based on television program audio and video content fingerprinting, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention.

We claim:

1. A method of tracking multimedia content, the method comprising:

searching in a remote database in response to a query sent from a user device for multimedia content of a multimedia program that is currently playing on the user device;

finding matching signatures for the multimedia content in a reference program stored in the remote database;

retrieving the matching signatures and reference signatures for succeeding segments of the reference program beginning from the point in the reference program the multimedia content was found in the remote database;

storing the matching signatures and reference signatures in a local database on the user device;

tracking the multimedia program in the local database to find matching content for the succeeding segments of the reference program;

determining the multimedia content has changed to different multimedia content than that stored in the succeeding segments of the reference program; and replacing the determined different multimedia content to a preselected multimedia content.

2. The method of claim 1 further comprising:

playing the preselected multimedia content for a prespecified duration; and returning to play the multimedia program upon detecting matching content for subsequent segments of the reference program.

3. The method of claim 1, wherein the preselected multimedia content is a new source of multimedia content.

4. The method of claim 3, wherein the new source of multimedia content is a picture-in-picture mode of operation with another channel.

5. The method of claim 1, wherein the preselected multimedia content is a reduction in the audio on the user device.

6. The method of claim 1, wherein the succeeding segments of the reference program is a full reference program including the matching signatures from the point in the reference program the multimedia content was found in the remote database.

7. The method of claim 1 further comprising:

blocking the playing of the preselected multimedia content; and returning to display the multimedia program upon detecting matching content for subsequent segments of the reference program.

8. The method of claim 1, wherein the searching in the remote database uses a similarity search method combined with a correlation search method.

9. The method of claim 1, wherein the tracking to find matching content uses a correlation method.

10. An apparatus for tracking multimedia content, the apparatus comprising:

a user processing device configured for sending a query to a remote database to search for multimedia content of a multimedia program identified by a user, wherein matching signatures are found for the multimedia content in a reference program stored in the remote database, and the matching signatures and reference signatures for succeeding segments of the reference program beginning from the point in the reference program the multimedia content was found are retrieved from the remote database; and a local database coupled to the user processing device and configured for storing the matching signatures and reference signatures retrieved from the remote database, wherein the user processing device is further configured to track the multimedia program in the local database to find matching content for the succeeding segments of the reference program, the user processing device is further configured to determine the multimedia content has changed to different multimedia content than that stored in the succeeding segments of the reference program, and wherein the user processing device is further configured to replace the determined different multimedia content to a preselected multimedia content.

11. The apparatus of claim 10, wherein the local database is stored in a memory internal to the user processing device.

12. The apparatus of claim 10, wherein the local database is stored in a random access memory and a hard disk drive internal to the user processing device.

13. The apparatus of claim 10, wherein each reference signature includes a cluster key comprising a link reference address to a list of signature records stored in the local database.

14. The apparatus of claim 13, wherein the cluster key is generated by applying a fingerprinting process to bits of a reference fingerprint having a first number of bits, wherein the cluster key comprises a second number of bits that is less than the first number of bits.

15. A computer readable non-transitory medium storing a computer program which causes a computer system to perform a method of tracking multimedia content, the method comprising:

searching in a remote database in response to a query sent from a user device for multimedia content of a multimedia program that is currently playing on the user device;

finding matching signatures for the multimedia content in a reference program stored in the remote database;

retrieving the matching signatures and reference signatures for succeeding segments of the reference program beginning from the point in the reference program the multimedia content was found in the remote database;

storing the matching signatures and reference signatures in a local database on the user device;

tracking the multimedia program in the local database to find matching content for the succeeding segments of the reference program;

determining the multimedia content has changed to different multimedia content than that stored in the succeeding segments of the reference program; and replacing the determined different multimedia content to a preselected multimedia content.

16. The computer readable non-transitory medium method of claim 15 further comprising:

playing the preselected multimedia content for a prespecified duration; and returning to play the multimedia program upon detecting matching content for subsequent segments of the reference program.

17. The computer readable non-transitory medium method of claim 15, wherein the preselected multimedia content is a picture-in-picture mode of operation with another channel.

18. The computer readable non-transitory medium method of claim 15 further comprising:

blocking the playing of the preselected multimedia content; and returning to display the multimedia program upon detecting matching content for subsequent segments of the reference program.

19. The computer readable non-transitory medium method of claim 15, wherein the searching in the remote database uses a similarity search method combined with a correlation search method.

20. The computer readable non-transitory medium method of claim 15, wherein each reference signature includes a cluster key comprising a link reference address to a list of signature records stored in the local database.

*21. A method comprising:*

*generating, by a client device, a first query signature representing a portion of a first content unit, wherein the portion of the first content unit is presented by the client device;*

*sending, by the client device, to a server device, the generated first query signature;*

*responsive to sending the generated first query signature, receiving, by the client device, from the server device, a set of reference signatures representing additional portions of the first content unit, wherein the set of reference signatures was selected by the server device based at least in part on the generated first query signature;*

*generating, by the client device, a second query signature representing a portion of a second content unit that is different from the first content unit;*

*comparing, by the client device, the generated second query signature with the received set of reference signatures;*

*determining, by the client device, that the comparing resulted in no match being found; and*

*responsive to determining that the comparing resulted in no match being found, performing, by the client device, an action.*

*22. The method of claim 21, wherein the first content unit comprises video content.*

*23. The method of claim 22, wherein the first content unit further comprises audio content.*

*24. The method of claim 21, wherein the client device is a television set and wherein presented by the client device comprises displayed by the client device.*

*25. The method of claim 21, wherein the portion of the second content unit is received but not presented by the client device.*

*26. The method of claim 21, wherein the first content unit is a television show and the second content unit is an advertisement.*

*27. The method of claim 21, wherein comparing the generated second query signature with the received set of reference signatures comprises using a track search technique to compare the generated second query signature with the received set of reference signatures.*

*28. The method of claim 21, wherein comparing the generated second query signature with the received set of reference signatures comprises using a full search query technique to compare the generated second query signature with the received set of reference signatures.*

*29. The method of claim 21, wherein comparing the generated second query signature with the received set of reference signatures comprises using both a track search technique and a full search query technique to compare the generated second query signature with the received set of reference signatures.*

*30. The method of claim 21, wherein performing the action comprises:*

*using user-preference data associated with a user of the client device to identify a user-preferred action; and*

*performing the identified user-preferred action.*

*31. The method of claim 21, wherein performing the action comprises at least temporarily blocking presentation of the second content unit.*

*32. The method of claim 21, wherein performing the action comprises blocking presentation of the second content unit for a duration of the second content unit.*

*33. The method of claim 21, wherein performing the action comprises switching to a different channel on which to receive and present content.*

*34. The method of claim 21, wherein performing the action comprises switching to presenting different content.*

*35. The method of claim 21, wherein the client device is a television set and wherein performing the action comprises initiating a picture-in-picture mode of the television set.*

*36. The method of claim 21, wherein performing the action comprises reducing an audio volume level of the client device.*

*37. A non-transitory computer-readable storage medium having stored thereon program instructions that, when executed by one or more processors of a client device, cause the client device to perform operations comprising:*

*generating a first query signature representing a portion of a first content unit, wherein the portion of the first content unit is presented by the client device;*

*sending, to a server device, the generated first query signature;*

*responsive to sending the generated first query signature, receiving, from the server device, a set of reference signatures representing additional portions of the first content unit, wherein the set of reference signatures was selected by the server device based at least in part on the generated first query signature;*

*generating a second query signature representing a portion of a second content unit that is different from the first content unit;*

*comparing the generated second query signature with the received set of reference signatures;*

*determining that the comparing resulted in no match being found; and*

*responsive to determining that the comparing resulted in no match being found, performing an action.*

*38. The non-transitory computer-readable storage medium of claim 37, wherein the first content unit comprises video content.*

*39. The non-transitory computer-readable storage medium of claim 38, wherein the first content unit further comprises audio content.*

*40. The non-transitory computer-readable storage medium of claim 37, wherein the client device is a television set and wherein presented by the client device comprises displayed by the client device.*

*41. The non-transitory computer-readable storage medium of claim 37, wherein the portion of the second content unit is received but not presented by the client device.*

*42. The non-transitory computer-readable storage medium of claim 37, wherein the first content unit is a television show and the second content unit is an advertisement.*

*43. The non-transitory computer-readable storage medium of claim 37, wherein comparing the generated second query signature with the received set of reference signatures comprises using a track search technique to compare the generated second query signature with the received set of reference signatures.*

*44. The non-transitory computer-readable storage medium of claim 37, wherein comparing the generated second query signature with the received set of reference signatures comprises using a full search query technique to compare the generated second query signature with the received set of reference signatures.*

*45. The non-transitory computer-readable storage medium of claim 37, wherein comparing the generated*

*second query signature with the received set of reference signatures comprises using both a track search technique and a full search query technique to compare the generated second query signature with the received set of reference signatures.*

*46. The non-transitory computer-readable storage medium of claim 37, wherein performing the action comprises:*

*using user-preference data associated with a user of the client device to identify a user-preferred action; and*

*performing the identified user-preferred action.*

*47. The non-transitory computer-readable storage medium of claim 37, wherein performing the action comprises at least temporarily blocking presentation of the second content unit.*

*48. The non-transitory computer-readable storage medium of claim 37, wherein performing the action comprises blocking presentation of the second content unit for a duration of the second content unit.*

*49. The non-transitory computer-readable storage medium of claim 37, wherein performing the action comprises switching to a different channel on which to receive and present content.*

*50. The non-transitory computer-readable storage medium of claim 37, wherein performing the action comprises switching to presenting different content.*

*51. The non-transitory computer-readable storage medium of claim 37, wherein the client device is a television set and wherein performing the action comprises initiating a picture-in-picture mode of the television set.*

*52. The non-transitory computer-readable storage medium of claim 37, wherein performing the action comprises reducing an audio volume level of the client device.*

*53. A client device comprising one or more processors and a non-transitory computer-readable storage medium having stored thereon program instructions that, when executed by the one or more processors, cause the client device to perform operations comprising:*

*generating a first query signature representing a portion of a first content unit, wherein the portion of the first content unit is presented by the client device;*

*sending, to a server device, the generated first query signature;*

*responsive to sending the generated first query signature, receiving, from the server device, a set of reference signatures representing additional portions of the first content unit, wherein the set of reference signatures was selected by the server device based at least in part on the generated first query signature;*

*generating a second query signature representing a portion of a second content unit that is different from the first content unit;*

*comparing the generated second query signature with the received set of reference signatures;*

*determining that the comparing resulted in no match being found; and*

*responsive to determining that the comparing resulted in no match being found, performing an action.*

*54. The client device of claim 53, wherein the first content unit comprises video content.*

*55. The client device of claim 54, wherein the first content unit further comprises audio content.*

*56. The client device of claim 53, wherein the client device is a television set and wherein presented by the client device comprises displayed by the client device.*

*57. The client device of claim 53, wherein the portion of the second content unit is received but not presented by the client device.*

*58. The client device of claim 53, wherein the first content unit is a television show and the second content unit is an advertisement.*

*59. The client device of claim 53, wherein comparing the generated second query signature with the received set of reference signatures comprises using a track search technique to compare the generated second query signature with the received set of reference signatures.*

*60. The client device of claim 53, wherein comparing the generated second query signature with the received set of reference signatures comprises using a full search query technique to compare the generated second query signature with the received set of reference signatures.*

*61. The client device of claim 53, wherein comparing the generated second query signature with the received set of reference signatures comprises using both a track search technique and a full search query technique to compare the generated second query signature with the received set of reference signatures.*

*62. The client device of claim 53, wherein performing the action comprises:*

*using user-preference data associated with a user of the client device to identify a user-preferred action; and*

*performing the identified user-preferred action.*

*63. The client device of claim 53, wherein performing the action comprises at least temporarily blocking presentation of the second content unit.*

*64. The client device of claim 53, wherein performing the action comprises blocking presentation of the second content unit for a duration of the second content unit.*

*65. The client device of claim 53, wherein performing the action comprises switching to a different channel on which to receive and present content.*

*66. The client device of claim 53, wherein performing the action comprises switching to presenting different content.*

*67. The client device of claim 53, wherein the client device is a television set and wherein performing the action comprises initiating a picture-in-picture mode of the television set.*

*68. The client device of claim 53, wherein performing the action comprises reducing an audio volume level of the client device.*

*69. A method comprising:*

*receiving, by a server device, from a client device, a first query signature that was generated by the client device and that represents a portion of a first content unit, wherein the client device presented the portion of the first content unit;*

*based at least in part on the received first query signature, selecting a set of reference signatures representing additional portions of the first content unit; and*

*sending, by the server device, to the client device, the selected set of reference signatures to facilitate the client device:*

*(i) comparing a second query signature generated by the client device and that represents a portion of a second content unit that is different from the first content unit with the set of reference signatures;*

*(ii) determining that the comparing resulted in no match being found, and*

*(iii) responsive to determining that the comparing resulted in no match being found, performing an action.*

*70. The method of claim 69, wherein the first content unit comprises video content.*

*71. The method of claim 70, wherein the first content unit further comprises audio content.*

*72. The method of claim 69, wherein the client device is a television set and wherein presented the portion of the first content unit comprises displayed the portion of the first content unit.*

*73. The method of claim 69, wherein the portion of the second content unit is received but not presented by the client device.*

*74. The method of claim 69, wherein the first content unit is a television show and the second content unit is an advertisement.*

*75. The method of claim 69, wherein comparing the second query signature with the set of reference signatures comprises using a track search technique to compare the second query signature with the set of reference signatures.*

*76. The method of claim 69, wherein comparing the second query signature with the set of reference signatures comprises using a full search query technique to compare the second query signature with the set of reference signatures.*

*77. The method of claim 69, wherein comparing the second query signature with the set of reference signatures comprises using both a track search technique and a full search query technique to compare the second query signature with the set of reference signatures.*

*78. The method of claim 69, wherein performing the action comprises:*

*using user-preference data associated with a user of the client device to identify a user-preferred action; and*

*performing the identified user-preferred action.*

*79. The method of claim 69, wherein performing the action comprises at least temporarily blocking presentation of the second content unit.*

*80. The method of claim 69, wherein performing the action comprises blocking presentation of the second content unit for a duration of the second content unit.*

*81. The method of claim 69, wherein performing the action comprises switching to a different channel on which to receive and present content.*

*82. The method of claim 69, wherein performing the action comprises switching to presenting different content.*

*83. The method of claim 69, wherein the client device is a television set and wherein performing the action comprises initiating a picture-in-picture mode of the television set.*

*84. The method of claim 69, wherein performing the action comprises reducing an audio volume level of the client device.*

*85. A non-transitory computer-readable storage medium having stored thereon program instructions that, when executed by one or more processors of a server device, cause the server device to perform operations comprising:*

*receiving, from a client device, a first query signature that was generated by the client device and that represents a portion of a first content unit, wherein the client device presented the portion of the first content unit;*

*based at least in part on the received first query signature, selecting a set of reference signatures representing additional portions of the first content unit; and*

*sending, to the client device, the selected set of reference signatures to facilitate the client device:*

*(i) comparing a second query signature generated by the client device and that represents a portion of a second content unit that is different from the first content unit with the set of reference signatures;*

*(ii) determining that the comparing resulted in no match being found, and*

*(iii) responsive to determining that the comparing resulted in no match being found, performing an action.*

*86. The non-transitory computer-readable storage medium of claim 85, wherein the first content unit comprises video content.*

*87. The non-transitory computer-readable storage medium of claim 86, wherein the first content unit further comprises audio content.*

*88. The non-transitory computer-readable storage medium of claim 85, wherein the client device is a television set and wherein presented the portion of the first content unit comprises displayed the portion of the first content unit.*

*89. The non-transitory computer-readable storage medium of claim 85, wherein the portion of the second content unit is received but not presented by the client device.*

*90. The non-transitory computer-readable storage medium of claim 85, wherein the first content unit is a television show and the second content unit is an advertisement.*

*91. The non-transitory computer-readable storage medium of claim 85, wherein comparing the second query signature with the set of reference signatures comprises using a track search technique to compare the second query signature with the set of reference signatures.*

*92. The non-transitory computer-readable storage medium of claim 85, wherein comparing the second query signature with the set of reference signatures comprises using a full search query technique to compare the second query signature with the set of reference signatures.*

*93. The non-transitory computer-readable storage medium of claim 85, wherein comparing the second query signature with the set of reference signatures comprises using both a track search technique and a full search query technique to compare the second query signature with the set of reference signatures.*

*94. The non-transitory computer-readable storage medium of claim 85, wherein performing the action comprises:*

*using user-preference data associated with a user of the client device to identify a user-preferred action; and*

*performing the identified user-preferred action.*

*95. The non-transitory computer-readable storage medium of claim 85, wherein performing the action comprises at least temporarily blocking presentation of the second content unit.*

*96. The non-transitory computer-readable storage medium of claim 85, wherein performing the action comprises blocking presentation of the second content unit for a duration of the second content unit.*

*97. The non-transitory computer-readable storage medium of claim 85, wherein performing the action comprises switching to a different channel on which to receive and present content.*

*98. The non-transitory computer-readable storage medium of claim 85, wherein performing the action comprises switching to presenting different content.*

*99. The non-transitory computer-readable storage medium of claim 85, wherein the client device is a television set and wherein performing the action comprises initiating a picture-in-picture mode of the television set.*

*100. The non-transitory computer-readable storage medium of claim 85, wherein performing the action comprises reducing an audio volume level of the client device.*

*101. A server device comprising one or more processors and a non-transitory computer-readable storage medium having stored thereon program instructions that, when executed by the one or more processors, cause the server device to perform operations comprising:*

*receiving, from a client device, a first query signature that was generated by the client device and that represents a portion of a first content unit, wherein the client device presented the portion of the first content unit;*

*based at least in part on the received first query signature, selecting a set of reference signatures representing additional portions of the first content unit; and*

*sending, to the client device, the selected set of reference signatures to facilitate the client device:*

*(i) comparing a second query signature generated by the client device and that represents a portion of a second content unit that is different from the first content unit with the set of reference signatures;*

*(ii) determining that the comparing resulted in no match being found, and*

*(iii) responsive to determining that the comparing resulted in no match being found, performing an action.*

*102. The server device of claim 101, wherein the first content unit comprises video content.*

*103. The server device of claim 102, wherein the first content unit further comprises audio content.*

*104. The server device of claim 101, wherein the client device is a television set and wherein presented the portion of the first content unit comprises displayed the portion of the first content unit.*

*105. The server device of claim 101, wherein the portion of the second content unit is received but not presented by the client device.*

*106. The server device of claim 101, wherein the first content unit is a television show and the second content unit is an advertisement.*

*107. The server device of claim 101, wherein comparing the second query signature with the set of reference signatures comprises using a track search technique to compare the second query signature with the set of reference signatures.*

*108. The server device of claim 101, wherein comparing the second query signature with the set of reference signatures comprises using a full search query technique to compare the second query signature with the set of reference signatures.*

*109. The server device of claim 101, wherein comparing the second query signature with the set of reference signatures comprises using both a track search technique and a full search query technique to compare the second query signature with the set of reference signatures.*

*110. The server device of claim 101, wherein performing the action comprises:*

*using user-preference data associated with a user of the client device to identify a user-preferred action; and*

*performing the identified user-preferred action.*

*111. The server device of claim 101, wherein performing the action comprises at least temporarily blocking presentation of the second content unit.*

*112. The server device of claim 101, wherein performing the action comprises blocking presentation of the second content unit for a duration of the second content unit.*

*113. The server device of claim 101, wherein performing the action comprises switching to a different channel on which to receive and present content.*

*114. The server device of claim 101, wherein performing the action comprises switching to presenting different content.*

*115. The server device of claim 101, wherein the client device is a television set and wherein performing the action comprises initiating a picture-in-picture mode of the television set.*

*116. The server device of claim 101, wherein performing the action comprises reducing an audio volume level of the client device.*

* * * * *